(12) United States Patent
Hayashi

(10) Patent No.: US 8,218,208 B2
(45) Date of Patent: Jul. 10, 2012

(54) IMAGE PROCESSING DEVICE AND IMAGE PROCESSING METHOD

(75) Inventor: Koji Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 680 days.

(21) Appl. No.: 12/382,405

(22) Filed: Mar. 16, 2009

(65) Prior Publication Data

US 2009/0231645 A1 Sep. 17, 2009

(30) Foreign Application Priority Data

Mar. 17, 2008 (JP) ................................. 2008-067484

(51) Int. Cl.
*G03F 3/08* (2006.01)

(52) U.S. Cl. ........ 358/520; 358/518; 358/515; 358/523; 358/524

(58) Field of Classification Search .................. 358/1.9, 358/504, 515, 518, 520, 523, 524; 382/162, 382/167; 345/591

See application file for complete search history.

(56) References Cited

U.S. PATENT DOCUMENTS

| | | | | |
|---|---|---|---|---|
| 5,838,465 A | * | 11/1998 | Satou et al. | 358/520 |
| 6,963,426 B2 | * | 11/2005 | Odagiri et al. | 358/1.9 |
| 7,133,154 B2 | * | 11/2006 | Sugiyama | 358/1.9 |
| 7,831,092 B2 | * | 11/2010 | Sakaguchi et al. | 382/167 |
| 2002/0067493 A1 | * | 6/2002 | Odagiri et al. | 358/1.9 |
| 2003/0193579 A1 | * | 10/2003 | Mori et al. | 348/222.1 |
| 2006/0193513 A1 | * | 8/2006 | Minamino | 382/165 |
| 2008/0007657 A1 | * | 1/2008 | Sakaguchi et al. | 348/708 |
| 2009/0059256 A1 | * | 3/2009 | Hasegawa et al. | 358/1.9 |
| 2009/0060326 A1 | * | 3/2009 | Imai et al. | 382/167 |
| 2011/0234622 A1 | * | 9/2011 | Fujita et al. | 345/591 |

FOREIGN PATENT DOCUMENTS

| | | |
|---|---|---|
| JP | 2006-238408 | 9/2006 |
| JP | 4115098 | 4/2008 |

OTHER PUBLICATIONS

English language abstract of Japanese Publication No. JP 2002-290761, published Oct. 4, 2002.

* cited by examiner

*Primary Examiner* — Kimberly A Williams
(74) *Attorney, Agent, or Firm* — Harness, Dickey & Pierce, P.L.C.

(57) ABSTRACT

An image processing device includes a determining unit that determines whether an intermediate parameter that is newly computed by an intermediate parameter computing unit or an intermediate parameter that is previously stored in an intermediate parameter storing unit is to be supplied to a color correcting unit depending upon an image forming condition. The color correcting unit performs color correction based on the intermediate parameter.

15 Claims, 43 Drawing Sheets

LIGHT PATH OF
REFLECTED LIGHT ON
OBVERSE SIDE OF
ORIGINAL

LIGHT PATH OF
REFLECTED LIGHT ON
REVERSE SIDE OF
ORIGINAL

FIG. 8

| 0 | -1 | 0 |
|---|----|---|
| -1 | 4 | -1 |
| 0 | -1 | 0 |

FIG. 9A

FILTER THAT DETECTS EDGE IN VERTICAL SCANNING DIRECTION

| 1 | 1 | 1 | 1 | 1 |
|---|---|---|---|---|
| 1 | 1 | 1 | 1 | 1 |
| 0 | 0 | 0 | 0 | 0 |
| -1 | -1 | -1 | -1 | -1 |
| -1 | -1 | -1 | -1 | -1 |

FIG. 9B

FILTER THAT DETECTS EDGE IN MAIN SCANNING DIRECTION

| 1 | 1 | 0 | -1 | -1 |
|---|---|---|----|----|
| 1 | 1 | 0 | -1 | -1 |
| 1 | 1 | 0 | -1 | -1 |
| 1 | 1 | 0 | -1 | -1 |
| 1 | 1 | 0 | -1 | -1 |

FIG. 9C

OBLIQUE DIRECTION DETECTING FILTER 1

| 0 | 1 | 1 | 1 | 1 |
|---|---|---|---|---|
| 1 | 0 | 1 | 1 | 1 |
| -1 | 0 | 0 | 1 | 1 |
| -1 | -1 | -1 | 0 | 1 |
| -1 | -1 | -1 | -1 | 0 |

FIG. 9D

OBLIQUE DIRECTION DETECTING FILTER 2

| 1 | 1 | 1 | 1 | 0 |
|---|---|---|---|---|
| 1 | 1 | 1 | 0 | -1 |
| 1 | 1 | 0 | 0 | -1 |
| 1 | 0 | -1 | -1 | -1 |
| 0 | -1 | -1 | -1 | -1 |

FIG. 21
(b) INDEX TABLE
(a) PIXEL NO.
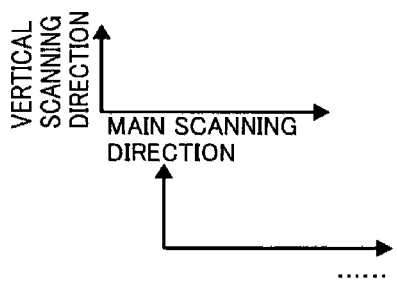
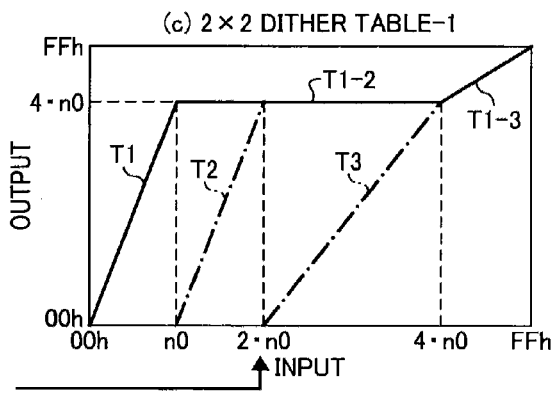
(c) 2 × 2 DITHER TABLE-1
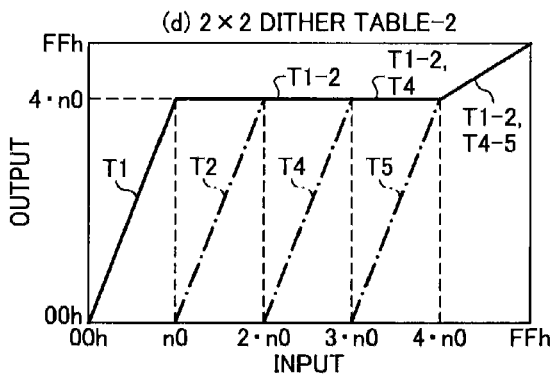
(d) 2 × 2 DITHER TABLE-2
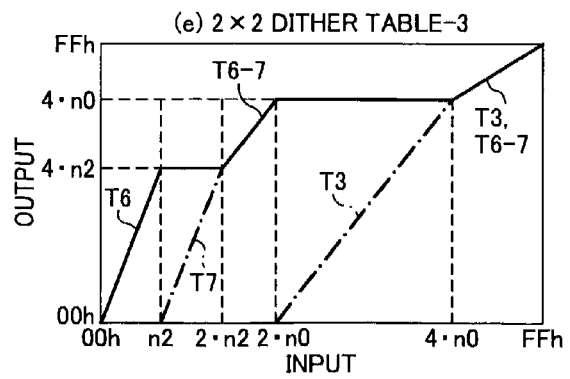
(e) 2 × 2 DITHER TABLE-3

FIG. 38

SCANNER/CALIBRATION  [SCREEN SWITCHING] [CONTENTS]

4 READ VALUE  PAGE 14

READ VALUE

| | RED | GREEN | BLUE |
|---|---|---|---|
| PATCH 1 | 255 | 250 | 0 |
| PATCH 2 | 128 | 255 | 10 |
| PATCH 3 | 70 | 255 | 0 |
| PATCH 4 | 0 | 255 | 5 |
| PATCH 5 | 0 | 250 | 128 |
| PATCH 6 | 0 | 255 | 255 |
| PATCH 7 | 0 | 120 | 255 |
| PATCH 8 | 0 | 0 | 245 |

[BACK] [NEXT]

FIG. 39

SCANNER/CALIBRATION  [SCREEN SWITCHING] [CONTENTS]

4 CORRECTION COEFFICIENT  PAGE 18

| | CORRECTION COEFFICIENT [%] | | CORRECTION COEFFICIENT [%] |
|---|---|---|---|
| PATCH 1 | 75 | PATCH 9 | 75 |
| PATCH 2 | 75 | PATCH 10 | 75 |
| PATCH 3 | 75 | PATCH 11 | 75 |
| PATCH 4 | 75 | PATCH 12 | 75 |
| PATCH 5 | 75 | PATCH 13 | 75 |
| PATCH 6 | 75 | PATCH 14 | 75 |
| PATCH 7 | 75 | PATCH 15 | 75 |
| PATCH 8 | 75 | PATCH 16 | 75 |

[BACK] [NEXT]

| READ VALUE COLOR (MAX.255) | BLUE SIGNAL | GREEN SIGNAL | RED SIGNAL | YELLOW CORRECTION COEFFICIENT FOR ACC | INPUT FOR YELLOW | REMARKS |
|---|---|---|---|---|---|---|
| 1. White | 240 | 240 | 240 | 1.0 | 240 | |
| 2. Yellow | 40 | 200 | 200 | 1.0 | 180 | |
| 3. Red | 10 | 10 | 160 | 0.8 | 128 | |
| 4. Magenta | 60 | 20 | 160 | 0.8 | 128 | |
| 5. Blue | 60 | 20 | 30 | 0.9 | 27 | |
| 6. Cyan | 160 | 80 | 10 | 1.0 | 10 | |
| 9. Green | 30 | 60 | 10 | 1.0 | 10 | |
| 10. Gray | 20 | 20 | 20 | 1.0 | 20 | |
| 11. Black | 0 | 0 | 0 | 1.0 | 0 | |

FIG. 46

| READ VALUE COLOR (MAX.255) | BLUE SIGNAL | GREEN SIGNAL | RED SIGNAL | RED CORRECTION COEFFICIENT FOR ACC | INPUT FOR CYAN | REMARKS |
|---|---|---|---|---|---|---|
| 1. White | 240 | 240 | 240 | 1.0 | 240 | |
| 2. Yellow | 40 | 200 | 200 | 0.9 | 180 | |
| 3. Red | 10 | 10 | 160 | 0.8 | 128 | |
| 4. Magenta | 60 | 20 | 160 | 0.8 | 128 | |
| 5. COLOR 1 BETWEEN MAGENTA AND BLUE | 60 | 20 | 120 | 1.1 | 132 | |
| 6. COLOR 2 BETWEEN MAGENTA AND BLUE | 60 | 20 | 80 | 1.1 | 88 | |
| 7. Blue | 60 | 20 | 30 | 0.9 | 27 | |
| 8. Cyan | 150 | 50 | 10 | 1.0 | 10 | |
| 9. Green | 30 | 60 | 10 | 1.1 | 11 | |
| 10. Gray | 5 | 5 | 5 | 1.0 | 5 | |
| 11. Black | 0 | 0 | 0 | 1.0 | 0 | |

IMAGE PROCESSING DEVICE AND IMAGE PROCESSING METHOD

CROSS-REFERENCE TO RELATED APPLICATIONS

The present application claims priority to and incorporates by reference the entire contents of Japanese priority document 2008-067484 filed in Japan on Mar. 17, 2008.

BACKGROUND OF THE INVENTION

1. Field of the Invention

The present invention relates to an image processing device such as a digital copying apparatus, a printer, or a facsimile (fax) apparatus. More particularly, the present invention relates to an image processing device having a connecting output function in which data acquired at a scanner device attached to the image processing device are sent for printing to a separate printer.

2. Description of the Related Art

Conventional image processing devices suffer from a problem, for example, that a fluctuation in spectral sensitivity of a charge coupled device (CCD) in a scanner, a fluctuation in spectral sensitivity of an infrared cut filter for removing an infrared light component and a degradation in a scanner optical system with the elapse of time cause a mechanical difference and a degradation with time in read values of original image data and cause a difference in output image signals for each machine even when an identical color original is read, often resulting in a different color output on a display and a different printed color.

Japanese Patent Application Laid-open No. 2006-238408 discloses setting image processing parameters using a reference chart with color images on a plurality of different gradation levels formed thereon with a view to reducing a difference between scanner devices.

The computation of intermediate parameters for obtaining image processing parameters for use in a color correcting unit by reading of a chart is disadvantageous, for example, in that, due to computational complexity of the intermediate parameters, continuous copying takes a lot of time and recomputation of the intermediate parameters for each image quality mode takes a lot of time.

SUMMARY OF THE INVENTION

It is an object of the present invention to at least partially solve the problems in the conventional technology.

According to an aspect of the present invention, there is provided an image processing device including an intermediate parameter computing unit configured to compute an intermediate parameter as an image processing parameter for use in a color correcting unit that corrects signal colors depending upon a plurality of hue areas formed using, as a boundary, planes provided parallel to a lightness axis within a color space; an intermediate parameter storing unit configured to store therein the intermediate parameter calculated by the intermediate parameter computing unit; and a determining unit that determines whether the intermediate parameter that is newly computed by the intermediate parameter computing unit or the intermediate parameter that is previously stored in the intermediate parameter storing unit is to be supplied to the color correcting unit depending upon an image forming condition.

According to another aspect of the present invention, there is provided an image processing method including computing an intermediate parameter as an image processing parameter for use in a color correcting unit that corrects signal colors depending upon a plurality of hue areas formed using, as a boundary, planes provided parallel to a lightness axis within a color space; storing the intermediate parameter calculated at the computing in an intermediate parameter storage unit; and determining whether the intermediate parameter that is newly computed at the computing or the intermediate parameter that is previously stored in the intermediate parameter storing unit is to be supplied to the color correcting unit depending upon an image forming condition.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a table for explaining one example of a Laplacian filter shown in FIG. 7;

FIG. 9A is a table for explaining a filter that detects an edge in a vertical scanning direction as one example of the edge level detecting filter shown in FIG. 7;

FIG. 9B is a table for explaining a filter that detects an edge in a main scanning direction as one example of an edge level detecting filter shown in FIG. 7;

FIG. 9C is a diagram for explaining an oblique direction detecting filter as one example of an edge level detecting filter shown in FIG. 7;

FIG. 9D is a diagram for explaining another oblique direction detecting filter as one example of an edge level detecting filter shown in FIG. 7;

FIG. 21 is a typical diagram for explaining an example of an index table;

FIG. 38 is a diagram for explaining a liquid crystal screen that displays read values;

FIG. 39 is a diagram for explaining a liquid crystal screen that displays correction coefficients;

FIG. 46 is a table for explaining one example of read reference values of chromatic color and achromatic color patches for cyan toner correction;

DETAILED DESCRIPTION OF THE PREFERRED EMBODIMENTS

Preferred embodiments according to the present invention will be explained in more detail with reference to the accompanying drawings.

Figure 56:
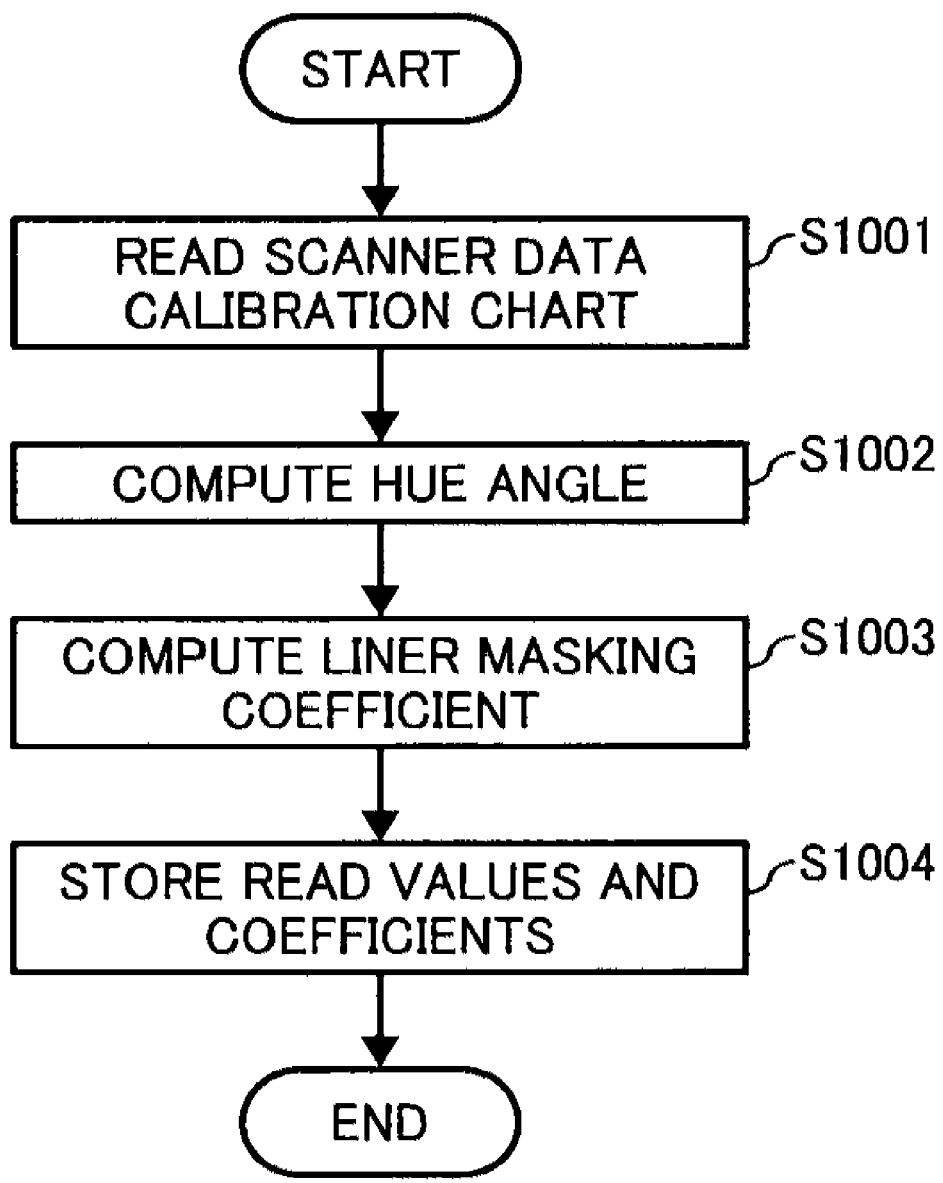
FIG. 56 is a flowchart for explaining correction by scanner data calibration.

Embodiments of the present invention will be explained with reference to FIGS. 1 to 56. These embodiments have been explained as an application of an image processing device to electrophotographic color copying apparatuses that are the so-called multi functional peripherals (MEPs) including, for example, a copying function, a facsimile (fax) function, a printing function, a scanner function, and a function of distributing an input image (an image of an original read by a scanner function or an image input by a printing or fax function) that have been composited with each other.

Figure 1:
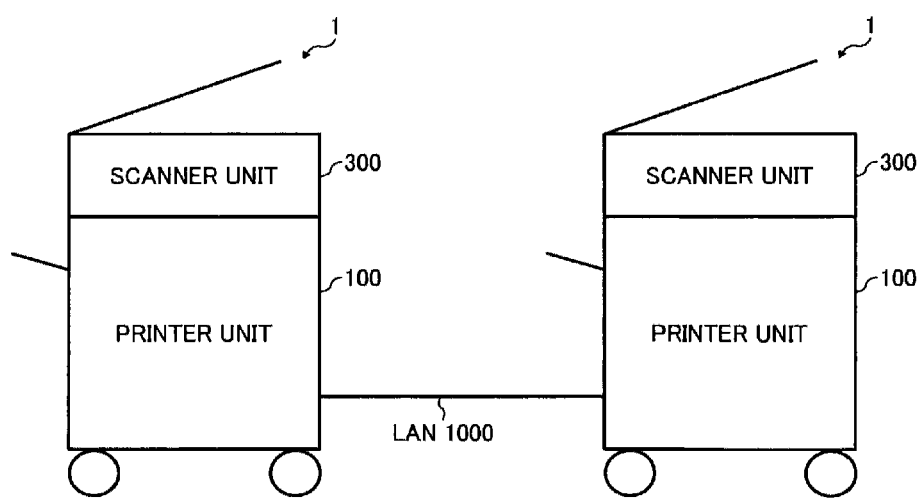
FIG. 1 is a diagram for explaining a configuration of a system including color copying apparatuses, to which an image processing device according to an embodiment of the present invention is applied, connected to each other.

FIG. 1 is a diagram for explaining a configuration of a system including color copying apparatuses 1, to which an image processing device according to the present invention has been applied, connected to each other. As shown in FIG. 1, the color copying apparatuses 1 are connected to each other so that data can be sent or received through a local area network (LAN) cable 1000. One of the color copying apparatuses 1 functions as a main color copying apparatus and the other functions as an auxiliary color copying apparatus. Specifically, a connecting output function can be realized in which, in order to obtain a large number of sheets of copies in a short time from a lump of originals that have been read with a scanner unit 300 in the main color copying apparatus 1, and the read image data of the originals are sent to the auxiliary color copying apparatus 1, and image processing is performed separately and simultaneously in both the color copying apparatuses 1 and the image data is printed separately and simultaneously at both the printer units 100.

In this case, for example, fluctuation in spectral sensitivity of CCD in a scanner unit of each of the color copying apparatuses 1, fluctuation in spectral sensitivity of an infrared cut filter for removing an infrared light component, and degradation in a scanner optical system with the elapse of time cause a difference in read values of the image data of the original between machines. As a result, even when an identical color original is read, output image signals are different for respective scanner units 300 in the color copying apparatuses 1, often resulting in a different color output on a display and a different printed color. In order to solve the problems of the prior art, the present embodiments have been configured so that image processing parameters can be set with a view to reducing a difference in read values between the scanner units 300 in the color copying apparatuses 1, improving a printer adjustment accuracy and reducing a fluctuation in adjustment. The embodiments will be explained in more detail.

Figure 2:
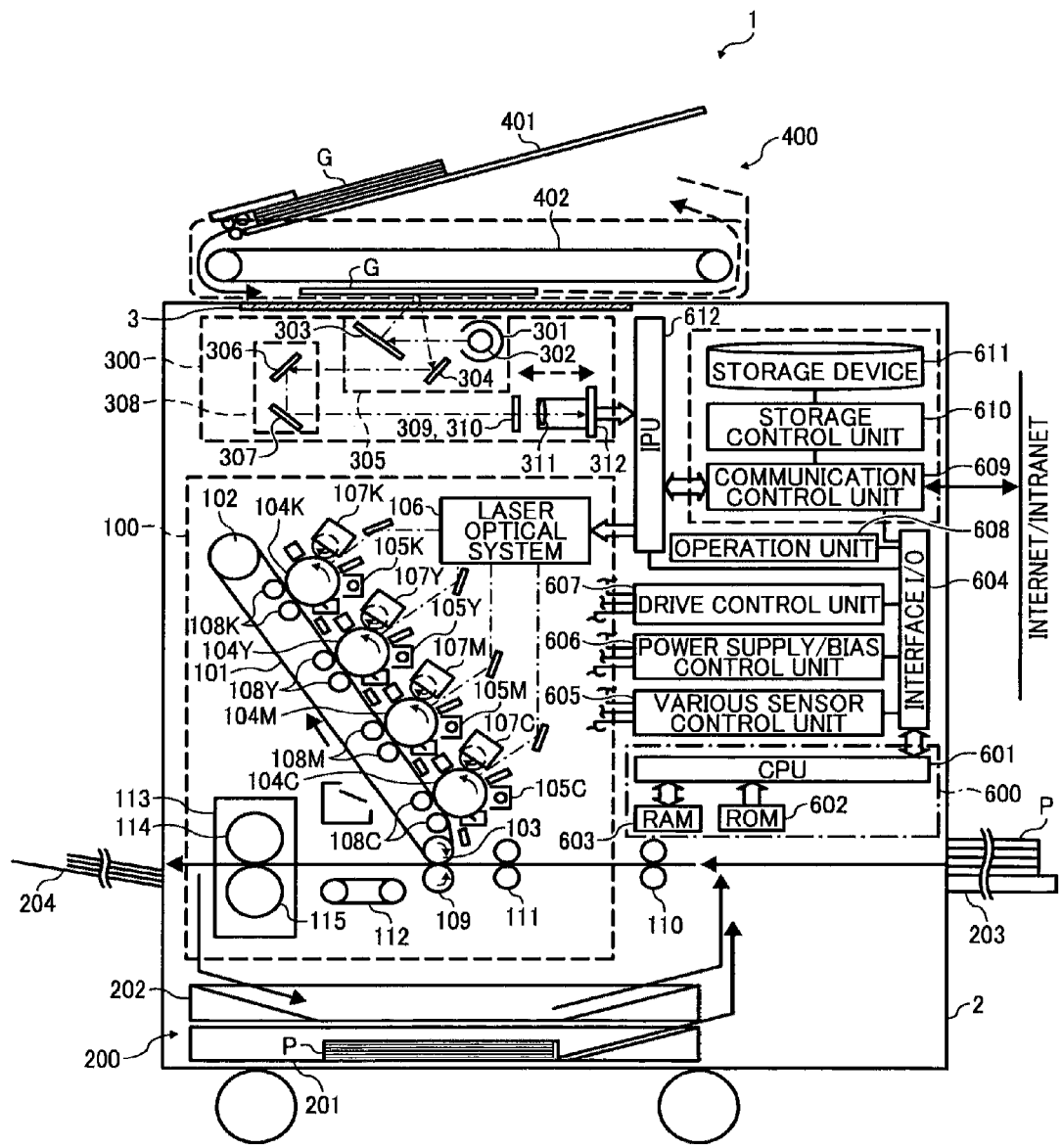
FIG. 2 is a front view for explaining a schematic configuration of a principal portion of an electrophotographic color copying apparatus.

FIG. 2 is a front view for explaining a schematic configuration of a principal portion of an arbitrary one of the color copying apparatuses 1. The color copying apparatus 1 includes a printer unit 100 as an image forming unit, a sheet feeding unit 200, and the scanner unit 300 as an image reading unit that are incorporated within a body casing 2. A contact glass 3 is provided on an upper surface of the body casing 2. The color copying apparatus 1 has an auto document feeder (ADF) 400 on its upper part. ADF 400 separates a plurality of sheets of originals G set on a platen 401 one sheet by one sheet, transfers the separated original by a roller and an original carrying belt 402 to the contact glass 3 at its position, where the original is read with the scanner unit 300, and ejects the original G after reading onto a catch tray (not shown) by the original carrying belt 402.

The sheet feeding unit 200 includes, for example, a sheet feeding tray 201, a reversing unit 202, and a carrier roller (not shown). The sheet feeding unit 200 separates a plurality of sheets of transfer paper (transfer materials) P within the sheet feeding tray 201 one sheet by one sheet and carries the separated transfer paper to the printer unit 100. The reversing unit 202 reverses the obverse and reverse surfaces of the transfer paper P with an image formed thereon by the printer unit 100, and again feeds the transfer paper P into the printer unit 100 to perform image formation on the reverse surface. A sheet feeding tray 203, on which the transfer paper P is set by manual feeding, is provided on one side face of the body casing 2. The sheet feeding unit 200 also carries the transfer paper P present on the sheet feeding tray 203 to the printer unit 100.

A catch tray 204 is provided on the body casing 2 in its side face remote from the sheet feeding tray 203. The transfer papers P, on which an image has been formed by the printer unit 100, are successively delivered onto the catch tray 204.

The printer unit 100 is provided within the body casing 2 in its substantially central portion. A loop-shaped intermediate transfer belt 101 is provided in the printer unit 100 at its substantially central portion in a vertical oblique direction over a predetermined length. The intermediate transfer belt 101 is extended across a driving roller 102 and a transfer roller 103, is rotation driven clockwise indicated by an arrow shown in FIG. 2. Organic photoconductor (OPC) drums 104K to 104C as image carriers (four in total of black (K) and three colors of yellow (Y), magenta (M), and cyan (C))) with 30 [mm]ϕ are provided along the intermediate transfer belt 101. For example, electrification chargers 105K to 105C that electrify the surface of the photoreceptor drums 104K to 104C, a laser optical system 106 that applies a laser beam onto the surface of the uniformly electrified photoreceptor drums 104K to 104C to form an electrostatic latent image, a black developing unit 107K and three color developing units for yellow (Y), magenta (M), and cyan (C), i.e., 107Y, 107M, and 107C, that feed respective color toners onto the electrostatic latent image to develop the latent image and thus to form a toner image for each color, bias rollers 108K to 108C that apply a transfer voltage to the intermediate transfer belt 101, a cleaning device (reference character not attached) that removes toner remaining on the surface of the photoreceptor drums 104K to 104C after the transfer, and an electricity removing unit that removes charges remaining on the surface of the photoreceptor drums 104K to 104C after the transfer, are successively provided around the photoreceptor drums 104K to 104C.

In the printer unit 100, the photoreceptor drums 104K to 104C being rotated anticlockwise are uniformly electrified by the electrification chargers 105K to 105C. Laser beams modulated by color data on respective colors are applied onto the uniformly charged photoreceptor drums 104K to 104C from the laser optical system 106 to form electrostatic latent images. Each color toner is fed by developing units 107K to 107C for respective colors to the photoreceptor drums 104K to 104C with the electrostatic latent images formed thereon to form toner images. In the printer unit 100, a transfer voltage is applied by bias rollers 108K to 108C to the intermediate transfer belt 101, and the toner images for respective colors on the photoreceptor drums 104K to 104C are successively superimposed and transferred onto the intermediate transfer belt 101 to transfer a full-color toner image.

In the printer unit 100, a pressure roller 109 is disposed at a position opposed to the transfer roller 103 so as to hold the intermediate transfer belt 101 between the pressure roller 109 and the transfer roller 103. The transfer paper P is transferred from the sheet feeding unit 200 into between the pressure roller 109 and the transfer roller 103. Carrier rollers 110 and registration rollers 111 are provided on a carrying path for the transfer paper P that leads to the pressure roller 109 and the transfer roller 103. The carrier rollers 110 carry the transfer paper P from the sheet feeding unit 200 to the registration rollers 111. The registration rollers 111 perform the adjustment of timing of the carried transfer paper P with the toner images on the intermediate transfer belt 101 and carry the transfer paper P into between the pressure roller 109 and the transfer roller 103.

The transfer roller 103 applies a transfer voltage to the intermediate transfer belt 101 to transfer the toner image formed on the intermediate transfer belt 101 onto the transfer paper P transferred between the transfer roller 103 and the pressure roller 109.

In the printer unit 100, a carrying belt 112 and a fixing unit 113 are provided on the downstream side in a carrying direction of the transfer paper P on which the toner image has been transferred. The transfer paper P, with the toner image transferred thereon, that has been separated from the intermediate transfer belt 101 is carried by the carrying belt 112 to the fixing unit 113. The fixing unit 113 includes a fixing roller 114 heated to a fixing temperature and a pressure roller 115 in pressure contact with the fixing roller 114. The fixing roller 114 and the pressure roller 115 being rotation driven carry the transfer paper P being carried while heating and pressing the transfer paper P to fix the toner image, present on the transfer paper P, onto the transfer paper P which is then delivered on the catch tray 204 provided on the side face of the body casing 2.

Figure 3:
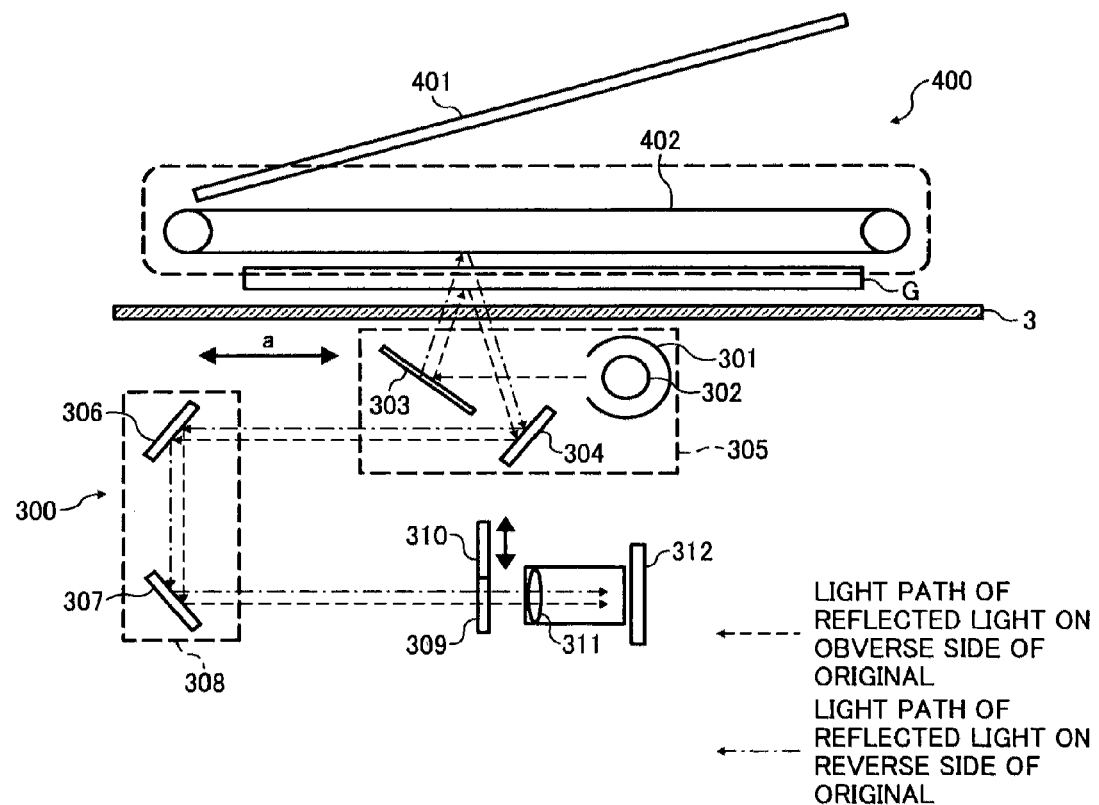
FIG. 3 is an enlarged front view of a scanner unit and an auto document feeder (ADF) unit in the color copying apparatus shown in FIG. 2.

As shown in an enlarged state in FIG. 3, the scanner unit 300 includes, for example, a first travel body 305 including a halogen lamp 302 provided with a lampshade paper 301, a first mirror 303 that reflects light from the original G and the halogen lamp 302 to the original G and a white reference plate (not shown), and a second mirror 304 that reflects light reflected from the original G and the white reference plate; a second travel body 308 including a third mirror 306 and a fourth mirror 307 that successively reflect light reflected from the second mirror 304; two switchable infrared cut filters 309, 310; a lens 311; and a charge coupled device (CCD) 312 as a photoelectric transducer. While moving the first travel body 305 and the second travel body 308 at respective predetermined travelling speeds in a vertical scanning direction (a direction indicated by an arrow a in FIG. 3), a reading light is applied from the halogen lamp 302 on the first travel body 305 onto the original G located on the contact glass 3, and light reflected from the original G is reflected by the second mirror 304 to the third mirror 306 on the second travel body 308. In the scanner unit 300, light reflected from the second mirror 304 is reflected by the third mirror 306 in the direction of the fourth mirror 307, and the reflected light is reflected by the fourth mirror in the direction of the infrared cut filters 309, 310. In this case, infrared light is cut off by the infrared cut filter 309 or the infrared cut filter 310 located on an optical path, and the light is introduced into the lens 311. The scanner unit 300 collects incident light on CCD 312. CCD 312 performs photoelectric conversion of the incident light to read an image of the original G and outputs the image as analog image signals.

Figure 4:
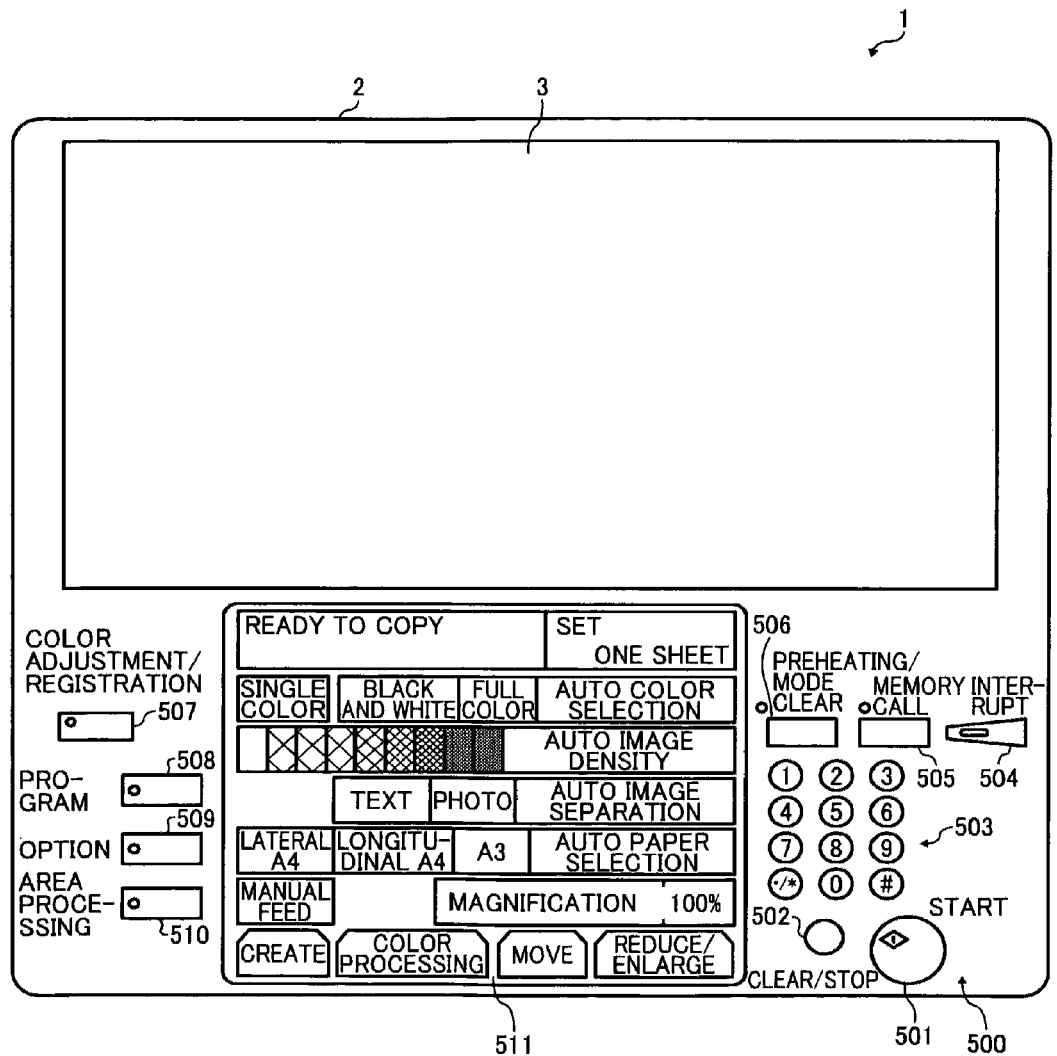
FIG. 4 is a top view of the color copying apparatus shown in FIG. 2.

In the color copying apparatus 1, as shown in FIG. 4, an operating unit 500 is provided on an upper surface of the body casing 2. The operating unit 500 includes, for example, a start key 501, a clear/stop key 502, a ten key 503, an interrupt key 504, a memory call key 505, a preheating/mode clear key 506, a color adjustment/registration key 507, a program key 508, an option key 509, an area processing key 510, and a liquid crystal screen 511.

Figure 5:
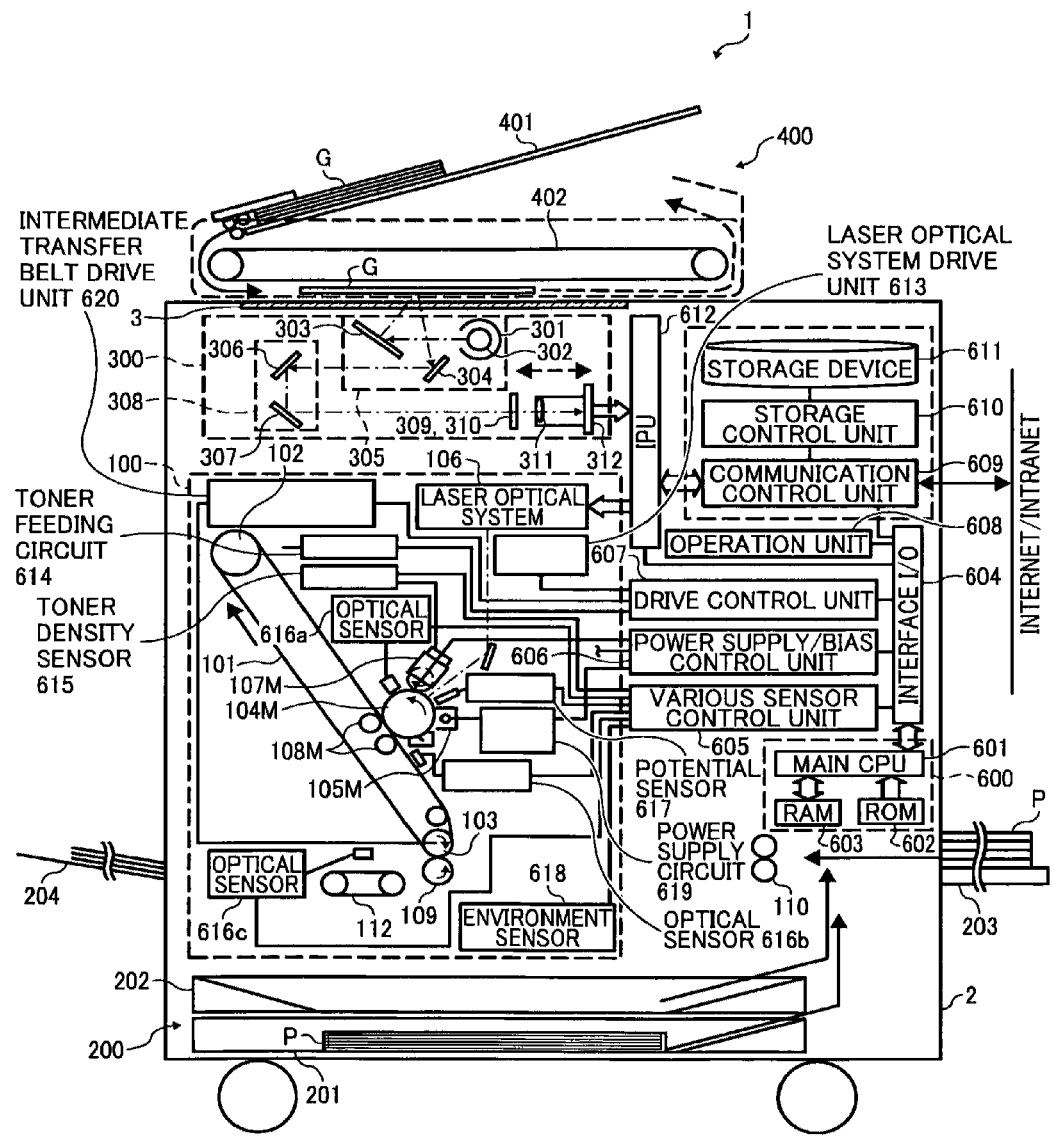
FIG. 5 is a front view for explaining a schematic configuration of a principal portion of a control system in the color copying apparatus shown in FIG. 2.

In the color copying apparatus 1, the control system is configured as shown in FIG. 5. The control system includes, for example, a central processing unit (CPU) 601 in a system controller 600 that controls each unit in the color copying apparatus 1 and executes processing as the color copying apparatus 1, a random only memory (ROM) 602 that stores various programs and data, a random access memory (RAM) 603 that is used as a work memory for CPU 601, an interface input/output (I/O) 604 that connects CPU 601 to various circuit units, a various sensor control unit 605, a power supply/bias control unit 606, a drive control unit 607, an operation unit 608, a communication control unit 609, a storage control unit 610, a storage device 611, an IPU 612, a laser optical system drive unit 613, and a toner feeding circuit 614.

For example, a toner density sensor 615 installed within the developing units 107K to 107C for YMCK, optical sensors 616a to 616c installed within the developing units 107K to 107C for YMCK, a potential sensor 617, and an environment sensor 618 are connected to the various sensor control unit 605. Sensor signals from the sensors 615 to 618 are output to CPU 601 through the interface I/O 604. The optical sensor 616a is provided opposite to the photoreceptor drums 104K to 104C and detects the amount of the toner adhered on the photoreceptor drums 104K to 104C. The optical sensor 616b is provided near each of the photoreceptor drums 104K to 104C so as to face the intermediate transfer belt 101 and detects the amount of the toner adhered on the intermediate transfer belt 101. The optical sensor 616c is provided so as to face the carrying belt 112 and detects the amount of the toner adhered on the carrying belt 112. In effect, the detection with any one of the optical sensors 616a to 616c suffices for contemplated results.

The optical sensor 616a is provided at a position, which is outside an image area in an axial direction of the photoreceptor drums 104K to 104C and near the image area, includes a light emitting element such as a light emitting diode and a photodetector such as a photosensor, detects, for each color, the amount of the toner adhered on a toner image in a detected pattern latent image formed on the photoreceptor drums 104K to 104C and the amount of the toner adhered on a texture portion, detects the so-called residual potential after the removal of electricity in the photoreceptor drums 104K to 104C, and outputs detected signals to the various sensor control unit 605. The various sensor control unit 605 determines the ratio between the amount of the toner adhered in the detected pattern toner image and the amount of the toner adhered on the texture portion based on the detected signals sent from the optical sensor 616a, compares the ratio with a reference value to detect a fluctuation in the image density, and corrects the control value of the toner density sensor 615 for each color of YMCK. In effect, the optical sensor 616a is not required to be provided in each of the photoreceptor drums 104K to 104C, and the detection in any one of the photoreceptor drums 104K to 104C suffices for contemplated results.

The toner density sensor 615 is provided in each of the developing units 107K to 107C, detects the density of the toner based on a change in magnetic permeability of a developing agent present within the developing units 107K to 107C, and outputs detected signals to the various sensor control unit 605. The various sensor control unit 605 compares the detected toner density with the reference value based on the detected signals sent from the toner density sensor 615. When the toner density is below a given value indicating that the amount of the toner is insufficient, a toner feeding signal on a level corresponding to the shortage is output to the toner feeding circuit 614. The toner feeding circuit 614 feeds the toner to the developing units 107K to 107C in response to the toner feeding signal.

The potential sensor 617 detects the surface potential of each of the photoreceptor drums 104K to 104C as an image support and outputs the detected signal to the various sensor control unit 605.

The power supply/bias control unit 606 controls the supply of a power supply to the developing units 107K to 107C and a power supply circuit 619. The power supply circuit 619 supplies a predetermined electrification discharge voltage to the electrification chargers 105K to 105C, supplies a developing bias of a predetermined voltage to the developing units 107K to 107C, and supplies a predetermined transfer voltage to the bias rollers 108K to 108C and the electrification chargers 105K to 105C.

The drive control unit 607 controls the laser optical system drive unit 613 that regulates the laser output of the laser optical system 106, an intermediate transfer belt drive unit 620 that controls the rotation drive of the intermediate transfer belt 101, and the drive of the toner feeding circuit 614 that feeds the toner to the developing units 107K to 107C. The operation unit 608 performs the acquisition of the details of an operation in the operating unit 500, the control of lighting of lamps and the like, and the control of display of the liquid crystal screen 511 under the control of CPU 601.

A network such as the Internet or an intranet is connected to the communication control unit 609, and the communication control unit 609 performs communication through the network. The storage device 611 includes a hard disk or the like and stores various pieces of information, particularly image data under the control of the storage control unit 610.

Figure 6:
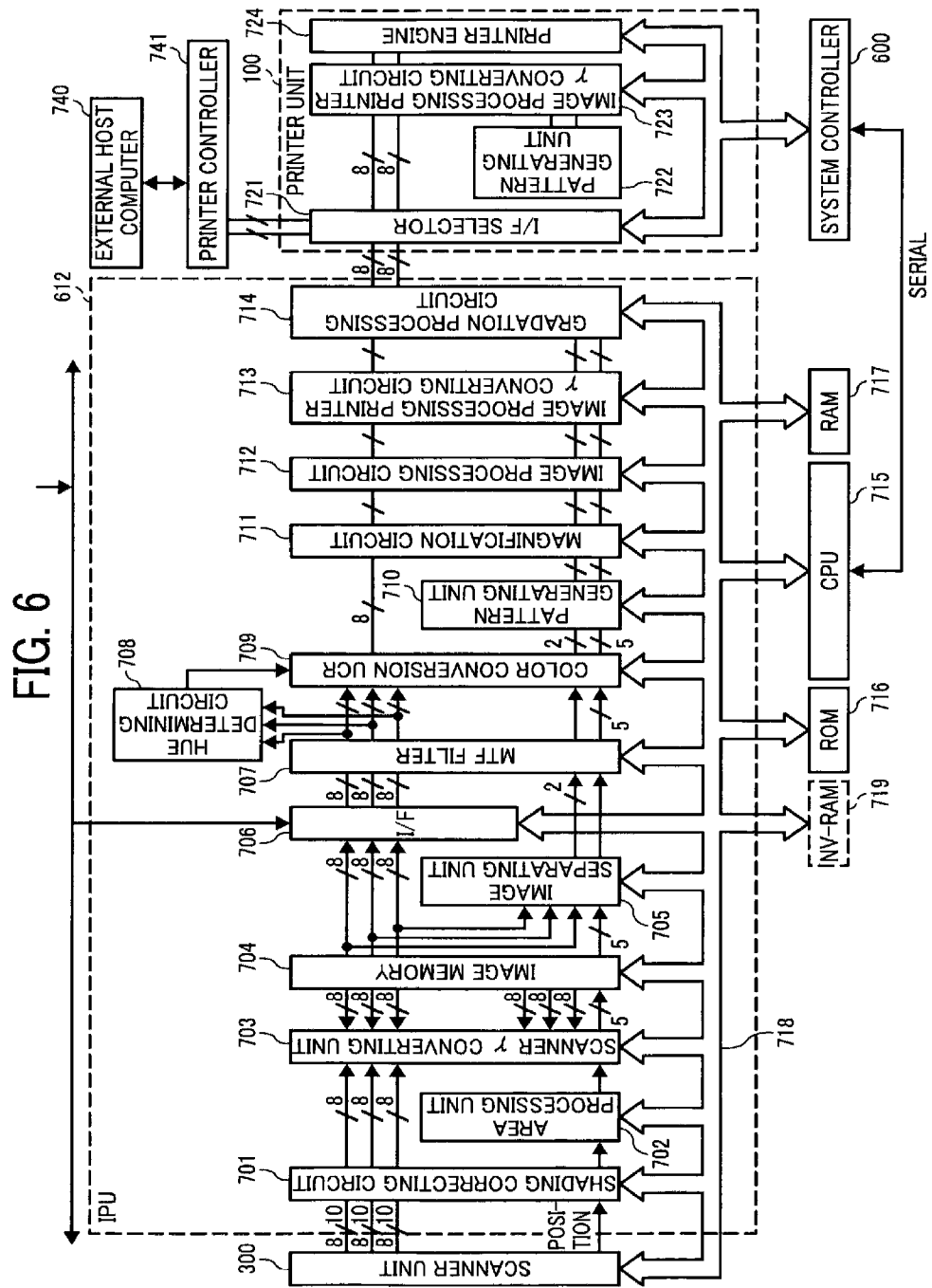
FIG. 6 is a diagram for explaining a block configuration of a circuit including mainly an instruction processing unit (IPU) and a printer unit in the color copying apparatus shown in FIG. 2.

The IPU 612 will be explained with reference to FIG. 6. As shown in FIG. 6, the IPU 612 includes, for example, a shading correcting circuit 701, an area processing unit 702, a scanner γ converting unit 703, an image memory 704, an image separating unit 705, an interface (I/F) 706, a modulation transfer function (MTF) filter 707, a hue determining circuit 708, a color conversion under-color removal (UCR) processing circuit (only "color conversion UCR" has been depicted in FIG. 6 to make the label short) 709, a pattern generating unit 710, a magnification circuit 711, an image processing circuit 712, an image processing printer γ converting circuit 713, a gradation processing circuit 714, a CPU 715, a ROM 716, a volatile RAM 717, and a nonvolatile NV-RAM 719. These units are connected through a bus 718.

Further, the printer unit 100 includes, for example, an I/F selector 721, a pattern generating unit 722, an image forming printer γ correcting circuit 723, and a printer engine 724 that actually forms an image in the printer unit 100.

The CPU 715 is connected to the ROM 716 and the RAM 717 through the bus 718 and is connected to the system controller 600 through serial I/F. A command is sent from the operating unit 500 or the like through the system controller 600. The CPU 715 sets various parameters in each of necessary units in IPU 612 based on the image quality mode, information on the density, information on the area and the like sent from the operating unit 500 or the like.

The scanner unit 300 performs color separation of the original G placed on the contact glass 3 into R, G, and B, reads the data, for example, on a 10-bit basis, and outputs the read image signals of the original G to the shading correcting circuit 701 in IPU 612.

The shading correcting circuit 701 corrects unevenness in a main scanning direction of an image signal input from the scanner unit 300 followed by outputting of the results, for example, as eight bit signals to the scanner γ converting unit 703.

The area processing unit 702 generates area signals that identify an area within the original G to which image data being currently processed belongs. The area signals switch the parameter used in the subsequent image processing. The area processing unit 702 sets, for each specifying area, image processing parameters such as a color correction coefficient, a space filter, or a gradation conversion table best suited for originals G such as characters, silver salt photographs (photographic papers), printed originals, ink jet, highlight pens, maps, and thermal transfer originals depending upon the image area.

The scanner γ converting unit 703 converts read signals (reflectance data), sent from the scanner unit 300, to lightness data and stores the lightness data in the image memory 704. The image memory 704 stores the image signals after the scanner γ conversion and outputs the image signals to the MTF filter 707 through the image separating unit 705 and I/F 706. The image separating unit 705 makes a determination on a character portion and a photograph portion in the image of the original G and a determination on a chromatic color or an achromatic color, and the results of the determination are output to the MTF filter 707.

The MTF filter 707 performs processing that changes frequency characteristics of the image signals such as edge reinforcement and smoothing according to the user's preference, for example, so as to provide sharp images or soft images and further performs edge reinforcement processing (adaptive edge reinforcement processing) according to the edge degree of the image signals. For example, the MTF filter 707 performs the so-called adaptive edge reinforcement for each of R, G, and B signals in which edge reinforcement is performed for the edge of characters while edge reinforcement is not performed for dot images.

Figure 7:
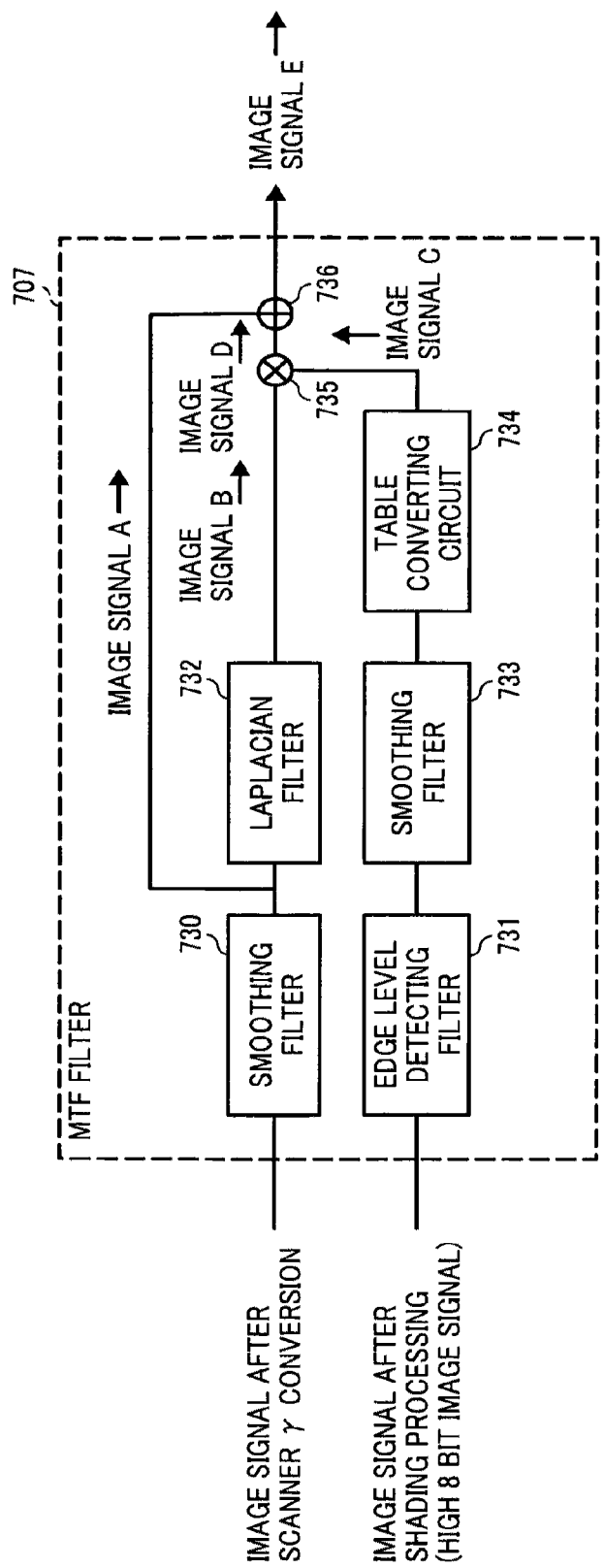
FIG. 7 is a block diagram for explaining the details of a circuit of a modulation transfer function (MTF) shown in FIG. 6.

Specifically, for example, as shown in FIG. 7, the MTF filter 707 includes, for example, a smoothing filter 730, an edge level detecting filter 731, a Laplacian filter 732, a smoothing filter 733, a table converting circuit 734, an integrator 735, and an adder 736. The smoothing filter 730 smoothes the image signals converted from the reflectance linear mode by the scanner γ converting unit 703 to the lightness linear mode using the following coefficients and outputs the results as image signal A to the Laplacian filter 732 and the adder 736.

TABLE 1

| (1/16)x | 0 | 1 | 2 | 1 | 0 |
|---|---|---|---|---|---|
| | 1 | 2 | 4 | 2 | 1 |
| | 0 | 1 | 2 | 1 | 0 |

Next, the Laplacian filter (3×3) 732 extracts a differential component of the image data using a filter as shown in FIG. 8 and outputs the results as an image signal B to the integrator 735.

Among 10-bit image signals not subjected to γ conversion by the scanner γ converting unit 703, for example, a high eight-bit component is input into the edge level detecting filter 731. The edge level detecting filter 731 detects an edge using a filter shown in FIG. 9A that detects an edge in a vertical scanning direction, a filter shown in FIG. 9B that detects an edge in a main scanning direction, and oblique direction detecting filters shown in FIGS. 9C and 9D. The maximum value among the detected edge levels is output as the edge degree to the smoothing filter 733.

The smoothing filter 733 smoothes the edge degree detected by the edge level detecting filter 731, if necessary, using the following coefficient to reduce an influence of a difference in sensitivity between even-numbered pixels and odd-numbered pixels in the scanner unit 300 and outputs the results to the table converting circuit 734.

TABLE 2

| (1/4)x | 1 | 2 | 1 |
|---|---|---|---|

Figure 10:
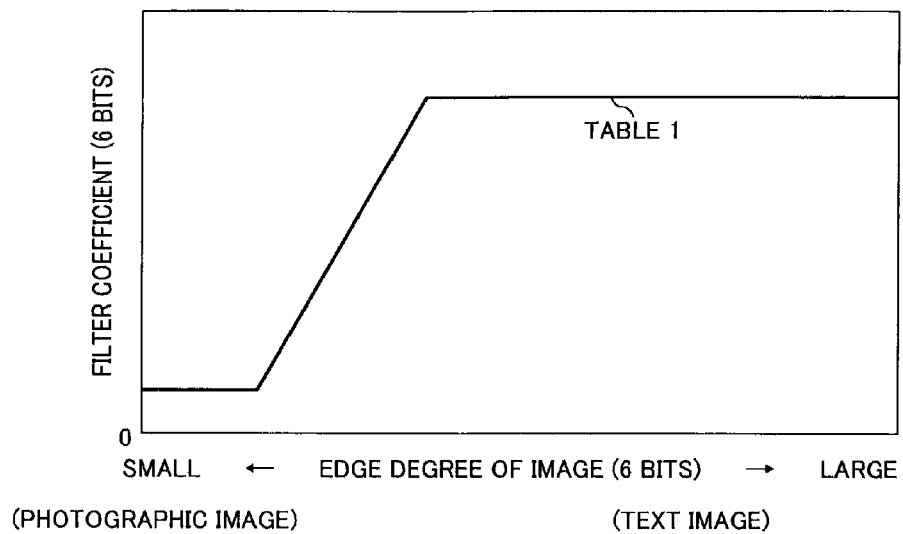
FIG. 10 is a diagram for explaining one example of table conversion of an edge degree by a table converting circuit.

The table converting circuit 734 performs table conversion of a required edge degree and outputs the results as an image signal C to the integrator 735. In this case, the table converting circuit 734 specifies the density of lines or dots (including contrast and density) and the smoothness of dot portions. An example of the table is shown in FIG. 10. The edge degree is largest, for example, a black line or a dot on a white background and decreases with an increase in smoothness of pixel boundaries as in, for example, fine dots in prints or silver salt photographs or thermal transfer originals.

The integrator 735 multiplies the edge degree (image signal C) converted by the table converting circuit 734 by the output value (image signal B) from the Laplacian filter 732 and outputs the obtained value as an image signal D to the adder 736. The adder 736 adds the image signal (image signal A) after the smoothing processing to the image signal D and outputs the results as an image signal E to the hue determining circuit 708 and the color conversion UCR processing circuit 709 as subsequent image processing circuits.

The color conversion UCR processing circuit 709 includes a color correcting processing unit that corrects a difference between color separation characteristics in the input system and the spectral characteristics of coloring materials in the output system and computes the amounts of coloring materials YMC necessary for faithful color reproduction, and a UCR processing unit that replaces a portion where three colors of YMC have been superimposed on top of each other with black (K). The color correcting processing method will be explained with reference to color space diagrams shown in FIGS. 11 to 13.

Figure 11:
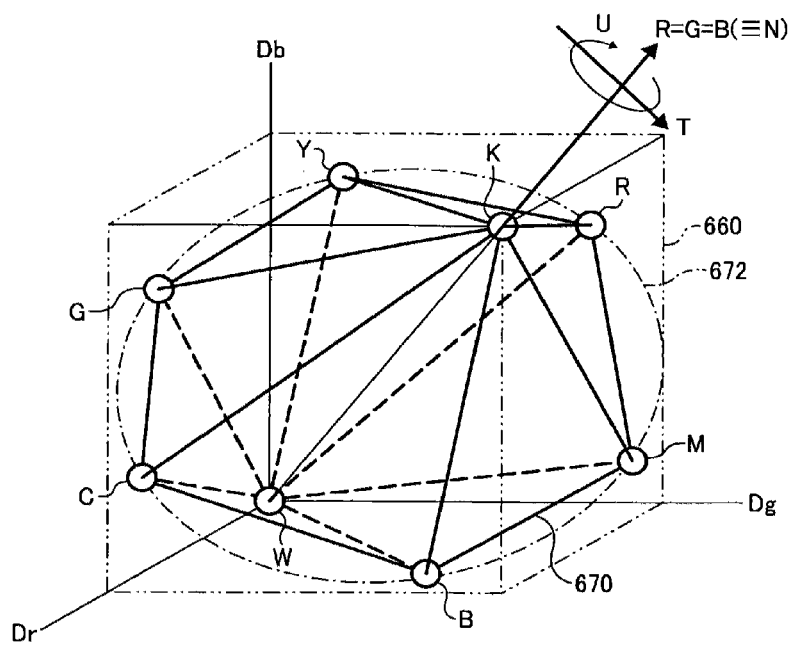
FIG. 11 is a color space diagram for explaining color correcting processing.

As shown in FIG. 11, in the color correcting processing, color spaces (R, G, B) are divided on a plane that is radially spread around an achromatic color axis (R=G=B(=N axis)). The chroma varies along a T axis provided perpendicularly to the N axis. The hue varies along a rotating direction U around the N axis on a plane parallel to the T axis. That is, all of points on a plane formed parallel to the N axis in the predetermined rotating direction U are color dots indicating a hue determined by the rotating direction U.

Dots C, M, and Y are points at which the chroma is highest in CMY as primary colors in the printer. Dots R, G, and B are points at which, in RGB as secondary colors in a printer, the chroma is highest. A printer color reproduction area 672 is a substantially spherical area formed by connecting these dots C, M, Y, R, G, and B to a dot W and a dot K by a curved line. Specifically, the inside of the printer color reproduction area 672 is a color area that can be output by a printer. A signal color area 660 is a color area which a signal color for the color image signal can adopt.

When the signal color is corrected in the color space, in order to simplify the processing, the image processing device regards a printer color reproduction area 670 as the printer color reproduction area 672. The printer color reproduction area 670 is a dodecahedron-shaped area formed by connecting dots corresponding to the maximum values for eight colors, that is, dots C, M, Y, R, G, and B, the dot W and the dot K by a straight line. An error does not substantially occur in correction amount X by regarding the printer color reproduction area 670 as the printer color reproduction area 672.

Figure 12:
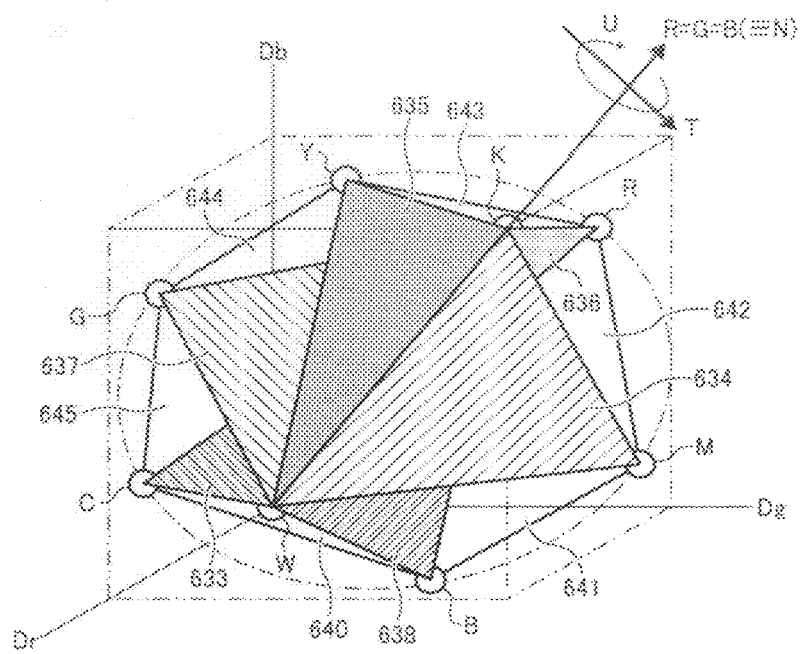
FIG. 12 is a color space diagram for explaining color correcting processing.
Figure 13:
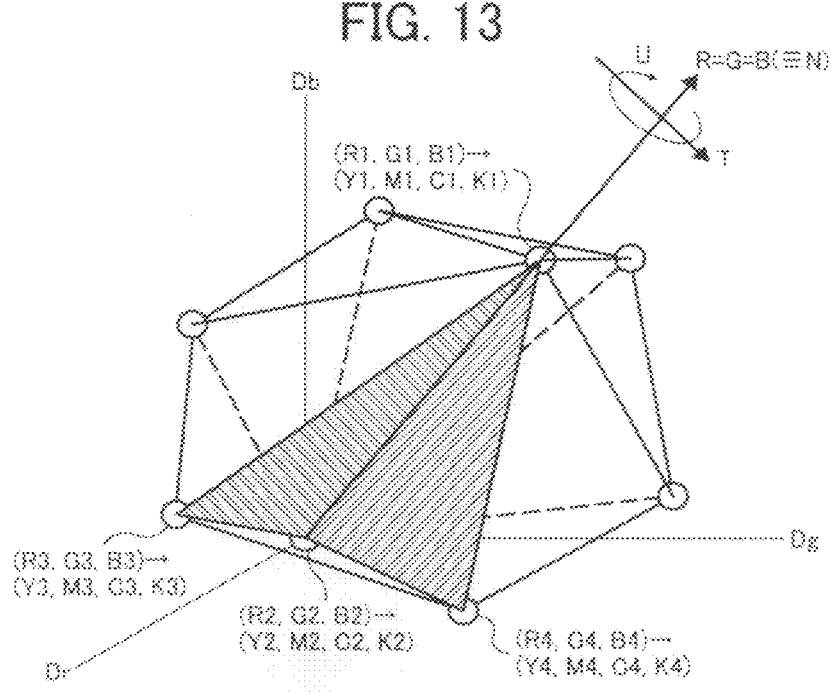
FIG. 13 is a color space diagram for explaining color correcting processing.

The hue area will be explained with reference to FIGS. 12 and 13. FIGS. 12 and 13 are diagrams for explaining a color space divided into a plurality of hue areas. A C boundary plane 633 is a plane defined by dots C, W, and K. Likewise, i boundary planes 634 to 638 (i=M,Y,R,G,B) are a plane defined by dots i, W, and K (i=M,Y,R,G,B). The color space is divided by the boundary planes 633 to 638. A CB hue area 640, a BM hue area 641, an MR hue area 642, an RY hue area 643, a YG hue area 644, and a GC hue area 645 are formed in the color space divided by the boundary planes 633 to 638.

Next, a method for determining a hue of image data with the hue determining circuit 708 will be explained. At the outset, a method for determining a hue in a three-dimensional space will be explained, and a method for determining a hue in a two-dimensional color plane will be then explained.

In the hue determination in the three-dimensional space, each hue evaluation value Fx is computed from image data, and a hue area code of a hue area including the signal color is determined based on the hue evaluation value Fx.

A method for theoretically developing the hue evaluation value Fx will be explained. Color coordinates indicating dots C, M, Y, R, G, B, W, and K shown in FIG. 11 are expressed by (Dir, Dig, Dib) (i=c, m, y, r, g, b, w, k). For example, a color coordinate corresponding to the dot C is (Dcr, Dcg, Dcb). In this case, for example, the C boundary plane 633 is expressed by the following formulae 1 to 6:

$$(Dcg-Dcb)\cdot Dr+(Dcb-Dcr)\cdot Dg+(Dcr-Dcg)\cdot Db=0 \quad (1)$$

$$(Dmg-Dmb)\cdot Dr+(Dmb-Dmr)\cdot Dg+(Dmr-Dmg)\cdot Db=0 \quad (2)$$

$$(Dyg-Dyb)\cdot Dr+(Dyb-Dyr)\cdot Dg+(Dyr-Dyg)\cdot Db=0 \quad (3)$$

$$(Drg-Drb)\cdot Dr+(Drb-Drr)\cdot Dg+(Drr-Drg)\cdot Db=0 \quad (4)$$

$$(Dgg-Dgb)\cdot Dr+(Dgb-Dgr)\cdot Dg+(Dgr-Dgg)\cdot Db=0 \quad (5)$$

$$(Dbg-Dbb)\cdot Dr+(Dbb-Dbr)\cdot Dg+(Dbr-Dbg)\cdot Db=0 \quad (6)$$

The color space is divided, for example, by the boundary plane 633, into an area including the CB hue area 640 and an area including the GC hue area 645. Likewise, the color space is divided, by the boundary planes 634 to 638, into two areas. Accordingly, a hue area to which the color image signal belongs can be determined based on the area selected from the two areas formed by the boundary planes 633 to 638. Specifically, the hue area in which the color image signal is included can be determined based on whether the value obtained by substituting the color image signal (Dr, Dg, Db) for each of the mathematical formulae 1 to 6 is positive or negative. Therefore, the hue evaluation value Fx is determined based on the mathematical formulae 1 to 6. Specifically, Fc, Fm, Fy, Fr, Fg, and Fb are respectively substituted for the left sides of the mathematical formulae 1 to 6.

Accordingly, in the hue determination in the three-dimensional space, the hue evaluation values Fx determined by the following mathematical formulae 7 to 12 are computed.

$$Fc=(Dcg-Dcb)\cdot Dr+(Dcb-Dcr)\cdot Dg+(Dcr-Dcg)\cdot Db \quad (7)$$

$$Fm=(Dmg-Dmb)\cdot Dr+(Dmb-Dmr)\cdot Dg+(Dmr-Dmg)\cdot Db \quad (8)$$

$$Fy=(Dyg-Dyb)\cdot Dr+(Dyb-Dyr)\cdot Dg+(Dyr-Dyg)\cdot Db \quad (9)$$

$$Fr=(Drg-Drb)\cdot Dr+(Drb-Drr)\cdot Dg+(Drr-Drg)\cdot Db \quad (10)$$

$$Fg=(Dgg-Dgb)\cdot Dr+(Dgb-Dgr)\cdot Dg+(Dgr-Dgg)\cdot Db \quad (11)$$

$$Fb=(Dbg-Dbb)\cdot Dr+(Dbb-Dbr)\cdot Dg+(Dbr-Dbg)\cdot Db \quad (12)$$

For example, when Fc and Fg computed from arbitrary points (Dr, Dg, Db) in the color space satisfy "Fc≦0 and Fb≦0", that the point is included in the CB hue area is apparent from the following table.

TABLE 3

| Condition for hue evaluation coefficient | Hue area code |
| --- | --- |
| Fc ≦ 0 and Fb > 0 | 0 {CB hue area} |
| Fc ≦ 0 and Fm > 0 | 1 {BM hue area} |
| Fm ≦ 0 and Fr > 0 | 2 {MR hue area} |
| Fr ≦ 0 and Fy > 0 | 3 {RY hue area} |
| Fy ≦ 0 and Fg > 0 | 4 {YG hue area} |
| Fg ≦ 0 and Fg > 0 | 5 {GC hue area} |

Thus, each hue area is defined by the hue evaluation value Fx. Specifically, in the hue area code table shown in Table 3, the conditions for the hue evaluation value Fx associated with the hue area code are conditions determined by the above formulae.

In the hue area code table shown in Table 3, for convenience, the color coordinate on the N axis is included in the GC hue area. Alternatively, it may be included in other hue area. The hue evaluation value Fx varies depending upon actual values of (Dir, Dig, Dib) (i=c, m, y, r, g, b, w, k). Accordingly, conditions for the hue evaluation value to be associated with each hue area code in the hue area code table (Table 3) may vary depending upon the hue evaluation values.

Next, regarding the method for determining a hue area including a color image signal utilizing a color coordinate of a color image signal on a two-dimensional plane following mapping of a three-dimensional color space on a two-dimensional plane, the operation of the hue determining circuit 708 will be explained with reference to a color plan view in FIG. 14 and a flowchart in FIG. 15.

Figure 15:
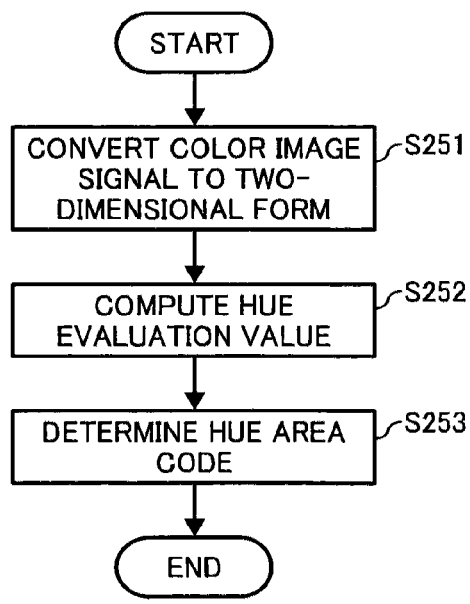
FIG. 15 is a flowchart for explaining the flow of hue determining processing.

In the flowchart shown in FIG. 15, at the outset, upon the input of a color image signal into the hue determining circuit 708, the value of the color image signal is converted into a two-dimensional form (S251). That is, the value of the color image signal is substituted in the following formulae to calculate a difference GR and a difference BG:

$$GR=Dg-Dr \tag{13}$$

$$BG=Db-Dg \tag{14}$$

Thus, the value in the color space of the color image signal (Dr, Dg, Db) is converted into a value on a color plane (GR, BG).

Figure 14:
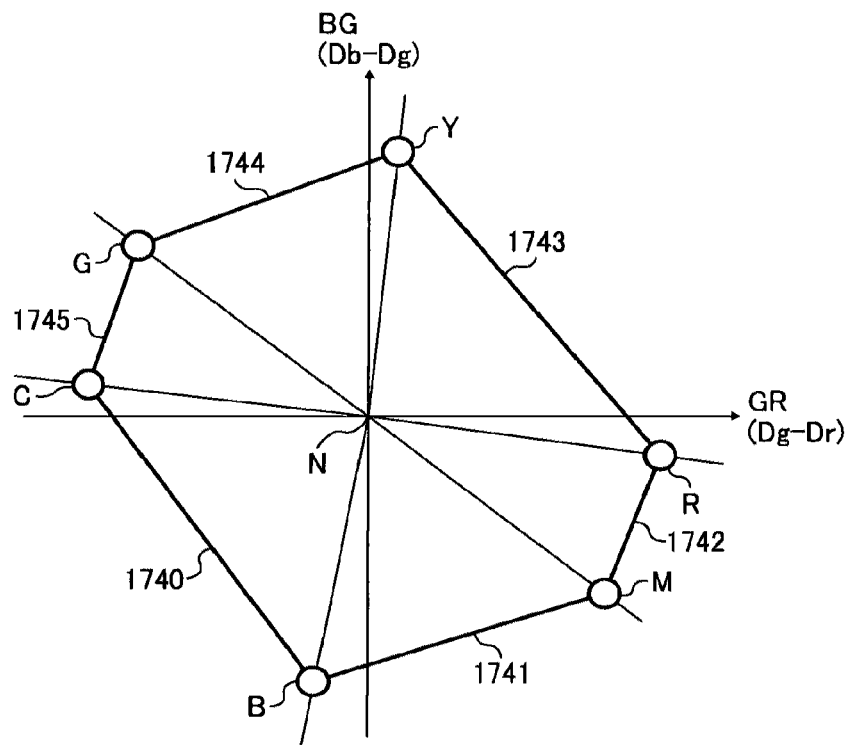
FIG. 14 is a color plane diagram for explaining color correcting processing.

FIG. 14 is a diagram for explaining a two-dimensional plane on which the color image signal is to be mapped. In this two-dimensional plane, a straight line corresponding to "Dg−Dr" is a GR axis, and a straight line corresponding to "Db−Dg" is a BG axis. The GR axis is orthogonal to the BR axis.

Dots (Dr, Dg, Db) on the color space are mapped on the color plane shown in FIG. 14 by the following formula. Further, dots (Dnr, Dng, Dnb) on the N axis in the color space are mapped on dots (Dng−Dnr, Dnb−Dng) in the color plane shown in FIG. 14. Since Dnr=Dng=Dnb, the following formula 15 is established:

$$(Dng-Dnr, Dnb-Dng)=(0,0) \tag{15}$$

Specifically, all the dots on the N axis are mapped on the origin n in the plane shown in FIG. 14. Further, dots C, M, Y, R, G, and B in the color space are placed around the origin n as shown in FIG. 14. Accordingly, the six hue areas 640 to 645 shown in FIG. 12 are mapped in areas 1740 to 1745 divided by a straight line that connects the N axis to the dots C, M, Y, R, G, and B in the color plane.

Next, hue evaluation value Fx'(x=c, m, y, r, g, b) are computed from a difference GR, a difference BG, and values for respective colors in the input color image signal (S252). A hue area code in a hue area including the signal color utilizing a hue area code table shown in Table 4 below based on each of the hue evaluation values Fx', the difference GR, and the difference BG (S253).

A method for developing the hue evaluation value Fx' will be explained below. In the color plane shown in FIG. 14, a straight line connecting a dot N to dots C, M, Y, R, G, and B, that is, a straight line NC, a straight line NM, a straight line NY, a straight line NR, a straight line NG, and a straight line Nb, are expressed as follows.

$$BG=(Dcb-Dcg)/(Dcg-Dcr)\cdot GR \text{ (where, } Dcg-Dcr\neq 0\text{)} \tag{16}$$

$$BG=(Dmb-Dmg)/(Dmg-Dmr)\cdot GR \text{ (where, } Dmg-Dmr\neq 0\text{)} \tag{17}$$

$$BG=(Dyb-Dyg)/(Dyg-Dyr)\cdot GR \text{ (where, } Dyg-Dyr\neq 0\text{)} \tag{18}$$

$$BG=(Drb-Drg)/(Drg-Drr)\cdot GR \text{ (where, } Drg-Drr\neq 0\text{)} \tag{19}$$

$$BG=(Dgb-Dgg)/(Dgg-Dgr)\cdot GR \text{ (where, } Dgg-Dgr\neq 0\text{)} \tag{20}$$

$$BG=(Dbb-Dbg)/(Dbg-Dbr)\cdot GR \text{ (where, } Dbg-Dbr\neq 0\text{)} \tag{21}$$

The positional relationship between the straight line determined by each formula and dots corresponding to the color image signal is learned from the magnitude relationship between BG values obtained by substituting GR values of the color image signal for each of the formulae 16 to 21 and BG values of an actual color image signal. Accordingly, a hue area in which the color image signal is included can be determined based on the magnitude relationship between the BG values obtained by substituting the GR values of the color image signal for the formulae 16 to 21 and the BG values of the color image signal.

The hue evaluation values Fx' are determined based on the formulae 22 to 27 as follows.

$$Fc'=(Dcb-Dcg)/(Dcg-Dcr)\cdot GR \tag{22}$$

$$Fm'=(Dmb-Dmg)/(Dmg-Dmr)\cdot GR \tag{23}$$

$$Fy'=(Dyb-Dyg)/(Dyg-Dyr)\cdot GR \tag{24}$$

$$Fr'=(Drb-Drg)/(Drg-Drr)\cdot GR \tag{25}$$

$$Fg'=(Dgb-Dgg)/(Dgg-Dgr)\cdot GR \tag{26}$$

$$Fb'=(Dbb-Dbg)/(Dbg-Dbr)\cdot GR \tag{27}$$

That is, the formulae 22 to 27 are the same as the formulae to 21, except that the left sides of the formulae 16 to are replaced respectively with Fc', Fm', Fy', Fr', Fg', and Fb'.

For example, when Fc' and Fb' computed from arbitrary points (GR, BG) in the color plane satisfy "BG≦Fc' and BG>Fb'", that the point is included in the CB hue area is apparent from the following table.

TABLE 4

| Condition for hue evaluation coefficient Fx' | Hue area code |
|---|---|
| BG ≦ fc' and BG > fb' | 0 {CB partial color space} |
| BG ≦ fb' and BG < fm' | 1 {BM partial color space} |
| BG ≧ fm' and BG < fr' | 2 {MR partial color space} |
| BG ≧ fr' and BG < fy' | 3 {RY partial color space} |
| BG ≧ fy' and BG > fg' | 4 {YG partial color space} |
| BG ≦ fg' and BG ≧ fc' | 5 {GC partial color space} |

Figure 16:
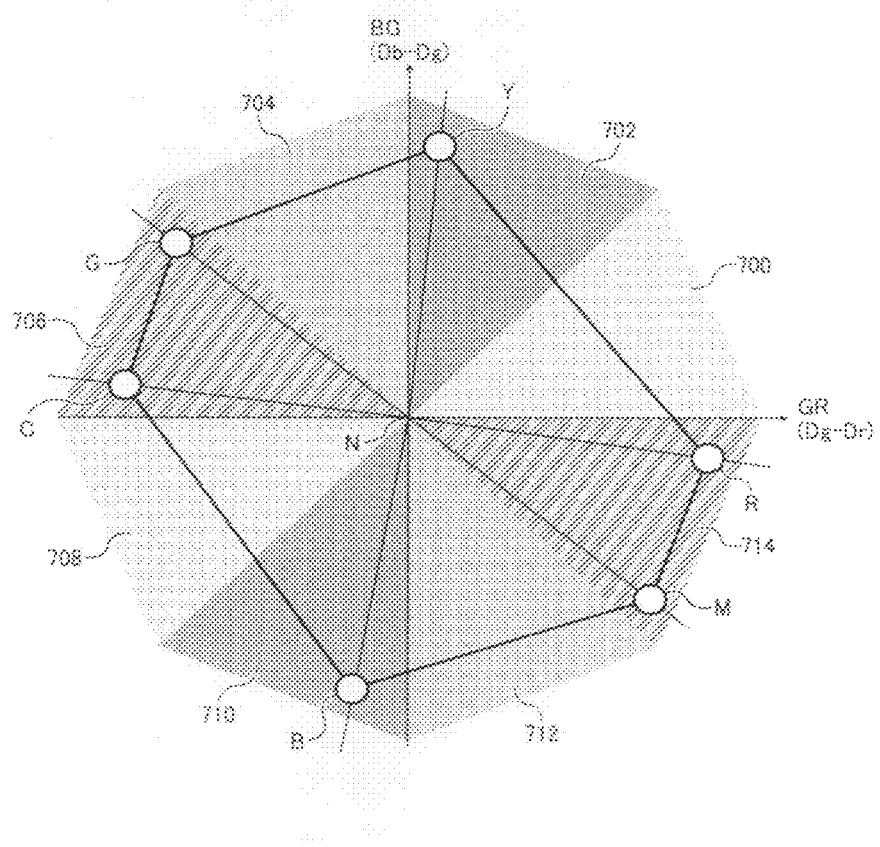
FIG. 16 is a diagram of a color plane for explaining color correcting processing.

That is, in the hue area code table shown in FIG. 4, the conditions for the hue evaluation value Fx' associated with the hue area code are conditions determined by the above formulae. Thus, the conditions for the hue evaluation value Fx' are preset in the hue area code table in Table 4. Accordingly, the hue determining circuit 708 may specify conditions satisfied by BG and hue evaluation value Fx' from conditions of the hue evaluation values Fx' associated with the hue area codes as in the hue area code table in Table 4 and may select a hue area code associated with the condition in the hue area code table (Table 4). FIG. 16 is a color plan view of FIG. 14 corresponding to the hue area.

In the hue area code table shown in Table 4, the color coordinate on the N axis is included in the GC hue area. Alternatively, the color coordinate may be included in other hue area.

The hue evaluation values Fx' vary depending upon actual values of (Dir, Dig, Dib) (i=c, m, y, r, g, b, w, k). Accordingly, in the hue area code table (Table 4), the conditions for the hue evaluation values to be associated with the hue area codes may vary depending upon the hue evaluation values Fx'.

The color image signals (Dr, Dg, Db) have been converted to values (GR, BG) in the color plane by conversion formulae shown in formulae 13 and 14. Alternatively, the following conversion formulae (28) and (29) may be used for the conversion.

$$GR=Ri\cdot Dr+Gi\cdot Dg+Bi\cdot Db \tag{28}$$

$$BG=Rj\cdot Dr+Gj\cdot Dg+Bj\cdot Db \tag{29}$$

where

Ri=Gi=Bi=0, Rj=Gj=Bj=0.

As described above, an area in divided spaces, to which the input image signals (R, G, B) belong, is determined by the hue determining circuit 708. Thereafter, color correcting processing is performed using masking coefficients (image processing parameters) preset for each space (color correcting unit).

A method for computing masking coefficients will be explained using an activity diagram shown in FIG. 17.

Figure 17:
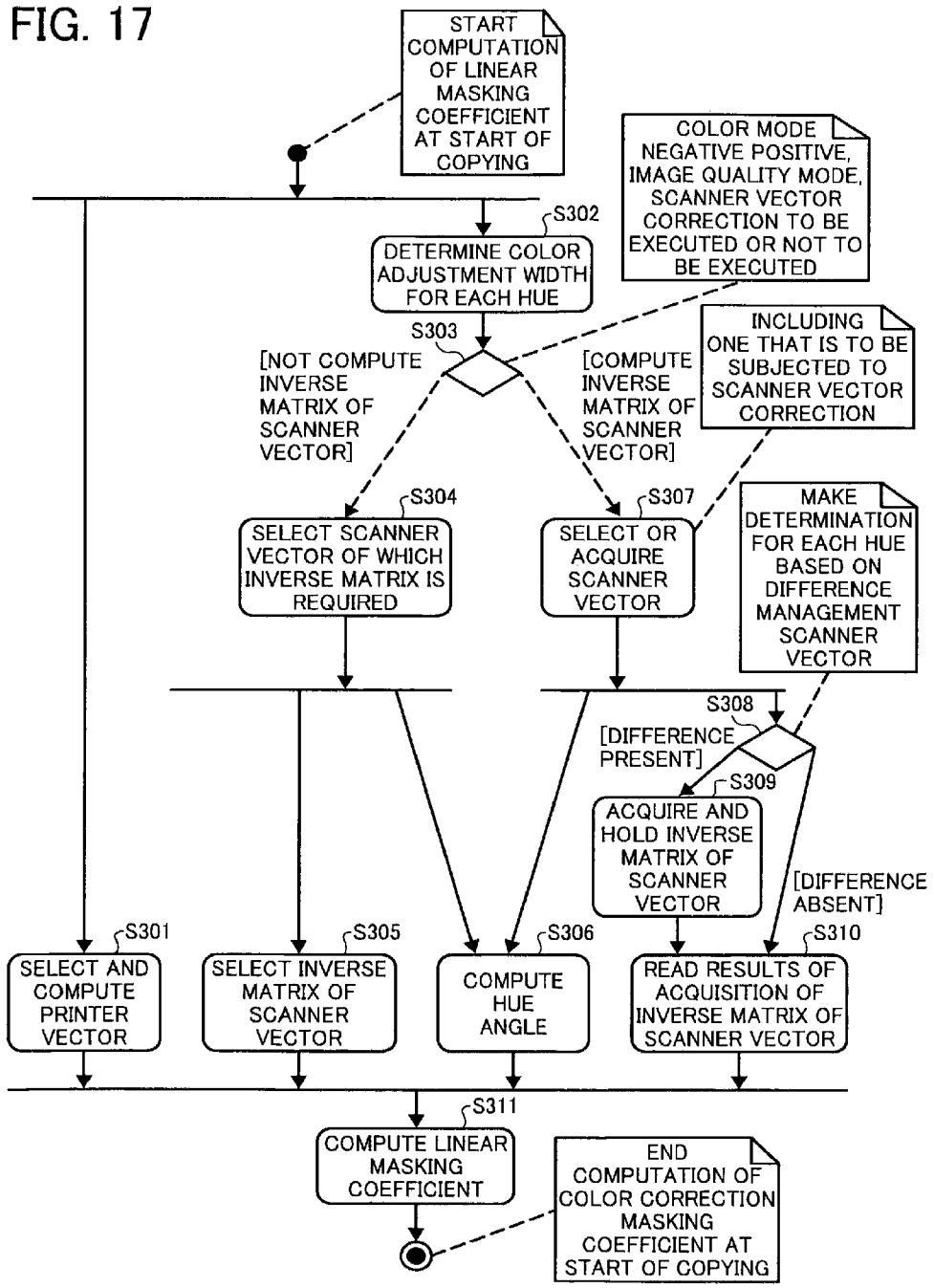
FIG. 17 is an activity diagram for explaining a method for computing a masking coefficient.

As shown in FIG. 17, upon an instruction for the computation of a linear masking coefficient at the start of copy, the CPU 715 first performs selection and computation of a printer vector (Step S301).

The CPU 715 then determines a dolor adjustment width for each hue (Step S302). This is because the hue angle of each hue varies depending upon the color adjustment width. In color conversion, the color adjustment width is a parameter that regulates a hue range of an original that is subjected to color conversion. Further, in performing color erasing that erases a specific color of the original, the color adjustment width also corresponds to a color erasing width.

In the subsequent Step S303, whether a scanner inverse matrix as an intermediate parameter is computed is determined by various image forming conditions (determining unit). When the computation of the scanner vector inverse matrix is not performed, Step S304 and later branched steps, are executed and a scanner vector inverse matrix previously stored in the intermediate parameter storing unit is used. On the other hand, when the scanner vector inverse matrix is computed, Step S307 and later branched steps (intermediate parameter computing unit) is executed to compute the scanner vector inverse matrix. A method for determining whether Step S304 or Step S307 is used will be described later.

When a determination has been made that the computation of the scanner vector inverse matrix is not executed, a previously determined scanner vector held, for example, in the ROM 716 is selected depending, for example, upon the color adjustment width for each hue determined at Step S302, an image quality mode, a color mode, negative/positive setting, and the type of a scanner (Step S304).

At Step S305, a scanner vector inverse matrix corresponding to the scanner vector selected at Step S304 is selected. Further, at Step S306, the hue angle of each hue is computed from the scanner vector selected at Step S304.

On the other hand, when a determination has been made that the computation of the scanner vector inverse matrix is executed, scanner vector inverse matrix parameters select or acquire scanner vectors, in which the inverse matrix has not been previously computed, depending upon the color adjustment width for each hue determined at Step S302 and image forming conditions such as an image quality mode, a color mode, negative/positive setting, and the type of a scanner (Step S307), and the hue angle of each hue is computed from the scanner vectors selected or acquired at Step S307 (Step S306).

At Step S308, a difference for each hue is determined based on the scanner vectors selected at Step S307.

When the difference exists, for each hue, the scanner vector inverse matrix is acquired and held (Step S309), and, for each hue, the results of acquisition of the scanner vector inverse matrix are read out (Step S310).

On the other hand, when no difference exists, for each hue, the results of acquisition of the scanner vector inverse matrix are read out (Step S310).

Finally, linear masking coefficients are determined from the printer vector selected and computed at Step S301, the scanner vector inverse matrix obtained at Step S305 or Step S310, and the hue angle obtained at Step S306 (Step S311).

The procedure has been explained in the order of the computation of the printer vector (Step S301), the selection of the scanner vector inverse matrix (Step S305), or the computation of the scanner vector inverse matrix (Steps S309 to S310). However, what is required here is that the printer vector, the scanner vector inverse matrix, and the hue angle are obtained before the execution of Step S311. Accordingly, the order of acquisition of the parameters may be exchanged. For example, the selection and computation of the printer vector at Step S301 may be executed after Step S305, Step S310, or Step S306. Alternatively, Step S301, Step S302 and later steps may be threaded to perform parallel execution or parallel computation processing.

The color correcting processing using the masking coefficients is executed by using the following equation (30).

$$\begin{pmatrix} Y(\text{hue}) \\ M(\text{hue}) \\ C(\text{hue}) \\ K(\text{hue}) \end{pmatrix} = \begin{pmatrix} aYB(\text{hue}) & aYG(\text{hue}) & aYR(\text{hue}) & aY(\text{hue}) \\ aMB(\text{hue}) & aMG(\text{hue}) & aMR(\text{hue}) & aM(\text{hue}) \\ aCB(\text{hue}) & aCG(\text{hue}) & aCR(\text{hue}) & aC(\text{hue}) \\ aKB(\text{hue}) & aKG(\text{hue}) & aKR(\text{hue}) & aK(\text{hue}) \end{pmatrix} \begin{pmatrix} B(\text{hue}) \\ G(\text{hue}) \\ R(\text{hue}) \\ 1 \end{pmatrix} \quad (30)$$

In this case, if necessary, for example, linear processing of the masking coefficient such as density adjustment or color balance adjustment is performed. In the following explanation, the term "dividing point" refers to a point at which the boundary plane crosses the side as in the point G (green) in FIG. 11. For example, when the hue is G (green), the following equation (31) is established.

$$\begin{pmatrix} Y(G) \\ M(G) \\ C(G) \\ K(G) \end{pmatrix} = \begin{pmatrix} aYB(G) & aYG(G) & aYR(G) & aY(G) \\ aMB(G) & aMG(G) & aMR(G) & aM(G) \\ aCB(G) & aCG(G) & aCR(G) & aC(G) \\ aKB(G) & aKG(G) & aKR(G) & aK(G) \end{pmatrix} \begin{pmatrix} B(G) \\ G(G) \\ R(G) \\ 1 \end{pmatrix} \quad (31)$$

Here the left edge P (hue) (P=C, M, Y, K; hue=hue R, G, B, Y, M, C, K, W, etc.) is referred to as a printer vector, the right edge S (hue) (S=B, G, R; hue=hue R, G, B, Y, M, C, K, W. etc.) is referred to as a scanner vector, and aPS (hue) (P=C, M, Y, K; S=B, G, R) is referred to as a linear masking coefficient for each hue.

In general, a linear masking coefficient aPS (hue) (P=Y, M, C, K; S=R, G, B, constant) in each shape is determined by previously determining R, G, and B values at four points in total, i.e., different two points (R1, G1, B1) and (R2, G2, B2) on an achromatic color axis as shown in FIG. 13 and two points (R3, G3, B3) and (R4, G4, B4) not on the achromatic color axis but on two boundary planes, and recorded values (C1, M1, Y1, K1), (C2, M2, Y2, K2), (C3, M3, Y3, K3), and (C4, M4, Y4, K4) in developing portions C, M, Y, and K best suited for the color reproduction, and performing the following computations.

$$\begin{pmatrix} aYB(3\text{-}4) & aYG(3\text{-}4) & aYR(3\text{-}4) & aY(3\text{-}4) \\ aMB(3\text{-}4) & aMG(3\text{-}4) & aMR(3\text{-}4) & aM(3\text{-}4) \\ aCB(3\text{-}4) & aCG(3\text{-}4) & aCR(3\text{-}4) & aC(3\text{-}4) \\ aKB(3\text{-}4) & aKG(3\text{-}4) & aKR(3\text{-}4) & aK(3\text{-}4) \end{pmatrix} = \quad (32)$$

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}^{-1}$$

This formula 32 is provided by multiplying formula 33 by formula 35, which is an inverse matrix of formula 34, to replace both the edges.

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} = \quad (33)$$

$$\begin{pmatrix} aYB(3\text{-}4) & aYG(3\text{-}4) & aYR(3\text{-}4) & aY(3\text{-}4) \\ aMB(3\text{-}4) & aMG(3\text{-}4) & aMR(3\text{-}4) & aM(3\text{-}4) \\ aCB(3\text{-}4) & aCG(3\text{-}4) & aCR(3\text{-}4) & aC(3\text{-}4) \\ aKB(3\text{-}4) & aKG(3\text{-}4) & aKR(3\text{-}4) & aK(3\text{-}4) \end{pmatrix}$$

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}$$

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix} \quad (34)$$

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}^{-1} \quad (35)$$

aXY(3-4) represents a masking coefficient established in a color area between a hue 3 and a hue 4, and the recorded values of C, M, Y and K at the respective points are an equivalent achromatic color density reduced value before under color removing (UCR).

Formula 35 may be conceptually expressed by (Linear masking coefficient established in color area between hue 3 and hue 4)=Printer vector matrix of hues 3 and 4)*(Scanner vector inverse matrix of hues 3 and 4).

For simplification of explanation, two points on the achromatic color axis are a white dot and a black dot. In this case, when the maximum value, which the equivalent achromatic color density reduced value can take, is Xmax, the following relationship is established among the values.

White dot: R1=G1=B1=C1=M1=Y1=0≧K1
Black dot: R1=G1=B1=C1=M1=Y1=Xmax≧K2

Two points on the boundary planes are preferably points at which the minimum value of the recorded values in the developing portions C, M, Y and K is zero (0), and the maximum value of the recorded values is Xmax, that is, points at which recording on each boundary plane is possible and the chroma is highest. That is, Min(C3, M3, Y3)=0≧K3
Max(C3, M3, Y3)=Xmax
Min(C4, M4, Y4)=0≧K4
Max(C4, M4, Y4)=Xmax are established.

The percentage UCR can also be controlled by determining the recorded value of the developing portion K from the minimum value among the values in the developing portions C, M, and Y, for example, as follows.

Where UCR=100%: K=Min(C, M, Y)
Where UCR=70%: K=Min(C, M, Y)×0.7

As shown in FIG. 11, when the color space (R, G, B) is divided at six boundary planes, R, G, and B, values of at least eight points in total, i.e., six points on the respective boundary planes and two points on the achromatic color axis, and recorded values of C, M, Y, and K in the developing portion best suited for the color reproduction are previously determined followed by the determination of a masking coefficient in each space based on them. A method may be adopted in which a masking coefficient in each space is previously determined as described above, the determined masking coefficients are stored, for example, in ROM or RAM, and, in the color correcting processing, a proper masking coefficient is selected depending upon the color determined in the hue determination for color correction.

The scanner vector inverse matrix on the right edge of formula (35) can be computed from the scanner vector matrix, for example, by a computing method using a cofactor developing matrix or a Gauss-Jordan method which is a more efficient computation method. Since, however, the computation amount is large and a lot of time is taken, computation for each scan sometimes disadvantageously results in lowered productivity during copy, for example, in continuous copying. A method for reducing a computation frequency to avoid this drawback will be explained. In this embodiment, depending upon a color mode and an image quality mode management, a difference management of the intermediate parameter (scanner vector inverse matrix) and a determination on whether computation results are used or a fixed parameter is used is properly performed, whereby the frequency of recomputation of the color correction parameter is reduced and an increase in a parameter computing speed and an improvement in color reproducibility can be simultaneously realized. Specific embodiments thereof will be explained.

At Step S303 in FIG. 17, as explained below, a determination on whether the scanner vector inverse matrix is computed or selected is made depending upon the image processing parameter. For example, switching is made between the computation of the scanner vector inverse matrix by applying a color mode, that is, the number of colors included in image data after color correction/UCR processing, as the image processing parameter, and the use of a fixed parameter that has been previously computed and stored in ROM.

When the image data after the color correction/UCR processing are "full-color output" in which the hue is successively varied, for example, in the order of YRMBCG in a rotating direction (a direction in which the hue angle varies) about the achromatic axis of the original (a direction in which the lightness varies), Step S308 and later steps in FIG. 17 are executed to perform the computation of the scanner vector inverse matrix.

On the other hand, when the image data after color correction/UCR processing are "monocolor output" in which the hue does not vary in the rotating direction about the achromatic axis of the original, the computation of the scanner vector inverse matrix is not executed and, in this case, the previously computed fixed parameter is selected. The reason for this is that, in the case of monocolor output, even when the scanner vector varies depending upon the color (hue angle or chroma) of the original, the degree of the change in hue of the image data after the color correction/UCR processing is small or an unnoticeable level, whereas, in the case of full-color output, the color of the image data after the color correction/UCR processing is significantly changed due to a change in scanner vector.

Even when the image data after the color correction/UCR processing are a color mode (a first two-color output) in which, for the achromatic color axis of the original, the density of a first single color (any one color of K (black), Y, M, C, R, G, B and intermediate colors) is varied depending upon the lightness while, for a direction in which the distance of the color of the original from the achromatic color axis is increased (chroma direction), a second single color (a color other than the first single color) is used to enhance the chroma, a previously computed fixed parameter may be used without the computation of the scanner vector inverse matrix. The reason for this is that, in a circumferential direction on the achromatic color axis of the original, the color of the image data after the color correction/UCR processing does not vary and the color of the image data after the color correction/UCR processing does not vary depending upon the scanner vector value.

A two-color output (for example, red-black mode output) may also be selected as another color output. Specifically, vermilion used in a red ink pad for seal impression or only a color of the original corresponding to red is output as "red (R)" in image data after the color correction/UCR processing, and colors in the original other than red are output as a different color such as "black (K)". This output is called "second two-color output" or "red-black mode output". In the "second two-color output" or "red black mode output", the computation of the scanner vector inverse matrix may be executed.

Figure 18:
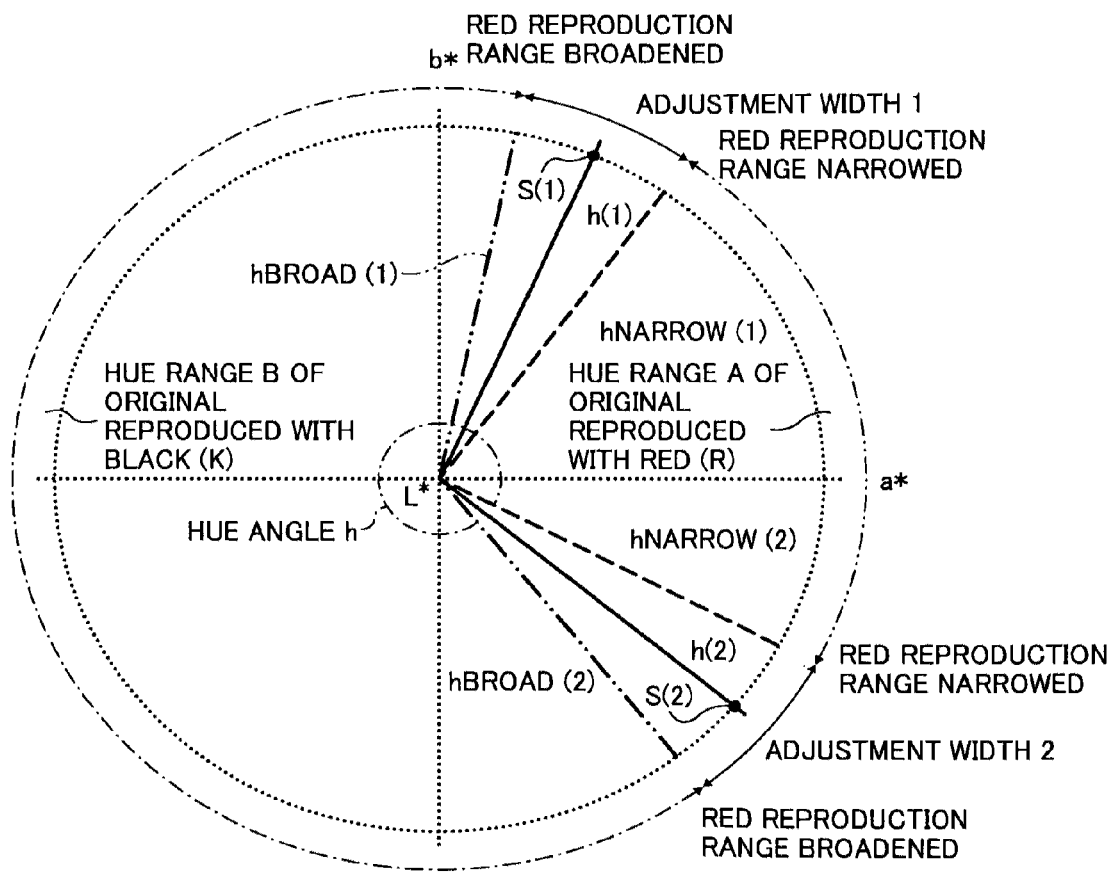
FIG. 18 is a typical diagram for explaining projection onto an a*b* plane.

FIG. 18 is a typical diagram for explaining projection onto an a*b* plane in color representation by a CIE-L*a*b* colorimetric system. The center of a circle shown in FIG. 18 represents an achromatic axis. h(1) and h(2) in FIG. 18 are hue boundary planes that specify a hue range A of the original reproduced by red (R) and a hue range B of the original reproduced by black (K). Scanner vectors S(1) and S(2) are present on the hue boundary planes h(1) and h(2). In other words, the hue boundary planes h(1) and h(2) are determined so as to include the scanner vectors S(1) and S(2). They are regulatable in an original color range A reproduced by "red (R)" in FIG. 18 and in an original color range B reproduced by "black (K)" by varying the scanner vector corresponding to the vermilion or red of each original. In this case, a multistage or continuous adjustment is possible by varying the scanner vector that specifies a color adjustment width 1 and a color adjustment width 2.

As explained in FIG. 17, when the scanner vector inverse matrix is not computed, only sets n of scanner vectors corresponding to the number n of previously computed scanner vector inverse matrixes may be selected. In FIG. 18, the hue boundary planes h(1) and h(2) have scanner vectors corresponding to hnarrow(1) and hnarrow(2) that most narrow the hue range A reproduced by read (R) and hbroad(1) and hbroad (2) that most broaden the hue range A of the original color reproduced by red (R), and scanner vector inverse matrixes corresponding to them. When a portion between hnarrow(1) and hbroad(1) is "adjustment width 1" while a portion between hnarrow(2) and hbroad(2) is "adjustment width 2", the n stages mean that adjustment can be performed in n stages including both ends of the adjustment widths 1 and 2, hnarrow(1) and hbroad(1), and hnarrow(2) and hbroad(2).

On the other hand, when Step S307 and later steps shown in FIG. 17 that compute the scanner vector inverse matrix are selected, continuously specifying a portion between the hue boundary planes hnarrow(1) and hbroad(1) and a portion between hnarrow(2) and hbroad(2) is possible by setting scanner vectors that specify the hue plane. Further, specifying a broader adjustment range or a narrower adjustment range in a portion between the hue boundary planes hnarrow(1) and hbroad(1) and a portion between the hue boundary planes hnarrow(2) and hbroad(2) is also possible by determining proper scanner vectors that specify the hue boundary planes.

Figure 19:
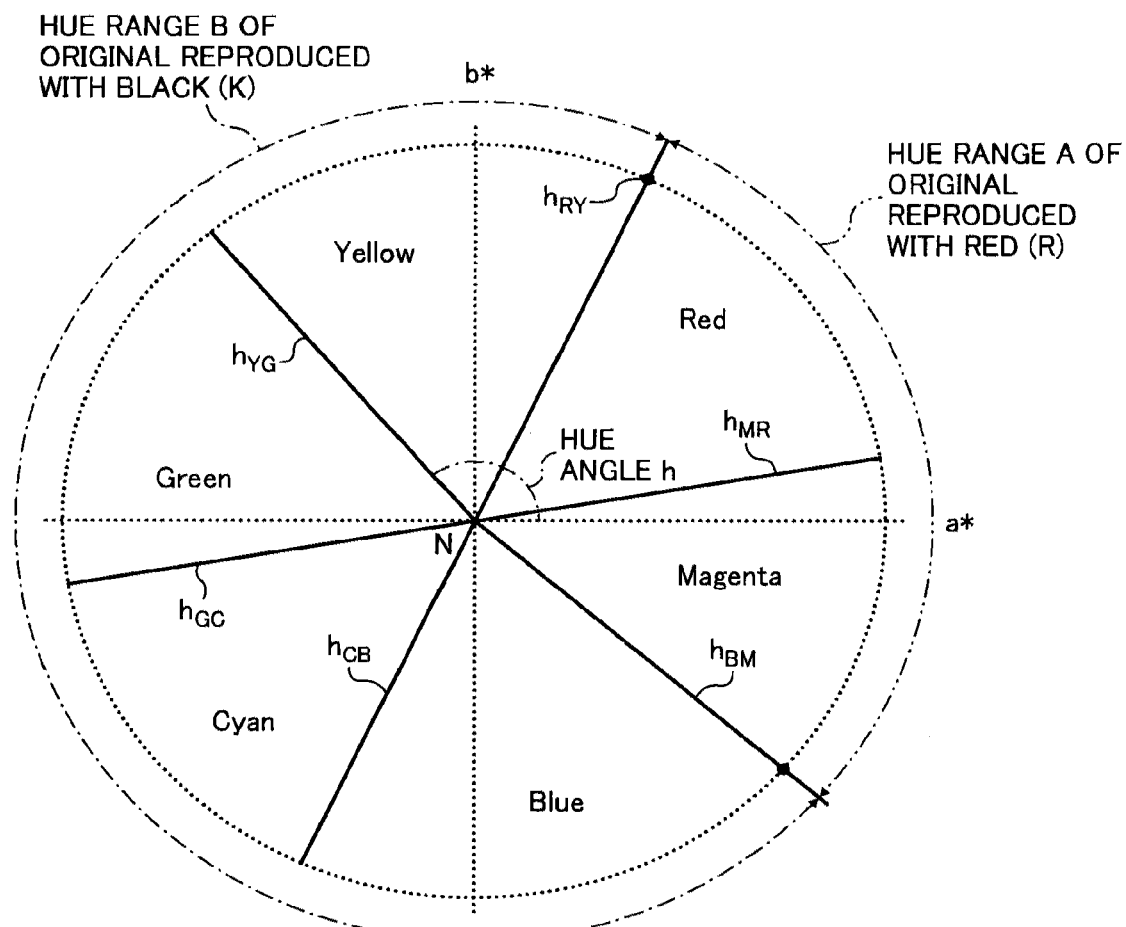
FIG. 19 is a typical diagram for explaining one example of hue divided planes.

FIG. 19 is a diagram for explaining one example of a hue divided plane. In FIG. 19, six hues of yellow, red, magenta, blue, cyan, and green and six hue divided planes of $h_{RY}$, $h_{MR}$, $h_{BM}$, $h_{CB}$, $h_{GC}$, and $h_{YG}$ are shown clockwise from a position of 12:00. In the second two-color mode (red-black mode), the six hues from yellow to green are reproduced by using red and magenta (red (R)), that is, a printer vector (Y, M, C, K)= (100%, 100%, 0%, 0%), and the remaining four hues are reproduced by using black (K)=(Y, M, C, K)=(0%, 0%, 0%, 100%). Accordingly, the hue red and the hue magenta are produced as an identical color, red (R), and, thus, the computation of the scanner vector indicating the boundary plane $h_{MR}$ and the scanner vector inverse matrix is not always necessary. In this case, the fixed scanner vector obtained by Step S304 and later steps in FIG. 17 and the scanner vector inverse matrix are used. Likewise, also for scanner vectors indicating a hue boundary plane $h_{CB}$ between the hue blue and the hue cyan, a hue boundary plane $h_{GC}$ between the hue cyan and the hue green, a hue boundary plane $h_{YG}$ between the hue green and the hue yellow, the fixed scanner vector and the scanner vector inverse matrix obtained at Step S304 and later steps in FIG. 17 are used. Regarding the scanner vector indicating the boundary plane $h_{RY}$ between the hue yellow and the hue red, and the scanner vector indicating the boundary plane $h_{BM}$ between the hue magenta and the hue blue, the scanner vector and the scanner vector inverse matrix obtained at Step S307 and later steps in FIG. 17 are used to suppress the computation amount and the computation time required when the scanner vector inverse matrix is computed and when the scanner vector inverse matrix is not computed for each hue and, as described above, to realize adjustment that meets user's preferences.

Figure 20:
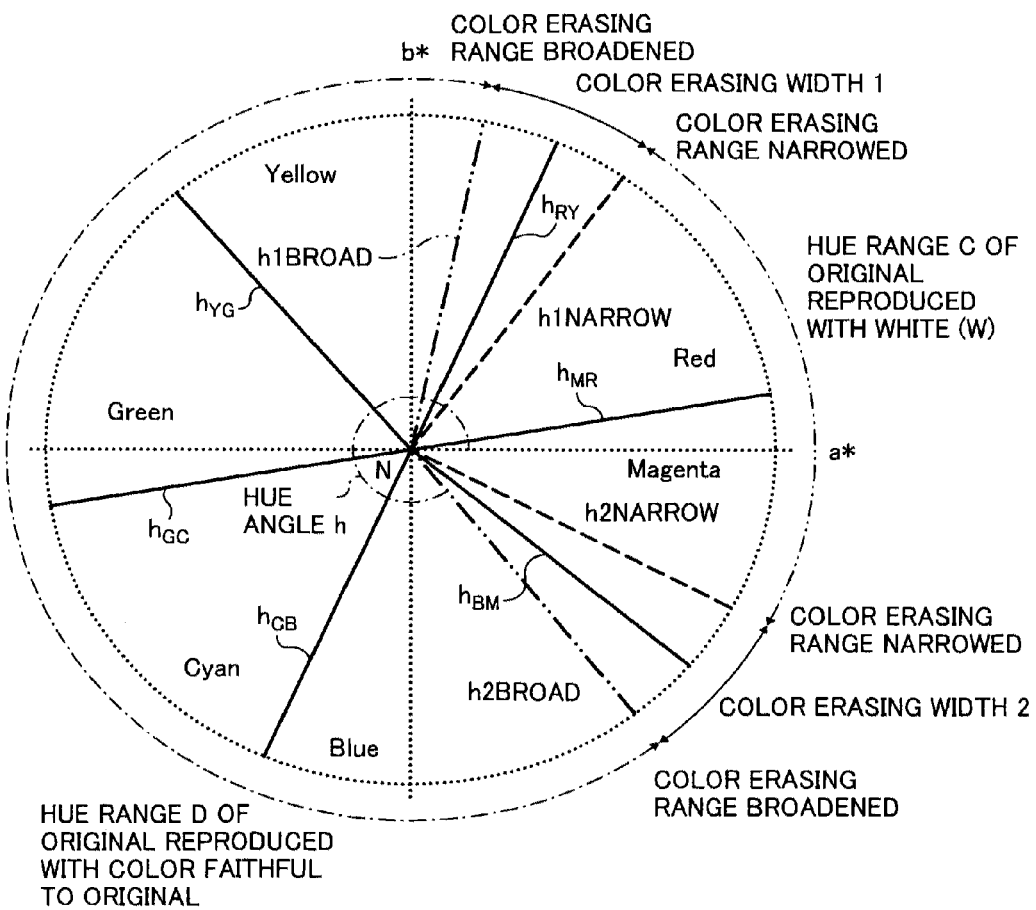
FIG. 20 is a typical diagram for explaining one example of color erasing.

Here FIG. 20 is a diagram for explaining an example of color erasing. The same processing as in FIG. 18 can be applied to color erasing in FIG. 20 by rewording the "HUE RANGE A OF ORIGINAL REPRODUCED WITH RED (R)" as "HUE RANGE C OF ORIGINAL REPRODUCED WITH WHITE (W)" and rewording the "HUE RANGE B OF ORIGINAL REPRODUCED WITH BLACK (K)" as "HUE RANGE D OF ORIGINAL REPRODUCED WITH COLOR FAITHFUL TO ORIGINAL".

In addition, a configuration may be adopted in which, at Step S303 in FIG. 17, when the original is subjected to color reverse processing followed by color correction/UCR processing and then "negative output", processing at Step S304 and later steps in FIG. 17, in which the scanner vector inverse matrix is not performed, is performed, while, when the original is not subjected to color reverse processing and color correction/UCR processing is performed followed by "positive output", processing at Step S307 and later steps in FIG. 17, in which the scanner vector inverse matrix is computed, is performed. The reason why the configuration is adopted is that, due to the color reverse processing, the white texture portion of an original is expressed in black in a copy, making it difficult to distinguish the hue boundary, whereby adjustment is sometimes unnecessary.

Various types of originals exist depending upon materials and methods for color development. In color copying machines, the types of originals, which are reproduced in a way different from the human eye due to the color sensitivity of image reading units, which separate colors, for example, CCD, a contact image sensor (CIS) or a complementary metal-oxide semiconductor (C-MOS) as an eye and metamerism, should be discriminated.

Examples of originals include print originals (originals produced using process inks for printing), originals using photographic papers, copy originals (originals of which the color has been reproduced with toners), and ink jet originals (dye inks and pigment inks). Further, also for originals using highlighters, markers, and color pencils, and print originals, various originals exist such as map originals, which are print originals using special colors other than YMCK used in ordinary printing, and vehicle inspection certificate. In order to provide higher color reproducibility for copies of the originals, preferably, for each original type, (linear) masking coefficients are computed using an optimized scanner vector and a scanner vector inverse matrix obtained therefrom.

For original types that require adjustment for more faithful reproduction of the originals, the computation of the scanner vector inverse matrix at Step S307 and later steps in FIG. 17 is performed. On the other hand, for original types that already can provide color reproducibility satisfactory for a user with preset parameters, previously computed scanner vector and scanner vector inverse matrix as provided at Step S304 and later steps in FIG. 17 can be used.

When simultaneous reading of both sides of an original particularly with respective different reading devices, for example, with CCD for one side and with CIS for the other side, is contemplated, the different devices are generally different from each other in spectral sensitivity. Therefore, the use of scanner vectors and scanner vector inverse matrixes optimal for respective devices is preferred. For this reason, the difference management at Step S308 in FIG. 17 is performed for each device.

The difference management at Step S308 in FIG. 17 will be explained.

As expressed in formula (35), the scanner vector inverse matrix for use in each hue is a scanner vector inverse matrix determined from four scanner vectors, i.e., two scanner vectors on adjacent hue boundary planes and scanner vectors of white (W) and black (K).

This will be explained with reference to FIG. 19. Regarding scanner vectors for use in the hue Red in an original, a scanner vector inverse matrix determined from four in total of scanner vectors, i.e., two scanner vectors indicating hue boundary planes $h_{RY}$ and $h_{MR}$ and scanner vectors indicating white (W) and black (K), which are different from each other in lightness, on an achromatic axis N, is used. This is true of other hues.

For example, in practical use, when the scanner vectors of white (W) and black (K) are fixed, if two scanner vectors indicating the hue boundary planes $h_{RY}$ and $h_{MR}$ remain unchanged from values used for the determination of the previous scanner vector inverse matrix, then the recomputation of the scanner vector inverse matrix is not necessary. Accordingly, when the previously computed values are stored, the time for recomputation can be saved. For hues other than the hue Red, whether the recomputation is necessary can be determined in the same manner as described above. Thus, only recomputation for necessary hues is necessary, contributing to saving of the computation time.

On the other hand, the color conversion UCR processing circuit 709 performs color correcting processing by computation using the following formulae.

$Y'=Y-\alpha \cdot \min(Y,M,C)$ $M'=M-\alpha \cdot \min(Y,M,C)$ $C'=C-\alpha \cdot \min(Y,M,C)$ $Bk=\alpha \cdot \min(Y,M,C)$ In the formulae, $\alpha$ represents a coefficient that determines the amount of UCR. When $\alpha=1$, 100% UCR processing is performed. $\alpha$ may be a constant value. For example, in a high density portion, $\alpha$ is close to 1. When $\alpha$ is brought to a value close to 0 (zero) in a highlight portion (a low image density portion), an image in its highlight portion can be rendered smooth.

The masking coefficient is different for each of 14 hues, i.e., 12 hues obtained by further dividing each of six hues of RGBYMC into two hues and black and white.

The hue determining circuit 708 determines the hue to which image data read with the scanner unit 300 belong, and outputs the results of determination to the color conversion UCR processing circuit 709.

The color conversion UCR processing circuit 709 selects, based on the results of determination by the hue determining circuit 708, selects a masking coefficient for each hue and performs the color correcting processing.

The magnification circuit 711 performs horizontal and vertical magnifications of image data subjected to color correcting processing, and the image processing (creation) circuit 712 performs repeat processing and the like of the image data subjected to the magnification processing and outputs the processed data to the image processing printer γ converting circuit 713.

The image processing printer γ converting circuit 713 performs the correction of image signals depending upon image quality modes such as characters and photographs and can simultaneously perform, for example, texture skipping. The image processing printer γ converting circuit 713 has a plurality of (for example, ten) gradation conversion tables (image signal conversion table), which can be switched according to an area signal generated by the image processing circuit 712, selects gradation conversion tables optimal for respective originals such as characters, silver salt photographs (photographic papers), print originals, ink jet originals, highlighters, maps, and thermal transfer originals from a plurality of image processing parameters, performs image signal correction depending upon the image quality mode, and outputs the results to the gradation processing circuit 714.

The gradation processing circuit 714 performs dither processing of image data input from the image processing printer γ converting circuit 713 and outputs the processed image data to the interface selector 721 in the printer unit 100.

The gradation processing circuit 714 can select dither processing of any desired size from dither-free processing of 1×1 to dither processing of pixels of m×n, where m and n are each a positive integer, and performs dither processing, for example, using pixels up to 36 pixels. Dither sizes using all the 36 pixels include, for example, 36 pixels in total of 6 pixels in main scanning direction×6 pixels in vertical scanning direction, or 36 pixels in total of 18 pixels in main scanning direction×2 pixels in vertical scanning direction.

FIG. 21 is a diagram for explaining an example in which 36 pixels in total of 6 pixels in main scanning direction×6 pixels in vertical scanning direction are used in dither processing.

FIG. 21A shows pixel numbers, FIG. 21B an index table, and FIGS. 21C to 21E gradation processing tables of 2 pixels in main scanning direction×2 pixels in vertical scanning direction. The index table is a table recording a relationship between the pixels and a gradation table number applied to the pixels. The index table and the gradation processing table exist as a temporary memory called a resister within the gradation processing circuit 714. The set values in the index table and the gradation processing table are controlled by the CPU 715. The abscissa in the gradation processing table represents an image signal input into the pixel, and the ordinate represents an output value from the pixel. The gradation processing table in FIG. 21C shows three tables of T1, T2, and T3. Tables T1 and T2 are common to the gradation processing tables in FIGS. 21C and 21D, and tables T4 and T5 are different from the tables in FIG. 21C. The gradation processing table in FIG. 21E shows tables T6, T7, and T3. The table T3 is identical to the table T3 in the gradation processing table in FIG. 21C.

Figure 22:
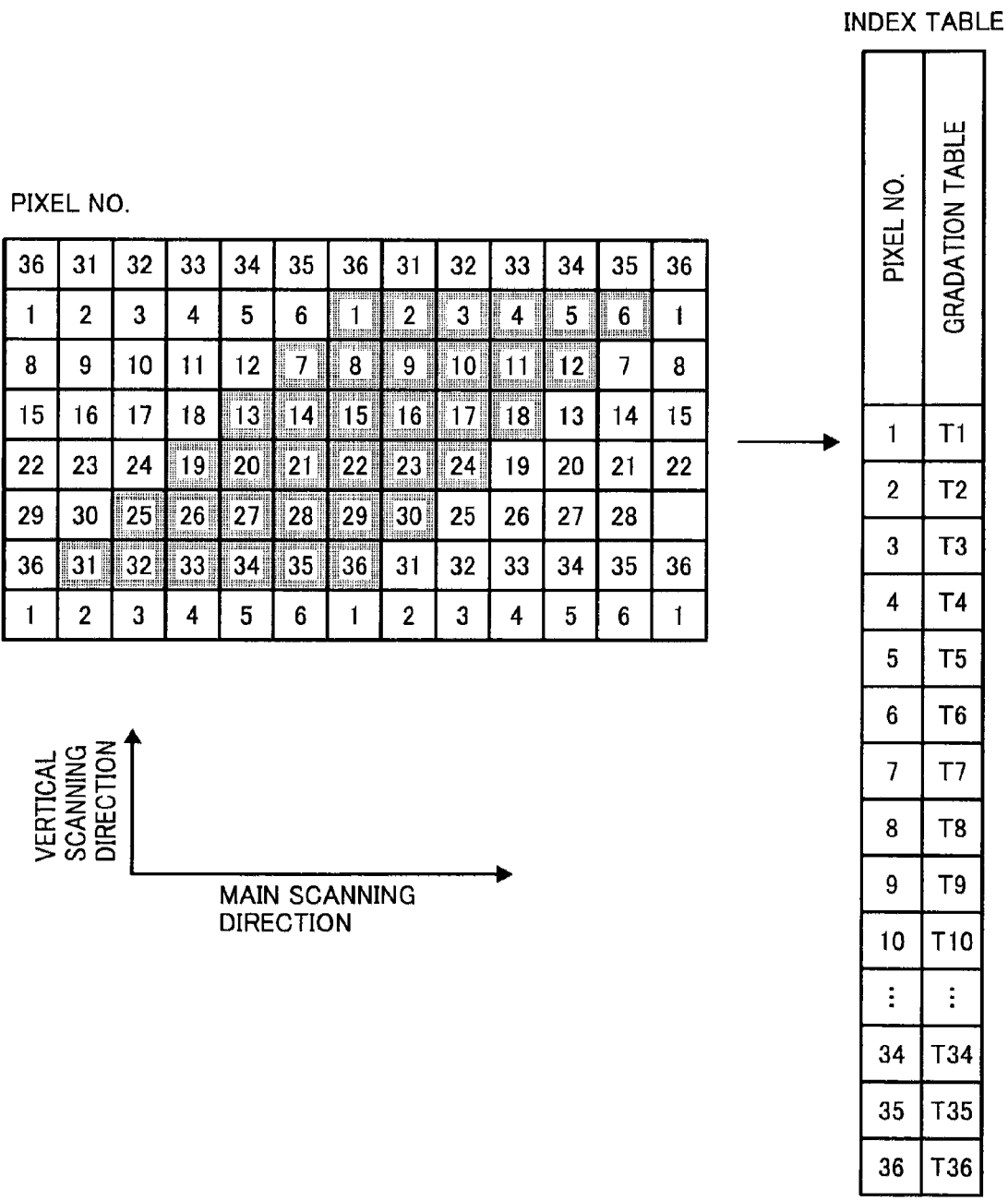
FIG. 22 is a typical diagram for explaining an example of an index table.

FIG. 22 is a diagram for explaining an example in which values are set so that the pixel number is shifted by one pixel in the main scanning direction. In addition, setting may be performed so that the pixel number is shifted in the vertical scanning direction although this is not shown. Setting of the shift level in the main scanning direction and the shift level in the vertical scanning direction can realize setting of gradation processing in which the screen angle is different for each color of YMCK.

Figure 23:
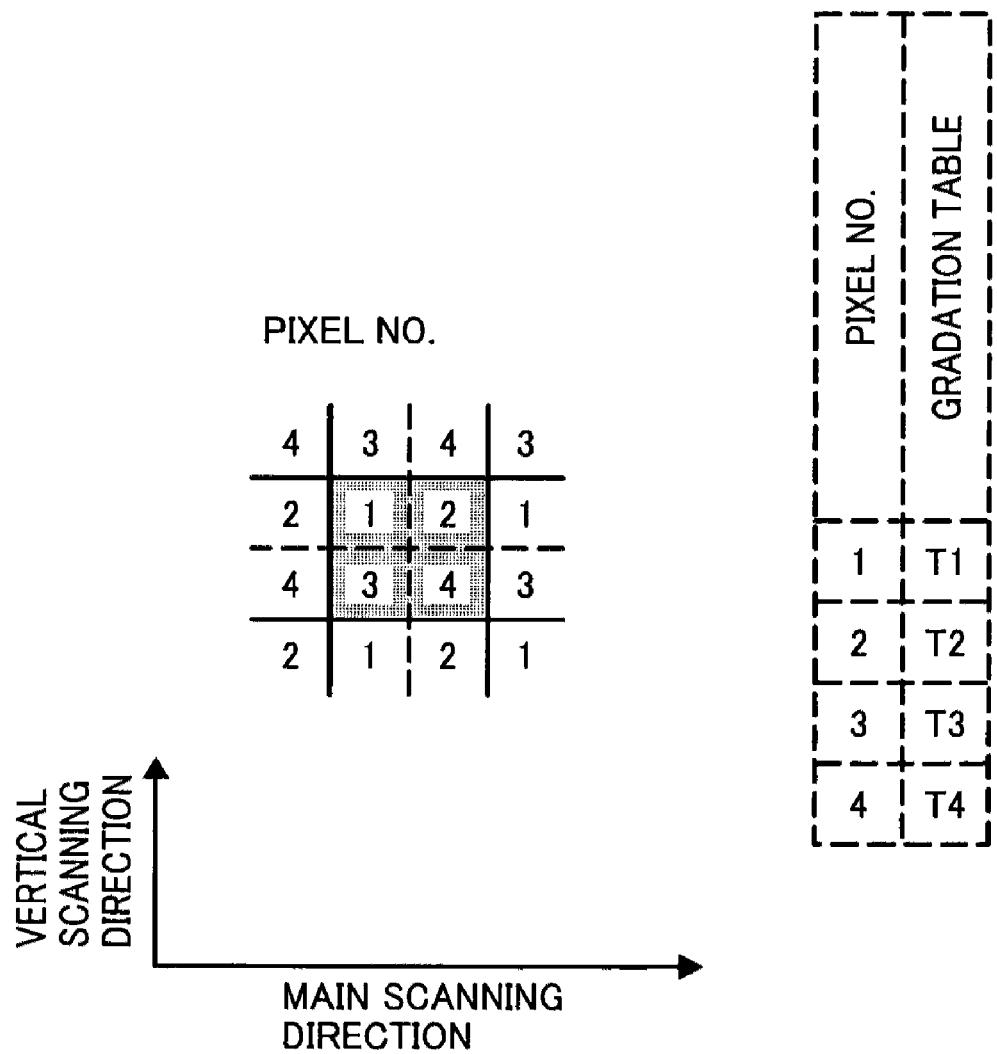
FIG. 23 is a typical diagram for explaining an example of an index table.

FIG. 23 is a diagram for explaining an example of an index table corresponding to dither of 2 pixels in main scanning direction×2 pixels in vertical scanning direction. Regarding the output of gradation processing circuit, in order to halve the pixel frequency, the image data bus has a 16-bit width (two 8-bit image data) so that two-pixel data can be simultaneously transmitted to the printer unit 100.

As described above, the printer unit 100 is connected to IPU 612 through the I/F selector 721. The I/F selector 721 has a switching function between the output of image data read with the scanner unit 300 for processing, for example, with an external image processing device and the output of image data from an external host computer 740 or image processing device by the printer unit 100. The image data from the external host computer 740 is input into the I/F selector 721 through a printer controller 741.

The image forming printer γ (process control γ) correcting circuit 723 converts the image signals from the I/F selector 721 using the gradation conversion table (image signal conversion table) and outputs the results to a laser modulating circuit in the printer engine 724.

As described above, image signals from the host computer 740 are input into the I/F selector 721 through the printer controller 741 and are subjected to gradation conversion by the image forming printer γ correcting circuit 723, followed by image formation with the printer engine 724. Thus, the color copying apparatus 1 can be utilized as a printer.

In the color copying apparatus 1, the CPU 715 controls each unit in IPU 612 while utilizing the RAM 717 as a work memory based on a program within the ROM 716 to execute the image processing. The CPU 715 is connected to the system controller 600 through the serial I/F. Upon the transmission of commands such as an image quality mode, density information, and area information, for example, from the operating unit 500 through the system controller 600, the CPU 715 sets various parameters in IPU 612 based on the image quality mode, the density information, and the area information to perform image processing.

The pattern generating unit 710 in IPU 612 and the pattern generating unit 722 in IPU 612 in the printer unit 100 respectively generate a gradation pattern for use in IPU 612 and a gradation pattern for use in the printer unit 100.

Figure 24:
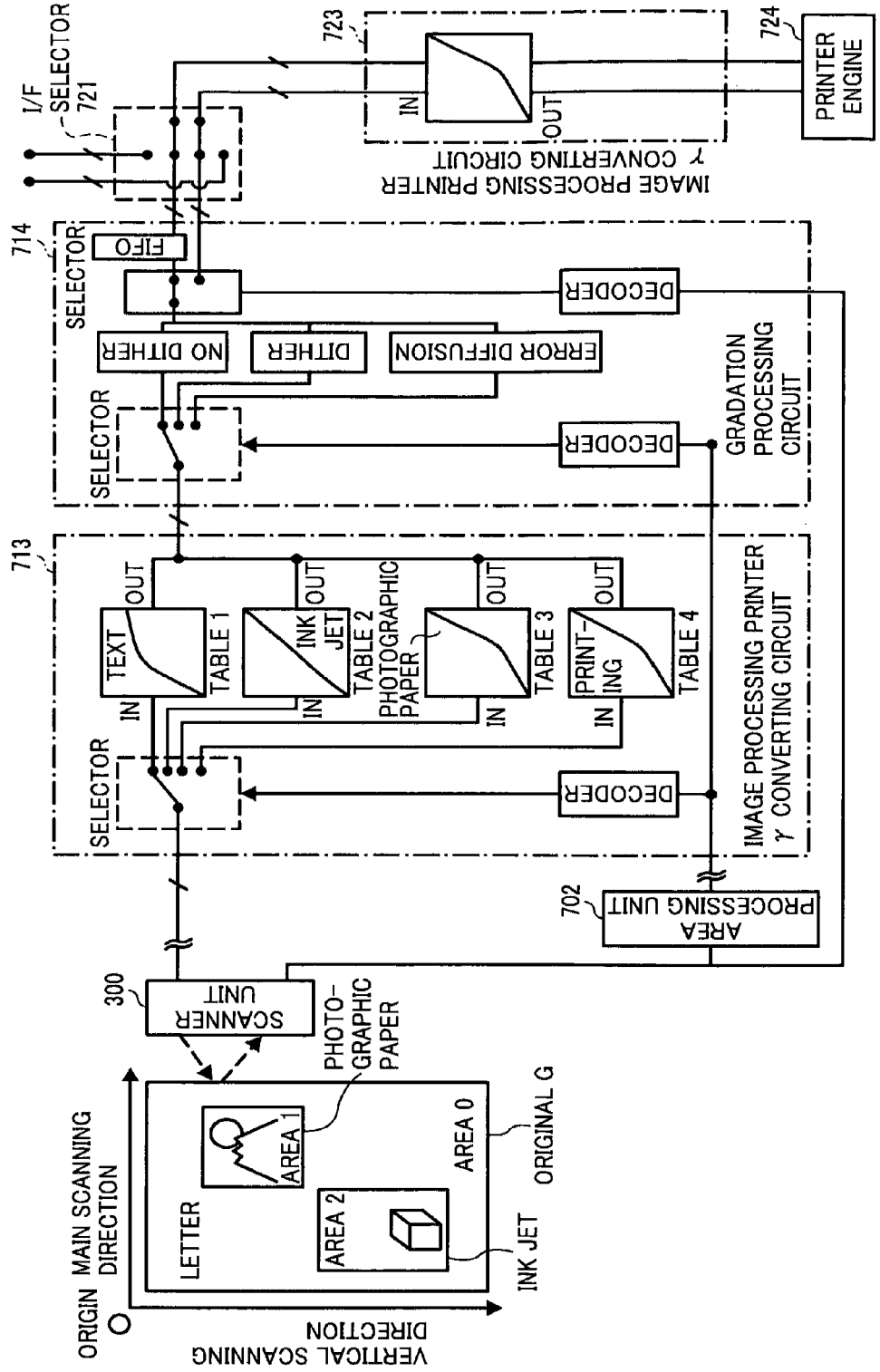
FIG. 24 is a conceptual diagram for explaining area processing in an area processing unit shown in FIG. 6.

As described above, the area processing unit 702 generates an area signal that discriminates an area, within an original G, to which image data being currently processed belong. Parameters for use in later image processing are switched by the area signal. The concept of area processing in the area processing unit 702 may be shown in FIG. 24. Specifically, in FIG. 24, for image data obtained by reading the original G having a plurality of areas such as a character area (area 0), a photographic paper area (area 1), ink jet area (area 2) with the scanner unit 300, the area processing unit 702 compares designated area information on the original G with reading position information in the reading of the image and generates an area signal. As shown in FIG. 24 about the image processing printer γ converting circuit 713 and the gradation processing circuit 714, IPU 612 changes, based on the area signal from the area processing unit 702, parameters for use in the scanner γ converting unit 703, the MTF filter 707, the color conversion UCR processing circuit 709, the image processing circuit 712, the image processing printer γ converting circuit 713, and the gradation processing circuit 714.

For example, the image processing printer γ converting circuit 713 decodes the area signal from the area processing unit 702 with a decoder, and a table is selected by a selector from a plurality of gradation conversion tables such as a character (table 1), an ink jet (table 2), a photographic paper (table 3), and a print (table 4). The original G in FIG. 24 is an example in which the area 0 as the character, the area 1 as the photographic paper, and the area 2 as the ink jet exist. The image processing printer γ converting circuit 713 selects the gradation conversion table 1 for the area 0 as the character, the gradation conversion table 3 for the photographic paper for the area 1 as the photographic paper, and the gradation conversion table 2 for ink jet for the area 2 as the ink jet.

For the image signals subjected to gradation conversion by the image processing printer γ converting circuit 713, the gradation processing circuit 714 allows, based on signals obtained by decoding the area signals with a decoder, the selector 2 to again perform switching to gradation processing to be used, such as processing not using dither, processing using dither, and error diffusion processing. The gradation processing circuit 714 performs error diffusion processing for the ink jet original G or the ink jet area in the original G.

In the gradation processing circuit 714, the image signals subjected to gradation processing are selected by the decoder as a line 1 or a line 2 based on the reading position information. The selection of the line 1 or the line 2 is switched for each one different pixel in the vertical scanning direction. The gradation processing circuit 714 temporarily stores data in the line 1 in a first in first out (FIFO) memory located on the downstream of the selector and outputs the data in the line 1 and the line 2, whereby output to the I/F selector 721 can be realized in such a state that the pixel frequency is halved.

Figure 25:
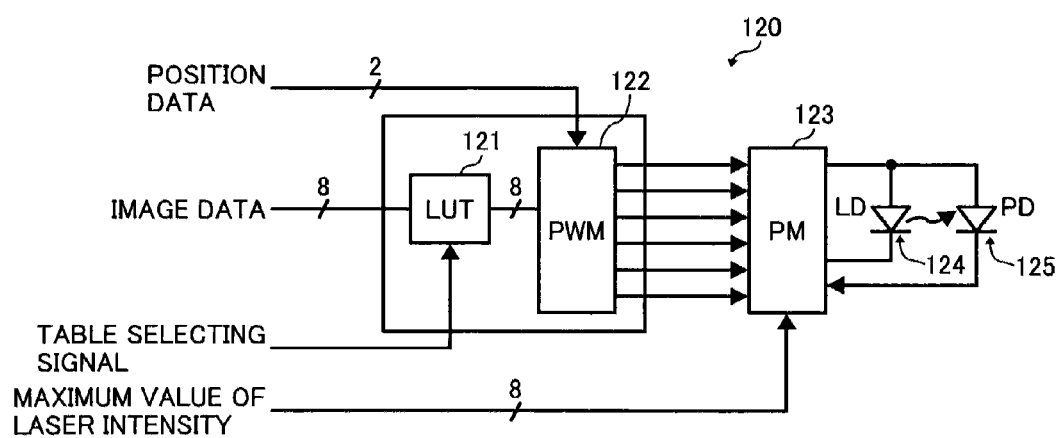
FIG. 25 is a block diagram for explaining a laser modulating circuit in a printer unit provided in the color copying apparatus shown in FIG. 2.

In the color copying apparatus 1, a laser modulating circuit 120 as shown in FIG. 25 is provided in the laser optical system 106 in the printer unit 100. The laser modulating circuit 120 includes a look-up table (LUT) 121, a pulse width modulating circuit (PWM) 122, and a power modulating circuit (PM) 123. The write frequency in the laser modulating circuit 120 is 18.6 [MHz], and the scanning time for one pixel is 53.8 [nsec].

Eight-bit image data are input into the look-up table (LUT) 121. The look-up table (LUT) performs γ conversion of the input image data and outputs the converted data to the pulse width modulating circuit (PWM) 122. The pulse width modulating circuit (PWM) 122 performs conversion of the pulse width to eight-value pulse width based on a high-three bit signal in an eight-bit image signal input from the look-up table (LUT) 121 and outputs the data to the power modulating circuit (PM) 123. The power modulating circuit (PM) 123 performs 32-value power modulation in low five bits. A laser diode (LD) 124 and a photodetector (PD) 125 are connected to the power modulating circuit (PM) 123. The power modulating circuit (PM) 123 emits light from the laser diode (LD) 124 based on the modulated signal and corrects one dot by one dot while monitoring the light emission intensity of the laser diode (LD) 124 based on monitor signals from the photodetector (PD) 125. The maximum value of the intensity of a laser beam emitted from the laser diode (LD) 124 is variable in eight bits (256 steps) independently of the image signal.

The beam diameter of a laser beam, emitted from the laser diode (LD) 124, relative to the size of one pixel in the main scanning direction (defined as a beam width when the intensity of the beam during rest has been reduced to $1/e^2$ of the maximum value) is 50 [μm] in the main scanning direction and 60 [μm] in the vertical scanning direction under conditions of 600 dots per inch (DPI) and one pixel 42.3 [μm].

The laser modulating circuit 120 is provided for each of the image data in the line 1 and the image data in the line 2 explained in conjunction with FIG. 24. The image data in the line 1 and the image data in the line 2 are synchronized with each other and are scanned on the photoreceptor drums 104K to 104C in parallel with the main scanning direction.

Figure 26:
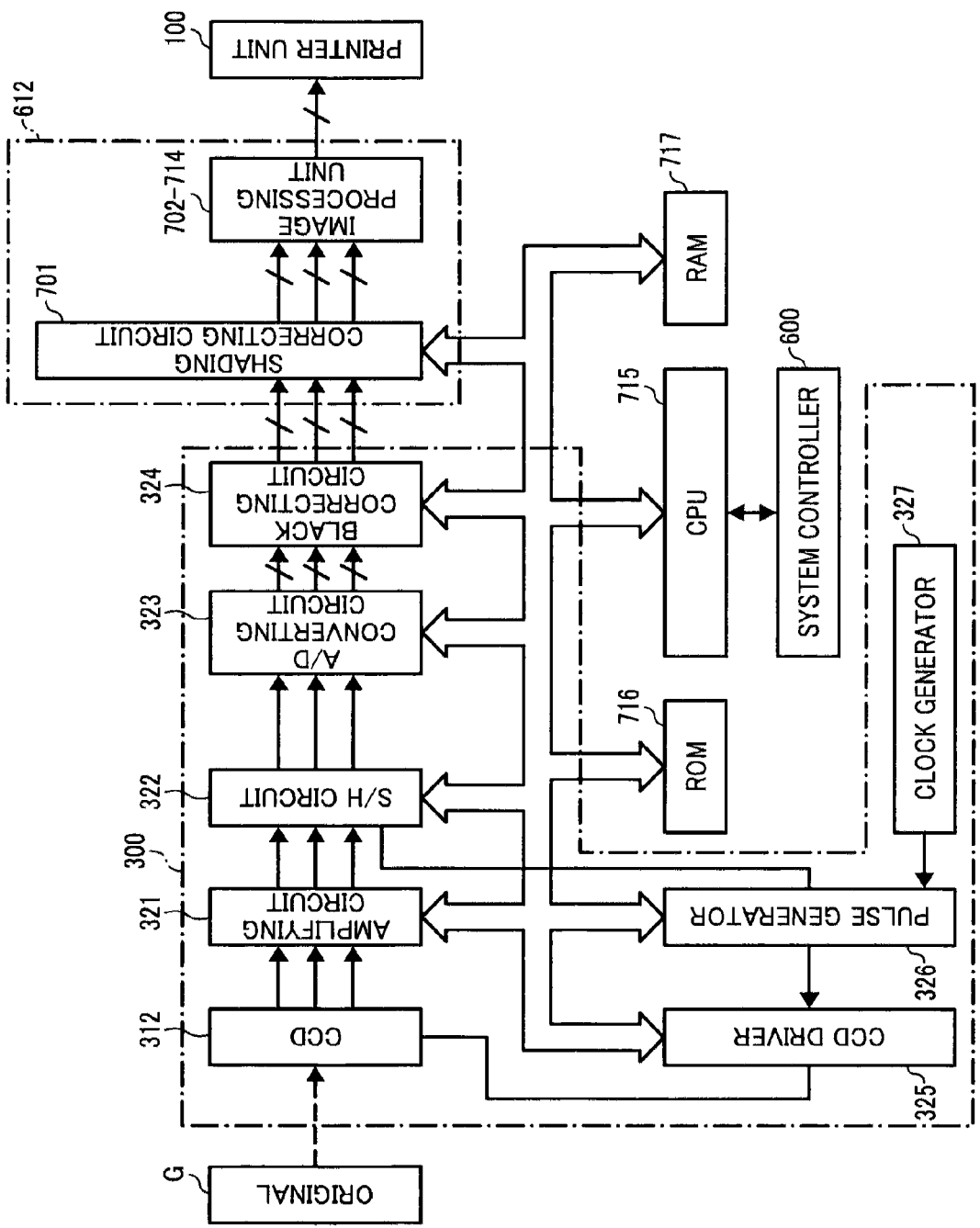
FIG. 26 is a block diagram for explaining a configuration of a circuit in a scanner unit shown in FIG. 2.

The scanner unit 300 has a circuit block configuration as shown in FIG. 26 and includes the CCD 312, an amplifying circuit 321, a sample hold (S/H) circuit 322, an A/D converting circuit 323, a black correcting circuit 324, a CCD driver 325, a pulse generator 326, and a clock generator 327.

In the scanner unit 300, light is applied from the halogen lamp 302 shown in FIG. 3 to the original G. Light reflected from the original G is subjected to color separation through an RGB filter in CCD 312 to read an image in the original G with CCD 312. Analog image signals are output from CCD 312 to the amplifying circuit 321. The CCD driver 325 supplies pulse signals that drive CCD 312. A pulse source necessary for driving CCD driver 325 is generated by the pulse generator 326. The pulse generator 326 generates pulse signals using, as a reference signal, a clock signal oscillated by the clock generator 327 formed of a crystal oscillator or the like and supplies, to the S/H circuit 322, timing signals necessary for the sample holding of image signals from CCD 312 by the S/H circuit 322.

The amplifying circuit 321 amplifies the analog image signals from CCD 312 to a predetermined level and outputs the amplified signals to the S/H circuit 322. The S/H circuit 322 performs sample holding of the image signals from the amplifying circuit 321 and outputs the image signals to the A/D converting circuit 323. The A/D converting circuit 323 digitizes the analog image signals subjected to sample hold in the S/H circuit 322, for example, to eight-bit signals and outputs the eight-bit signals to the black correcting circuit 324. The black correcting circuit 324 reduces a fluctuation in a black level (an electric signal when the quantity of light is small) between chips in CCD 312 or between pixels for image data subjected to digital conversion in the A/D converting circuit 323 to prevent the occurrence of streaks or unevenness in a black portion in the image followed by output to the shading correcting circuit 701 in IPU 612.

Figure 27:
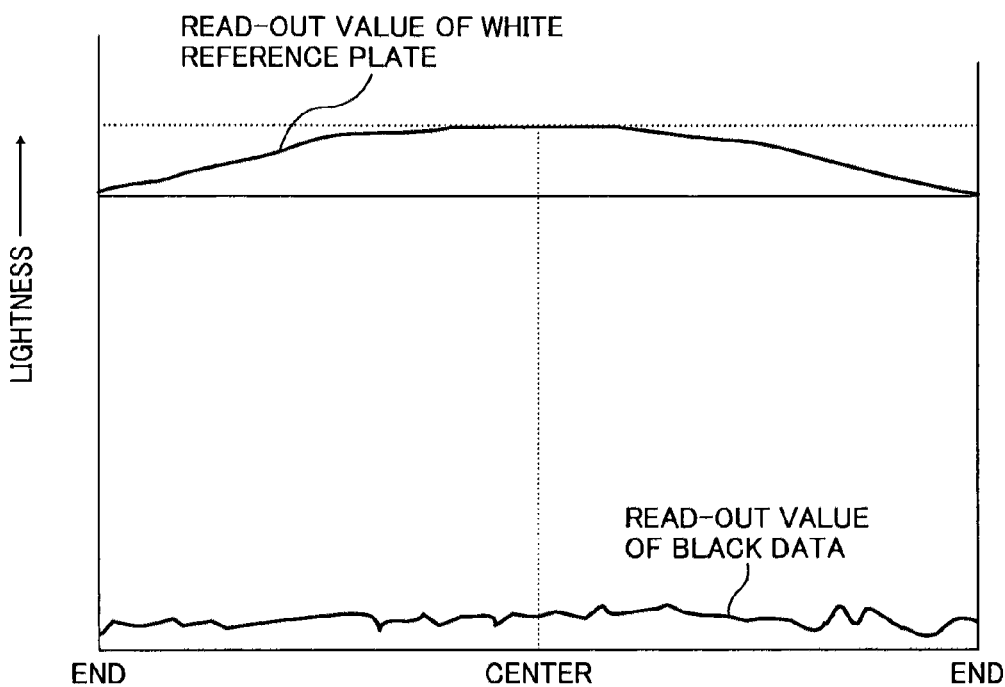
FIG. 27 is a graph for explaining the concept of white correction and black correction by a shading correcting circuit shown in FIG. 26.

As described above, the shading correcting circuit 701 corrects a white level (an electric signal when the quantity of light is large) and, as shown in FIG. 27, corrects the white level by correcting a fluctuation in sensitivity of an illuminating system, an optical system, and CCD 312 based on white color data when the scanner unit 300 has been moved to an even white reference plate before the irradiation.

The image signals from the shading correcting circuit 701 are processed in an image processing unit from the area processing unit 702 to the gradation processing circuit 714 in IPU 612 and are recorded and output by the printer unit 100. Each of the above circuits is controlled by the CPU 715 based on programs and data within the ROM 716 and the RAM 717.

Figure 28:
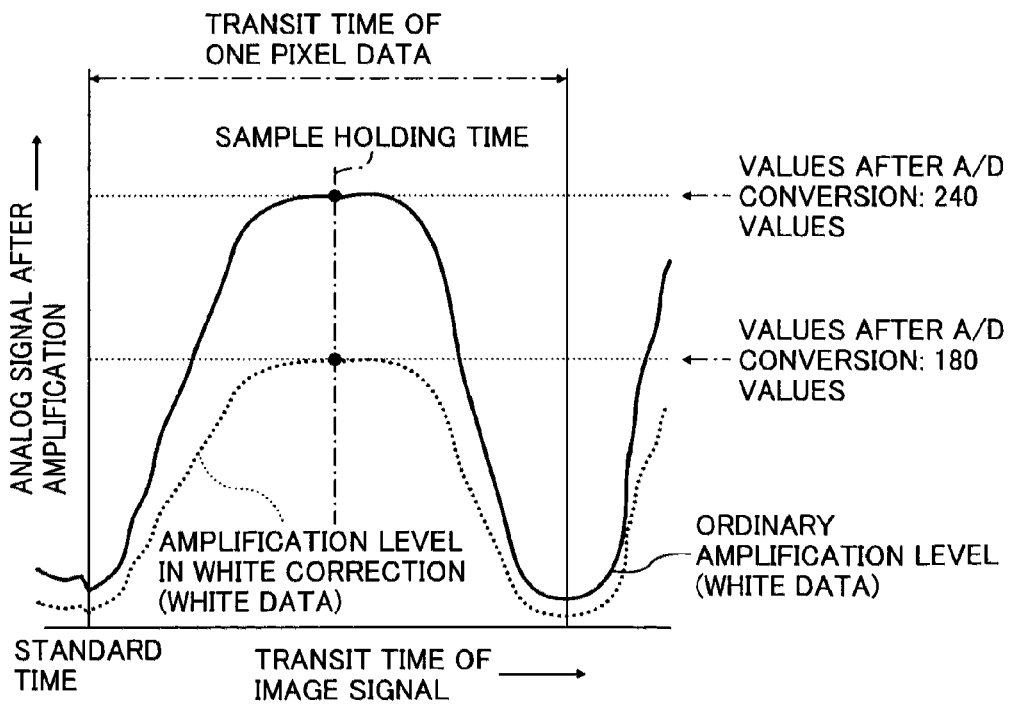
FIG. 28 is a graph for explaining sample holding processing of read signals by a sample and hold (S/H) circuit shown in FIG. 6.

The amplification amount in the amplifying circuit 321 is determined so that, for a certain specific density of the original, the output value of the A/D converting circuit 323 is a desired value. For example, in ordinary copying, the amplification is performed so that a density of the original of 0.05 (reflectance 0.891) is obtained as 240 values in terms of eight-bit signal values. In the shading correction, the amplification level is lowered to enhance the sensitivity of shading correction. The reason for this is that, in the amplification level in the ordinary copying, when the amount of the reflected light is large, images signals having a size greater than 255 values in terms of eight-bit signals result in saturation at 255 values, and, consequently, errors occur in the shading correction. Specifically, FIG. 28 is a typical graph for explaining sample holding of image read signals amplified with the amplifying circuit 321 by the S/H circuit 322, wherein the abscissa represents the time necessary for the amplified analog image signal to transit through the S/H circuit 322 while the ordinate represents the magnitude of the amplified analog image signal. The analog signals are subjected to sample holding for a predetermined sample holding time shown in FIG. 28 and are sent to the A/D converting circuit 323. FIG. 28 is a graph for explaining an example in which, for image signals, after the amplification, obtained by reading the white level, in copying, for example, the value after the A/D conversion is 240 values in ordinary data and is 180 values in the white correction.

Next, the function according to the embodiment will be explained. The color copying apparatus 1 according to the embodiment previously executes scanner calibration, which will be explained later, at least once in using the connecting output function.

Figure 29:
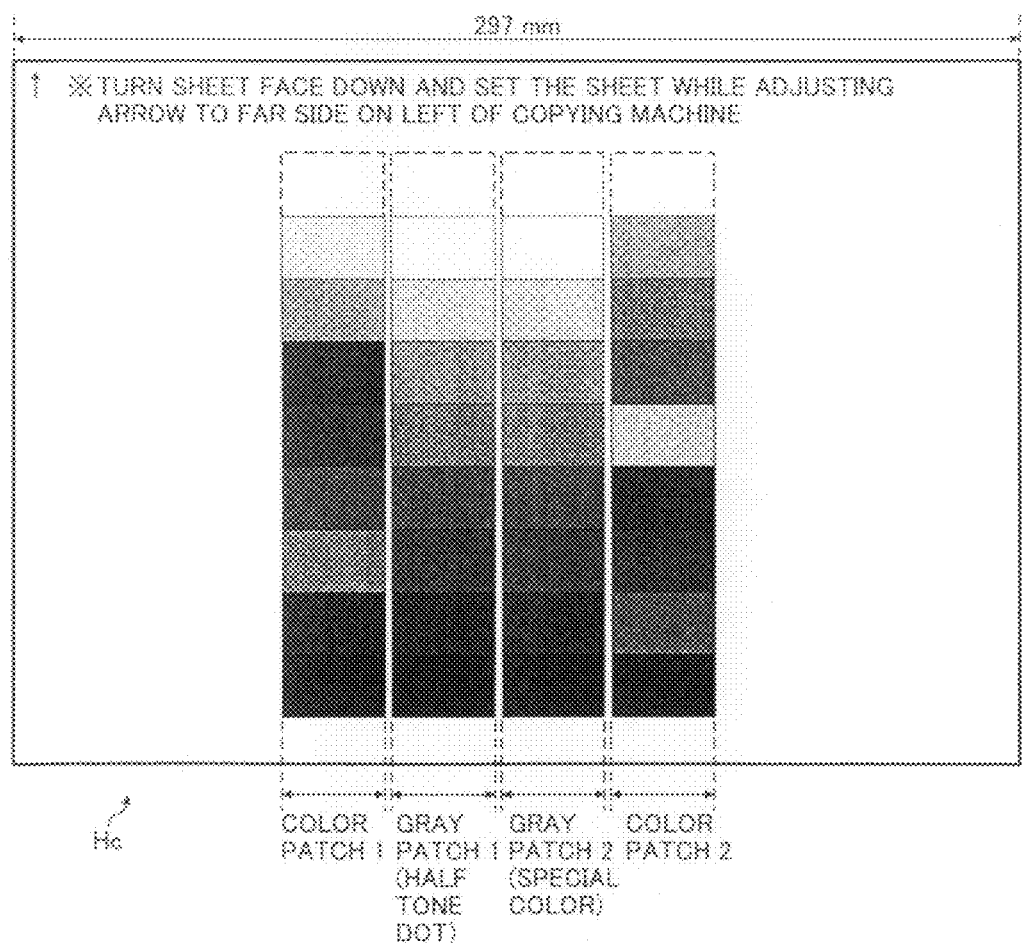
FIG. 29 is a plan view for explaining one example of a chart for connecting color correction for use in scanner calibration.

The scanner calibration is performed using, for example, a connecting color correction chart HC as a calibration reference chart as shown in FIG. 29. In a normal situation, in the connecting color correction chart HC, color patch portions, which are a plurality of chromatic color patches different from each other in hue areas, formed using, as a boundary, planes provided parallel to lightness axes in a color space are drawn in colors. In FIG. 29 as a patent drawing, however, the color patch portions are displayed in black and white in which the difference in color is expressed by different hatching.

As shown in FIG. 29, the connecting color correction chart HC is a patch-type chart in which gray patches (black patches), which are a plurality of achromatic color patches of achromatic colors different from each other in image density, are provided on a recording medium such as paper at its center portion, and a plurality of color patches of chromatic colors different from each other in hue are provided on left and right sides of the gray patches. One of the two gray patches of achromatic colors located at the center of the connecting color correction chart HC consists of a gradation pattern printed using 3C gray (produced by superimposing YMC to form an achromatic color), and the other gray patch consists of a gradation pattern printed using a single-color black ink. That is, in the connecting color correction chart HC, white 1

(texture), color 1, black 1, black 2, color 2, white 2 (texture) are arranged in that order in the main scanning direction in the scanner unit 300. Thus, when the color patches are arranged between white (texture) and black patch, the influence of flare light from surrounding patches (particularly black patches) can be reduced. On the other hand, for example, when white 1 (texture), black 1, color 1, black 2, color 2, white 2 (texture) are arranged in that order, the color 1 is influenced by the black patches located on both respective sides thereof. As a result, the values read with the scanner unit 300 indicate a somewhat darkened color. The former arrangement is adopted to avoid this unfavorable phenomenon.

Each patch in the connecting color correction chart HC is formed in a size that is four times larger than the size of patches in an automatic color correction (ACC) pattern (see FIG. 50) for use in ACC which will be explained later. The reason why the patches in the connecting color correction chart HC are formed in a larger size is to reduce the influence of flare light (reflected light from the surface of the original around the patches) on the scanner unit 300.

Further, as shown in FIG. 29, in the connecting color correction chart HC, the provision of patches is concentrated at a substantially center portion in the main scanning direction of the scanner unit 300. The reason why the provision of patches is concentrated at a substantially center portion in the main scanning direction of the scanner unit 300 is that the end in the main scanning direction of the scanner unit 300 is often darker than the center portion. The patches in the connecting color correction chart HC are placed at a position falling within an ACC pattern readable range. This is so because, in the preparation of an application program, the diversion from an ACC pattern reading control software is easy.

The color patches of chromatic colors are color patches of 16 colors in total, i.e., 12 colors corresponding to hue divided points (for example, color intermediate between Y and YR) of 12 hue masking coefficients of 12 hues (Y, YR, R, RM, M, MB, B, BC, C, CG, G, and GY) obtained by further dividing 6 hues of YRMBCG (yellow, red, magenta, blue, cyan, and green), and Y, G, R, orange for reference (for example, for copying for visual evaluation). In lightness L*, chroma C*, and hue h*, when hue angle h* is 0≦h*<360°[degrees](hereafter abbreviated to[deg]), the hue angle of each color patch in the connecting color correction chart HC is

| | |
|---|---|
| yellow red | (h* = 1[deg]) |
| orange | (h* = 26[deg]) |
| red yellow | (h* = 47[deg]) |
| red | (h* = 54[deg]) |
| red magenta | (h* = 60[deg]) |
| magenta red | (h* = 84[deg]) |
| magenta blue | (h* = 95[deg]) |
| blue magenta | (h* = 139[deg]) |
| blue cyan | (h* = 170[deg]) |
| cyan blue | (h* = 207[deg]) |
| cyan green | (h* = 232[deg]) |
| green cyan | (h* = 277[deg]) |
| green | (h* = 291[deg]) |
| green yellow | (h* = 313[deg]) |
| yellow green | (h* = 352[deg]) |
| yellow | (h* = 356[deg]). |

The numerical values are mere one example.

In the scanner calibration, the connecting color correction chart HC shown in FIG. 29 is read, and, based on the results of reading, scanner γ conversion table is first prepared so that a machine difference between the scanner units 300 is corrected.

Figure 30:
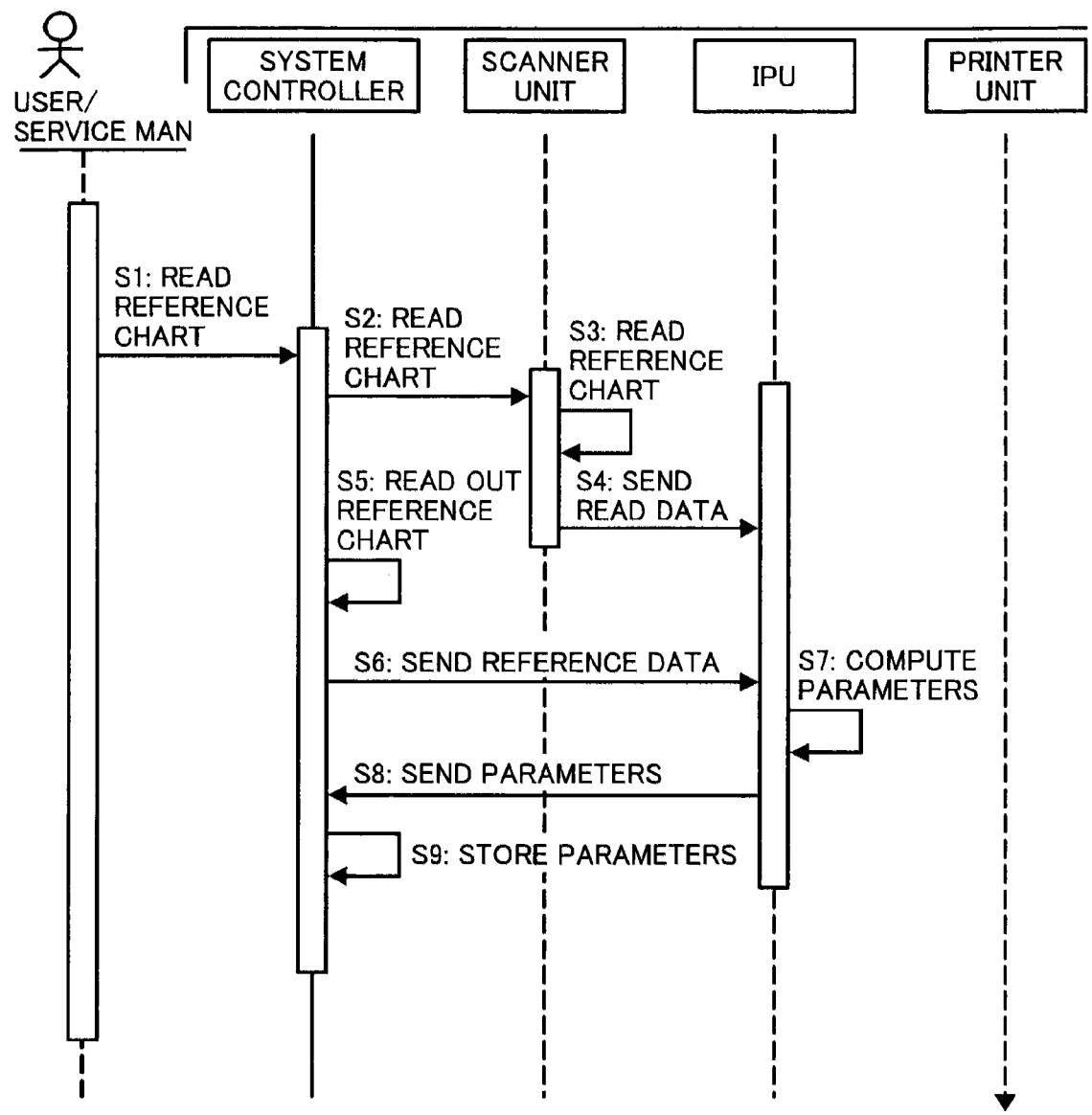
FIG. 30 is a sequence diagram for explaining an execution procedure of scanner calibration by the color copying apparatus shown in FIG. 2.

The procedure of executing the preparation of the scanner γ conversion table in the scanner calibration is shown in a sequence diagram in FIG. 30.

Figure 31:
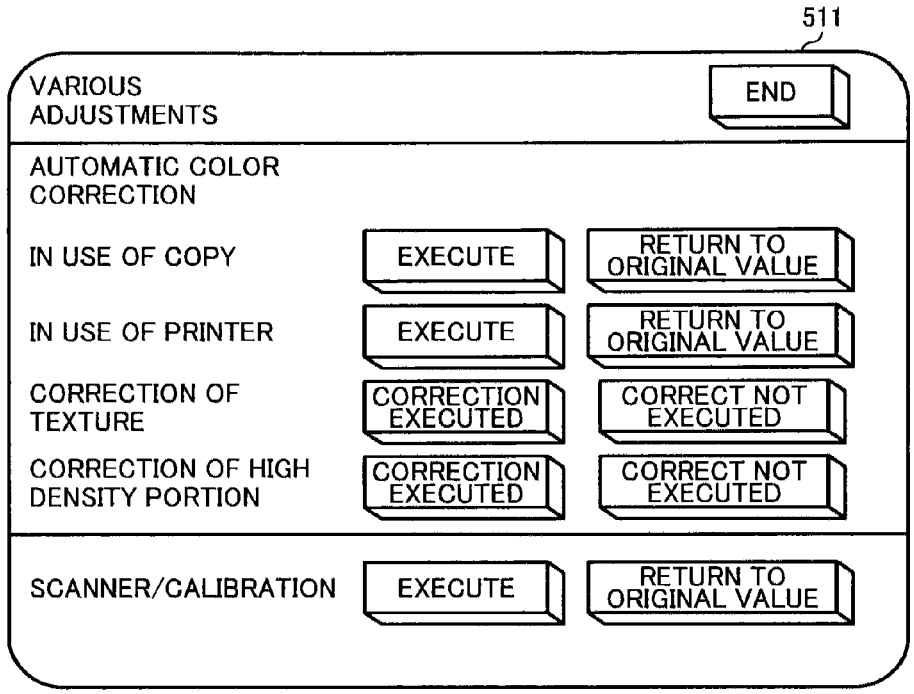
FIG. 31 is a diagram for explaining a liquid crystal screen that displays a screen for various adjustments.
Figure 32:
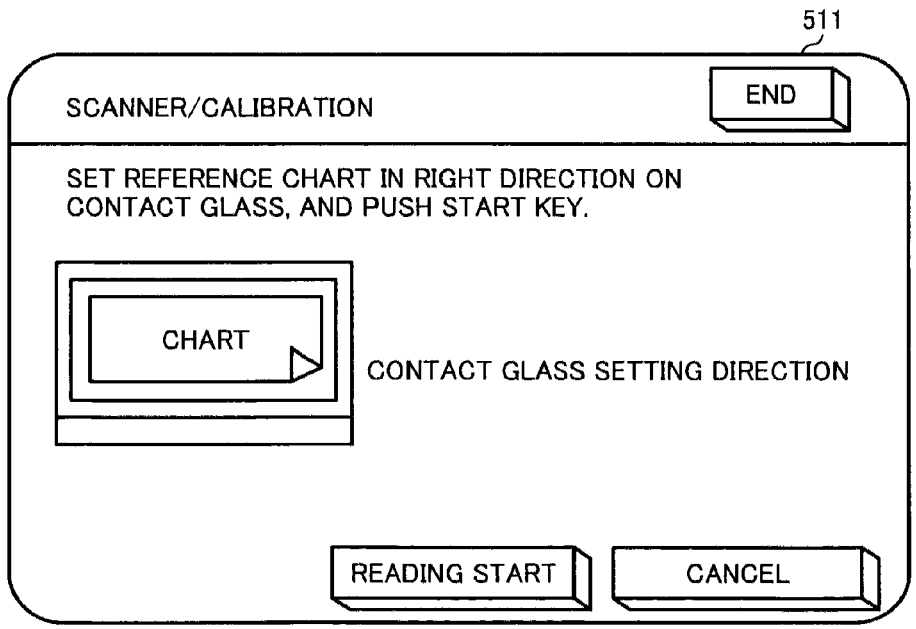
FIG. 32 is a diagram for explaining a liquid crystal screen that displays a scanner calibration start screen.

At the outset, upon the selection of various setting modes on the liquid crystal screen 511 in the operating unit 500 in FIG. 4 by a user or a serviceman, the color copying apparatus 1 displays a screen for various adjustments as shown in FIG. 31 on the liquid crystal screen 511. Upon the selection of "EXECUTE" OF "SCANNER CALIBRATION" on the screen for various adjustments, the mode is transferred to the scanner calibration mode, and a scanner calibration start screen as shown in FIG. 32 is displayed on the liquid crystal screen 511. In this scanner calibration mode, the user or the serviceman places the connecting color correction chart HC on the contact glass 3 as an original platen and depresses "READING START" key on the scanner calibration start screen in the liquid crystal screen 511 shown in FIG. 32 (S1 in FIG. 30).

In the color copying apparatus 1, upon an instruction for starting reading of the connecting color correction chart HC in the operating unit 500, as shown in S2 in FIG. 30, an instruction for reading the connecting color correction chart HC is given from the system controller 600 to the scanner unit 300. As shown in S3 in FIG. 30, the scanner unit 300 executes reading of the connecting color correction chart HC, acquires read values of RGB signals for each patch in the connecting color correction chart HC, and, as shown in S4 in FIG. 30, sends the read values for the connecting color correction chart HC to IPU 612.

Figure 33:
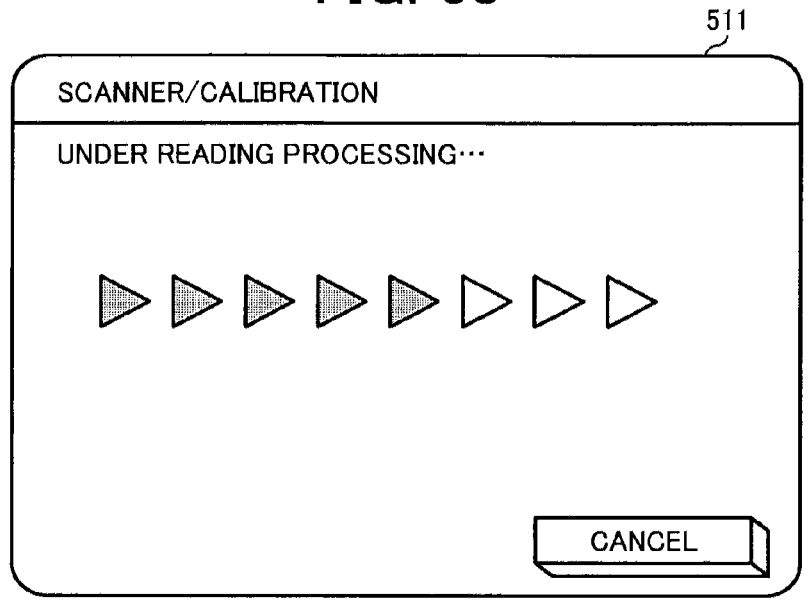
FIG. 33 is a diagram for explaining a liquid crystal screen that displays a screen during reading of a chart for connecting color correction in a scanner calibration mode.

On the other hand, as shown in S5 in FIG. 30, in the system controller 600, reading reference values (reference data) of the connecting color correction chart HC are read out from a nonvolatile RAM, and, as shown in S6 in FIG. 30, the reference data are sent from the system controller 600 to IPU 612. Under reading of the connecting color correction chart HC, the color copying apparatus 1 displays a screen indicating "under reading" as shown in FIG. 33 on the liquid crystal screen 511.

Upon the receipt of the read values and the reading reference values for the connecting color correction chart HC, as shown in S7 in FIG. 30, IPU 612 computes image processing parameters and, as shown in S8 in FIG. 30, sends the computed parameters to the system controller 600.

As shown in S9 in FIG. 30, the system controller 600 stores the received parameters in the nonvolatile RAM.

Next, how to prepare scanner γ conversion tables from the read values for the achromatic color patches in the connecting color correction chart HC (see FIG. 29) in S7 in the sequence diagram in FIG. 30 will be explained with reference to a quaternary chart shown in FIG. 34.

Figure 34:
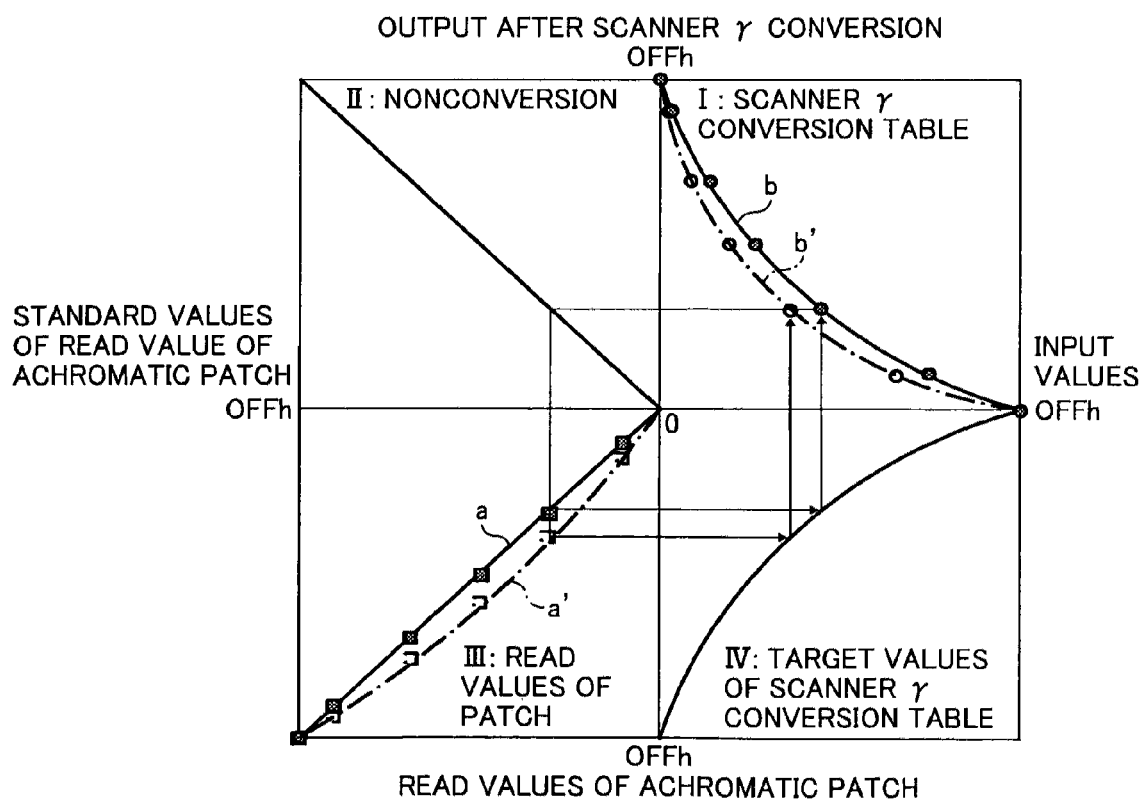
FIG. 34 is a diagram for explaining a four-way chart in scanner calibration.

In the quaternary chart shown in FIG. 34, the first quadrant (I) represents an intended scanner γ conversion table wherein the abscissa represents values input into the scanner γ conversion table and the ordinate represents the output after the scanner γ conversion. In the fourth quadrant (IV), the ordinate represents read values for the achromatic color patches, and the graph represents target values (reference values) for determining a scanner γ conversion table from the read values for the achromatic color patches. In the third quadrant (III), the abscissa represents reference values of read values for the achromatic color patches, and the graph represents the results of reading when achromatic color gray scale patches are read with the scanner unit 300. The second quadrant (II) represents nonconversion (through).

Based on the characteristics shown in the quaternary chart in FIG. 34, scanner γ conversion tables of b and b' in the first quadrants are respectively prepared from the results of reading a and a' in the third quadrant.

The target values of the read values shown in the fourth quadrant in the quaternary chart in FIG. 34 may be respectively different target values for RGB components in the scanner γ conversion table for use in copy of the original or alternatively may be an identical value.

Thus, a scanner γ conversion table that corrects a machine difference between the scanner units 300 is prepared.

Figure 35:
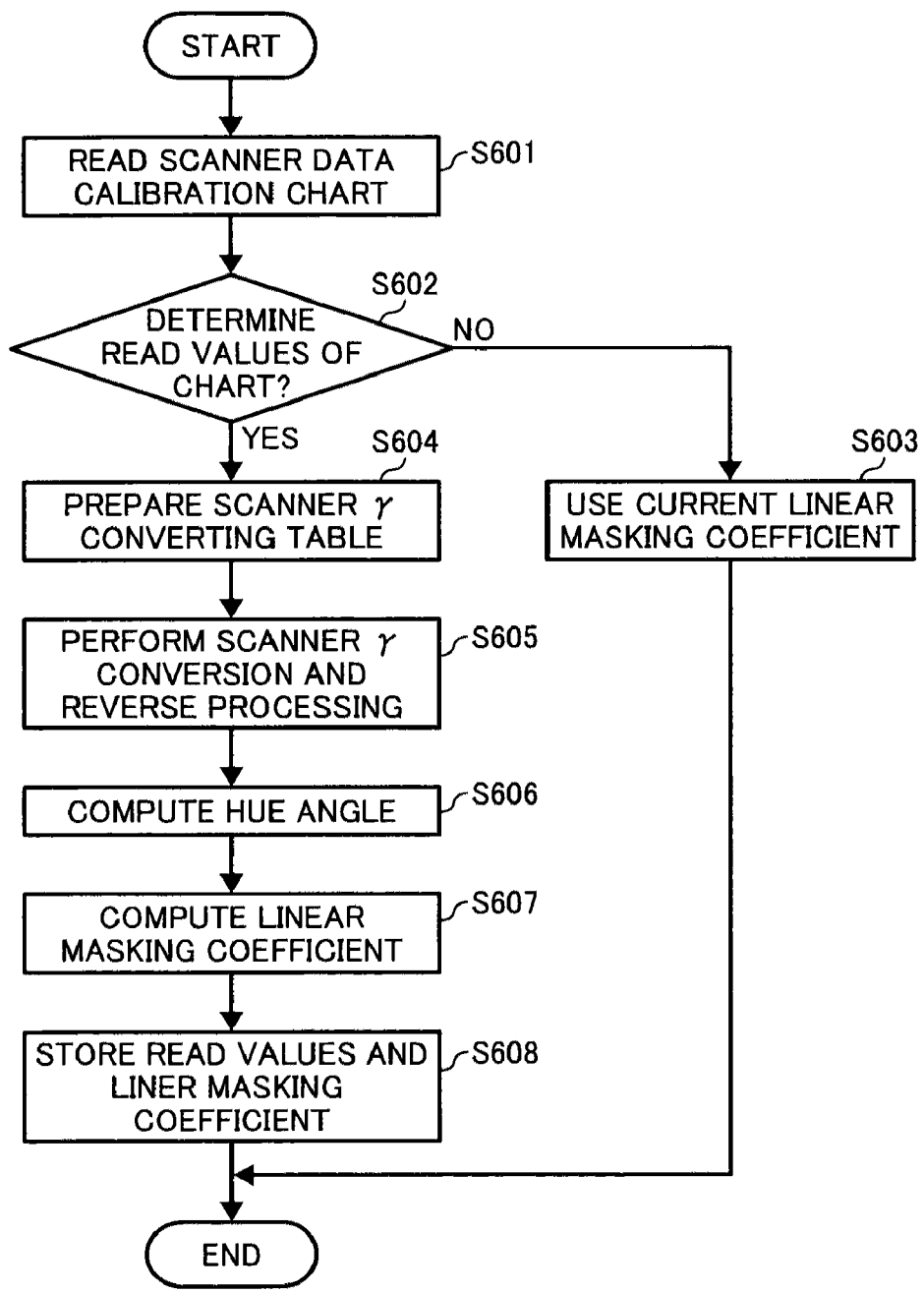
FIG. 35 is a flowchart for schematically explaining the flow of scanner calibration processing.

FIG. 35 is a flowchart for schematically explaining the flow of scanner calibration processing. In the scanner calibration processing, the connecting color correction chart HC shown in FIG. 29 is read, and, based on the results of reading, reference values that determine the hue area, that is, the parameter Fx' and the masking coefficient, are computed.

At the outset, upon an instruction for starting reading of the connecting color correction chart HC in the operating unit 500, the connecting color correction chart HC (see FIG. 29) is read (Step S601), and whether the read values for the connecting color correction chart HC fall within a predetermined range is determined (Step S602).

When the read values do not fall within the predetermined range (NO at Step S602), a determination is made that an original other than the connecting color correction chart HC is mounted on the scanner unit 300. In this case, a current linear masking coefficient value is used (Step S603), and the processing is ended.

On the other hand, when the read values fall within the predetermined range (YES at Step S602), a scanner γ conversion table is prepared (Step S604). As described above, the scanner γ conversion table is prepared using the achromatic color patch portion in the connecting color correction chart HC, whereby the machine difference between the scanner units 300 is reduced.

Next, the conversion of the read values is performed using the scanner γ conversion table, and reverse processing is performed (Step S605). That is, S[I], which is read values for the RGB components of the Ith patch with 10-bit accuracy, is subjected to f(S[I]) of scanner γ conversion, and gradation reversing is further performed. When the gradation reversed value is S'[I], $$S'[I] = S[\text{White}] - f(S[I])$$

where S[I] consists of three components of red, green, and blue; and S[White] is a reference value for white RGB. The scanner γ conversion is performed for color reproducibility improvement purposes. That is, color handling becomes easy by adopting a large value for a color with high chroma and adopting a small value for a color with low chroma.

The hue angle is then computed (Step S606). Parameters GR, GB, and Fx' for dividing the read RGB image data on the original for each hue are computed from the read value RGB data on each patch in the connecting color correction chart HC (Dr, Dg, Db) (=Ri, Gi, Bi where i=each patch number) by formulae 13 to 29.

Next, the linear masking coefficient is computed (Step S607). The linear masking coefficient is computed for each hue by the above method and the following formula 36 using the read values Ri, Gi, and Bi (where i=each patch number) for each patch.

$$\begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix} = \tag{36}$$

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \times$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}^{-1}$$

The computation method will be explained in more detail. Values obtained by reading points on a boundary plane not present on the achromatic color axis, for example, with a scanner CCD having reference spectral characteristics are presumed to be (Ri, Gi, Bi) (i=hues 1 to 4). When the same points are read with another scanner, due to a fluctuation in spectral characteristics of the scanner CCD, the points are read as values (Ri', Gi', Bi') (i=hues 1 to 4) that are different from (Ri, Gi, Bi) (i=hues 1 to 4). Consequently, the recorded values in the developing units C, M, Y, and K are (Ci', Mi', Yi', Ki') (i=hues 1 to 4). That is, the formula 32 may be expressed by the following formula.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \tag{37}$$

$$\begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

Here the following approximation is established.

(R(i'), G(i'), B(i')) ≈ (R(i)+ΔR(i), G(i)+ΔG(i), B(i)+ΔB(i))

(i=hues 1 to 4)

Thus, the following formula is obtained.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \tag{38}$$

-continued $$\begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix} \times$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}$$

where
$\Delta Ri=kR\{$(R component of current value for chromatic color in hue i)−(R component of standard value for chromatic color in hue i)$\}$ $\Delta Gi=kG\{$(G component of current value for chromatic color in hue i)−(G component of reference value for chromatic color in hue i)$\}$ $\Delta Bi=kB\{$(B component of current value for chromatic color in hue i)−(B component of reference value for chromatic color in hue i)$\}$ That is, instead of the use of actual read values (Ri', Gi', Bi'), predetermined coefficients kX (X=R, G, B) are integrated to a difference between the reference value and the read value for the chromatic color reference patch, followed by addition to the previously stored scanner vector (Ri, Gi, Bi) (i=1, 2, 3, 4) consisting of the RGB component. When the scanner vector (Ri, Gi, Bi) (i=1, 2, 3, 4) is identical to the reference patch from which the reference value and the read value for the connecting color correction chart HC in the chromatic color patch have been obtained, the coefficient is as follows.

$kX=1(X=R,G,B)$

In the embodiment, depending upon fluctuation factors of the difference between the scanners, a combination of the current value with the reference value can be selected in the following operating unit.

Figures 36, 37:
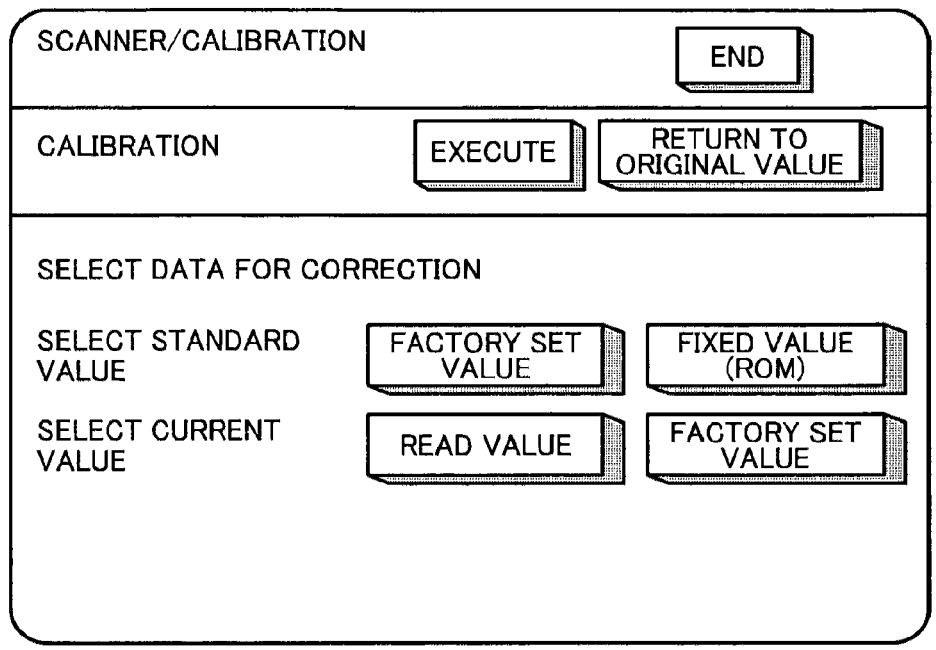
FIG. 36 is a diagram for explaining a liquid crystal screen that displays a scanner calibration screen.
FIG. 37 is a diagram for explaining a liquid crystal screen that displays factory regulated values.

On the liquid crystal screen 511 in the operating unit 500 shown in FIG. 4, upon calling of a scanner calibration menu, a scanner calibration screen shown in FIG. 36 is displayed. A key that sets a combination of the "reference value" with the "current value" is displayed on the scanner calibration screen in FIG. 36. Upon the selection of [FACTORY SET VALUE] as the reference value or the current value, as shown in FIG. 37, the factory set value, which is a reference read value for the connecting color correction chart HC, is displayed on the liquid crystal screen 511. On the other hand, upon the selection of the "READ VALUE" as the current value, as shown in FIG. 38, the read value is displayed on the liquid crystal screen 511. The factory set value displayed in FIG. 37 and the read value displayed in FIG. 38 are variable.

For example, for the scanner unit 300 that is less likely to cause a fluctuation in reference patch read values over time, the factory set value, which is a reference read value for the connecting color correction chart HC, is set as the current value. In this case, a design value (a fixed value) present within ROM is used as the reference value. Here the set value (fixed value) is the read value for the Ith chromatic color patch in the determination of the coefficients (Ri), (Gi), and (Bi) in the formula 38. Regarding the factory set value, the current value is determined using a chart of chromatic color patches for which colors are previously managed. When a fluctuation (for example, a lot difference) in colors of the chromatic color patches is observed, the coefficient kX (X=R, G, B) is decreased in inverse proportion to the magnitude of the color difference from the set value. That is, when $\Delta E*ii$ is a color difference in the L*a*b component in the CIE Lab color difference between the reference patch used in the design of the iith patch and the reference patch used in the adjustment in the factory, for example, the following relationship between $\Delta E*ii$ and kX is established.

Where $\Delta E*ii \leq 1$, kX=1(X=R, G, B).
Where $1<E*ii \leq 2$, kX=0.75(X=R, G, B).
Where $2<E*ii \leq 4$, kX=0.5(X=R, G, B).
Where $4<E*ii \leq 8$, kX=0.25(X=R, G, B).
Where $8<E*ii$, kX=0.0(X=R, G, B).

For the scanner unit 300, which is less likely to cause a fluctuation in read value for the reference patch over the time, instead of the use of the factory set values as the current value, the read value for the connecting color correction chart HC for which the current value has been read each time is used. The set value (fixed value) present within ROM is used as the reference value. The coefficient kX (X=R, G, B) is determined in the same manner as described above.

When correction is performed using a connecting color correction chart HC in which the color of the reference patch used in the design is different by a predetermined value or more due to a difference between printing lots, a scanner calibration screen shown in FIG. 39 is used. Specifically, a reference read value for the connecting color correction chart HC, which is different in color, is set as the reference value in the production or on the market (factory set value), and a value obtained by reading the connecting color correction chart HC with the apparatuses is used as the current value. In this case, as shown in FIG. 39, a correction coefficient in inverse proportion to a fluctuation (standard deviation) in the color from printing lot to lot is set. That is, when the standard deviation of the fluctuation in color is large, a value close to 0 (zero) is set as the coefficient kX (X=R, G, B). On the other hand, when the standard deviation is small, a value of 1 or a value close to 1 is set as the coefficient kX (X=R, G, B).

The liquid crystal screen 511 in the operating unit 500 is in a touch panel form. After the selection of a set value to be changed, a parameter is input through a ten key followed by depression of an enter key for setting.

Alternatively, a configuration may also be adopted in which screens shown in FIGS. 37 to 39 are displayed in a personal computer connected to a network through the local area network (LAN) cable 1000 or a personal computer connected, for example, through a universal serial bus (USB) cable, an RS-232C cable, or a Centronics cable, and setting is performed online from the personal computer on which these screens are displayed.

Here the purpose is to determine masking coefficients aPS (i-j) (P=Y, M, C, K, S=B, G, R; i, j=1, 2, 3, 4, j=1, 2, 3, 4) that render the left-hand side of the formula 32 identical to the left-hand side of the formula 37, i.e., (Y(i)), M(i), C(i), K(i))=(Y(i'), M(i'), C(i'), K(i')) where hue i=1, 2, 3, 4.

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \approx \quad (39)$$

$$\begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix} \times$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}$$

Thus, $$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix} \quad (40)$$

is obtained. Both the sides of the formula 39 are multiplied by an inverse matrix of
that is, $$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}^{-1} \quad (41)$$

to provide the formula 36.

Finally, the read values and the linear masking coefficients are stored, for example, in nonvolatile RAMs and RAMs (Step S608) to end the processing.

Figure 40:
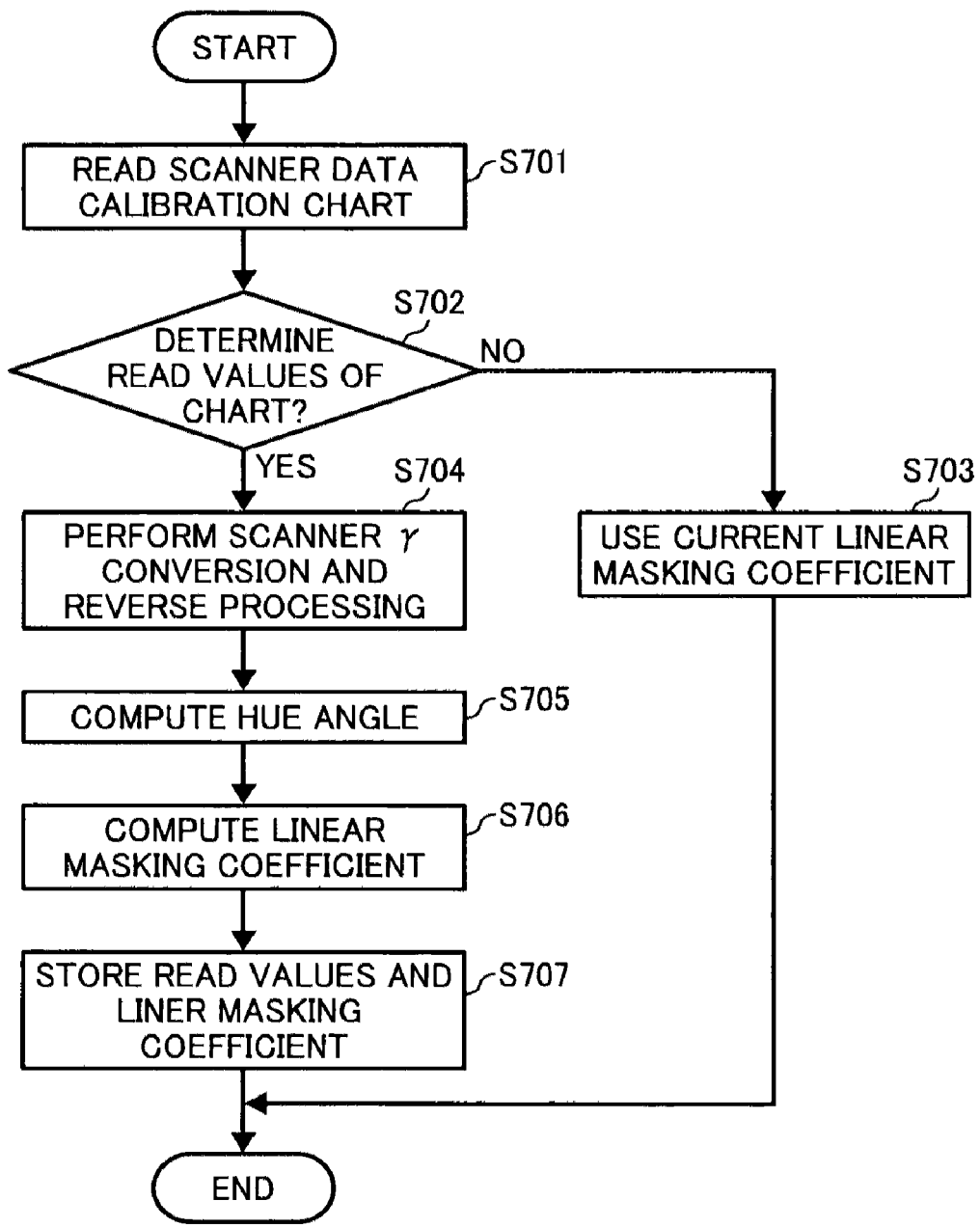
FIG. 40 is a flowchart for schematically explaining the flow of scanner calibration processing.

As shown in the flowchart in FIG. 40, a reference patch for a chromatic color may be converted using a previously stored fixed scanner γ conversion table without the preparation of the scanner γ conversion table at Step S604 in the flowchart in FIG. 35.

Figure 41:
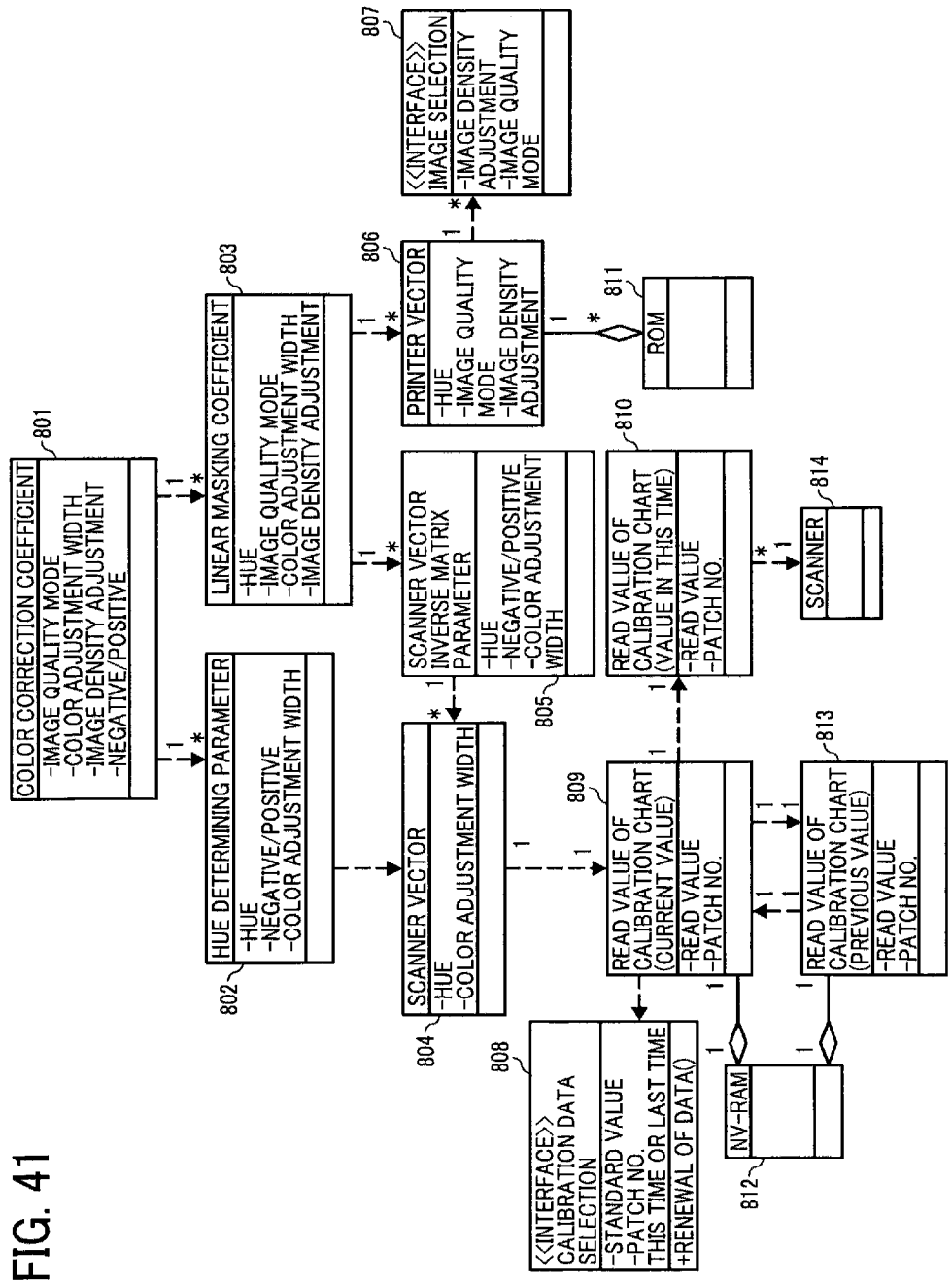
FIG. 41 is a diagram for explaining classes of scanner calibration.

FIG. 41 is a diagram for explaining classes of scanner calibration. FIG. 41 shows a color correction coefficient (a resister value set in the color correcting circuit (ASIC)) 801 and a linear masking coefficient 803 for use in copying, a hue determining parameter 802, a scanner vector 804, a scanner vector inverse matrix parameter 805, a printer vector 806, an image density selection (in the operating unit) 807, a calibration data selection I/F (in the operating unit) 808, a connecting color correction chart HC read value (current value) 809 with an object, a connecting color correction chart HC read value (value in this time) 810 with an object, a ROM 811, a nonvolatile RAM (NV-RAM) 812, a connecting color correction chart HC read value (previous value) 813 with an object, and a scanner 814.

In FIG. 41, the color correction coefficient 801 can be computed from the hue determining parameter 802 and the linear masking coefficient 803, and the hue determining parameter 802 can be computed from the scanner vector 804. The linear masking coefficient 803 is computed from the scanner vector inverse matrix parameter 805 and the printer vector 806. The scanner vector inverse matrix parameter 805 is computed from the scanner vector 804. The printer vector 806 is selected by the image quality mode and the density selection through the image selection I/F 807 in the operating unit. The data on the printer vector 806 are stored in RAM 811. The scanner vector 804 is determined from the connecting color correction chart HC read value (current value) 809 with an object. The connecting color correction chart HC read value (current value) 809 can be selected by the calibration data selection I/F 808 (in the operating unit) from the connecting color correction chart HC read value (previous value) 813, which has been previously read and stored in NV-RAM 812, and the connecting color correction chart HC read value (value in this time) 810, which has been newly read with the scanner 814. The connecting color correction chart HC read value (current value) 809 and the connecting color correction chart HC read value (previous value) 813 are stored in NV-RAM 812.

When the use of the connecting color correction chart HC read value (previous value) 813 as the connecting color correction chart HC read value (current value) 809 is contemplated, a softkey of "RETURN TO ORIGINAL VALUE" in the scanner calibration on FIG. 31 is selected. Upon the operation, the previously read and stored value is called, and the color correction coefficient 801 is recomputed.

Next, automatic color correction (ACC) will be explained. In the scanner γ conversion table for use in the automatic color correction (ACC), unlike the scanner γ conversion table for copying (for reading of the original), a scanner γ conversion table for ACC pattern reading is prepared using read values for chromatic color patches in the connecting color correction chart HC so that the sensitivity to spectral reflectance characteristics of a toner on a transfer paper as a reading object is high and the influence of a fluctuation in spectral sensitivity of CCD 312 is corrected.

The preparation of a scanner γ conversion table for ACC pattern (see FIG. 50) reading, which will be described later, from chromatic color patches different from each other in color and achromatic color patches will be explained with reference to FIG. 42 by taking, as an example, a method for preparing a yellow toner reading scanner γ correction table (scanner γ conversion table).

Figures 42, 43:
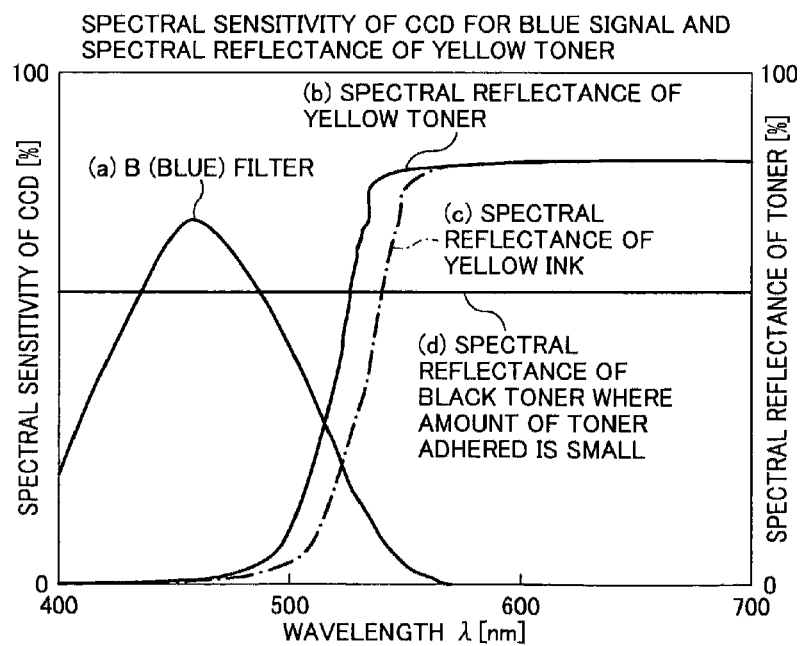
FIG. 42 is a table for explaining one example of read reference values of chromatic color and achromatic color patches for yellow toner correction.
FIG. 43 is a graph for explaining a relationship, between the spectral sensitivity in CCD for blue signals and the spectral reflectance of a yellow toner, in a relationship with wavelength.

A chromatic color patch for use in yellow toner correction is, for example, as shown in FIG. 42. The chromatic color patch is an example of numerical values obtained by reading a color patch, extracted for yellow toner correction, with a standard scanner. In reading the yellow toner, a blue signal is used because of high sensitivity of the blue signal. Further, a correction table for yellow toner reading is prepared by using a blue signal among RGB read signals of 1. white, 2. yellow, 5. blue, 6. cyan, 10. gray, and 11. black that output different blue signal values from a plurality of chromatic color patches different from each other in color.

In preparing a yellow reading correction table in the execution of ACC, since the connecting color correction chart HC is prepared using a printing ink, a difference in spectral reflectance between the connecting color correction chart HC and the toner. An example of the correction coefficient for blue that eliminates the difference is shown in FIG. 42.

The correction coefficient can be determined based on FIG. 43 that explains a relationship between the spectral sensitivity of CCD 312 for the blue signal and the spectral reflectance of the yellow toner in a relationship with the wavelength λ. In FIG. 43, the abscissa represents wavelength λ, and the ordinate represents the spectral sensitivity [%] of CCD 312 indicated on the left axis for the graph (a), and the spectral reflectance [%] of toner indicated on the right axis for the graphs (c) and (d). In FIG. 43, the graph (a) represents the spectral sensitivity of a blue signal filter, the graph (b) represents the spectral reflectance of a yellow toner, the graph (c) represents the spectral reflectance of a yellow ink, and the graph (d) represents the spectral reflectance of a black (Bk) toner where the amount of toner adhered is small. In the spectral sensitivity in the graph (a), a product of spectral energy of a light source (the halogen lamp 302) is used in the spectral transmittance of the blue filter in CCD 312.

As can be seen from FIG. 43, the output B of the blue signal (CCD 312, coloring material) is an integral value on wavelength $\lambda$ with respect to a product of spectral sensitivity S (CCD, $\lambda$) of CCD 312 and spectral reflectance $\rho$ (coloring material, $\lambda$, percentage area) of the coloring material, i.e., S(CCD, $\lambda$)×$\rho$ (coloring material, $\lambda$, percentage area). That is, the output B of the blue signal is given by the following formula 42.

$$B(CCD, \text{coloring material, percentage area}) = \int S(CCD,\lambda) \cdot \rho(\text{coloring material}, \lambda, \text{percentage area}) d\lambda \quad (42)$$

Blue signals with respect to spectral sensitivity characteristics a of CCD 312 when the yellow toner (hereinafter abbreviated to Y toner) and the yellow ink (hereinafter abbreviated to Y ink) have been read, are respectively expressed by the following formulae 43 and 44.

$$B(a, Y\text{toner}, 100\%) = \int S(a,\lambda) \cdot \rho(Y\text{toner}, \lambda, 100\%) d\lambda \quad (43)$$

$$B(a, Y\text{ink}, 100\%) = \int S(a,\lambda) \cdot \rho(Y\text{ink}, \lambda, 100\%) d\lambda \quad (44)$$

Here, a typical spectral sensitivity of the scanner unit 300 used is adopted as the spectral sensitivity S(a, $\lambda$), and the spectral reflectance of the Y toner $\rho$(Y toner, $\lambda$) and the spectral reflectance of the Y ink $\rho$(Y ink, $\lambda$) are determined by measurement with a spectrophotometric calorimeter. Thus, B(a, Y toner) and B(a, Y ink) can be determined.

When a read value B(Y toner) upon reading of Y toner for Y toner read value in the execution of ACC is predicted from a read value B(Y ink) of a blue signal acquired by reading a yellow patch of a printing ink on a connecting color correction chart HC, the following formula 45 is used as a coefficient k (yellow) for correction.

$$B(Y\text{toner}) = k(\text{yellow}) \times B(Y\text{ink}) \quad (45)$$

where k(yellow)=B(a, Y toner, 100%)/B(a, Y ink, 100%).

The yellow toner has been explained. For patches of other colors, in an area where the spectral sensitivity of blue in CCD 312 is not 0 (zero), for a yellow toner of which the spectral reflectance is substantially equal to the reflectance of a color patch of a printing ink to be computed, the percentage area of the Y toner or the amount of the toner adhered per unit area [mg/cm$^2$] is used.

Figure 44:
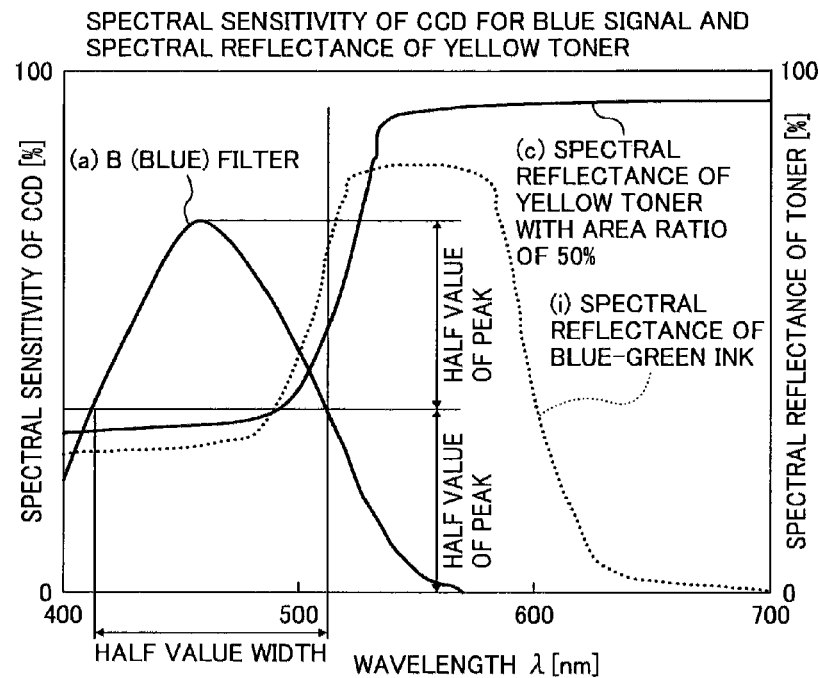
FIG. 44 is a diagram for explaining a relationship, between the spectral reflectance characteristics of a blue-green ink and the spectral reflectance of a yellow toner having an area ratio of 50% and read values of blue signals, in a relationship with wavelength.

For example, for patches (for example, black or green) in which the spectral reflectance characteristics (i) of a blue-green ink shown in FIG. 44, the spectral reflectance (c) of a yellow toner having a percentage area of 50%, and the read value of a blue signal are lower than the read values for the yellow toner (ink), the correction coefficient is not computed and, in this case, a coefficient of 1 is used. The correction coefficients k thus obtained may be indicated as shown in FIG. 42.

Next, how to prepare a conversion table for ACC pattern read value correction will be explained with reference to a quaternary chart in a table for ACC pattern read value correction in FIG. 45.

Figure 45:
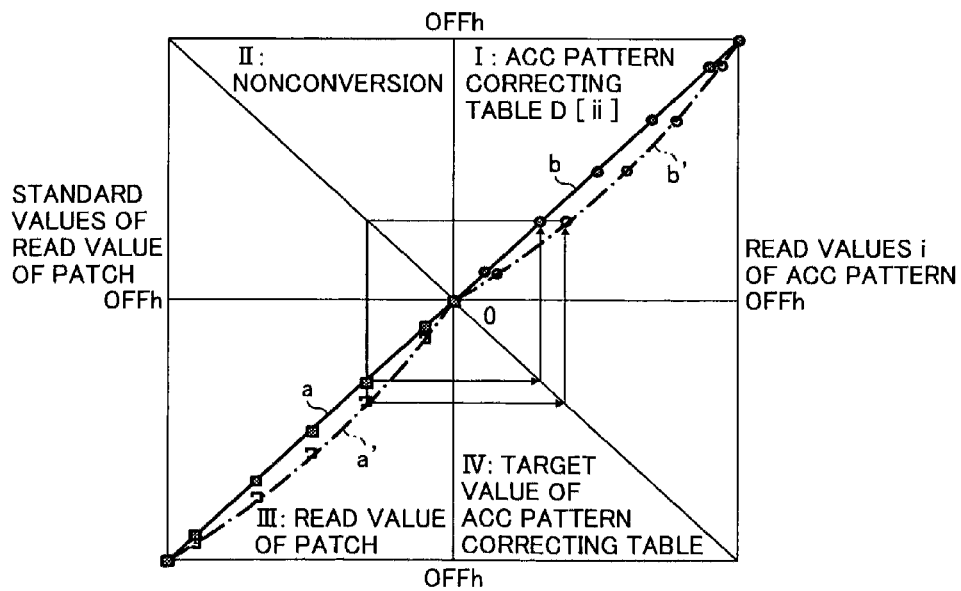
FIG. 45 is a table for explaining a four-way chart of a table for the correction of automatic color correction (ACC) pattern read values.

The first quadrant (I) in FIG. 45 represents a conversion table for ACC pattern read value correction to be determined. In the first quadrant (I), the abscissa represents CCD pattern read values, and the ordinate represents values after conversion. The ordinate in the fourth quadrant (IV) represents read values after correction with the correction coefficients k for the chromatic color and achromatic color patches, and the graph represents target values (reference values) for determining a conversion table for ACC pattern read value correction from read values for the chromatic color and achromatic color patches. In the third quadrant (III), the abscissa represents reference values of read values for the chromatic color and achromatic color patches, and the graph represents values after the correction of the read values, obtained by reading the chromatic color and achromatic color patches with the scanner, with the correction coefficients k. The second quadrant (II) represents nonconversion (through).

Based on the characteristics shown in FIG. 45, a conversion table for ACC pattern read value correction (correction table) in b and b' in the first quadrant (I), i.e., D[ii](ii=0, 1, 2, ..., 255) is prepared from the results a and a' read values in the third quadrant (III).

The target values of read values indicated in the fourth quadrant (IV) in FIG. 45 are prepared for each toner of YMCK read in the ACC pattern. Thus, the adjustment accuracy of ACC can be improved.

FIG. 46 is a table for explaining an example of numerical values obtained by reading a color patch, extracted for cyan toner correction, with a standard scanner. In reading the cyan toner, a red signal is used because of high sensitivity of the red signal. A correction table for cyan toner reading in the execution of ACC is prepared by using red signals of chromatic color and achromatic color patches of 1. white, 2. yellow, 3. red (or 4. magenta), 5. a color 1 located between magenta and blue, 6. a color 2 located between magenta and blue, 7. blue, 8. cyan, 10. gray, and 11 black that output different red signal values from a plurality of chromatic color patches different from each other in color.

Thus, a fluctuation in read image signals derived from a machine difference between the scanner units 300 can be prevented, and, at the same time, the adjustment accuracy of ACC can be improved, whereby the image quality can be further improved.

Since the gradation conversion table set in the image processing printer $\gamma$ converting circuit 713 in gradation pattern reading is prepared by using image signals of one common component among image signals obtained by reading a plurality of different color patches in the connecting color correction chart HC with the scanner unit 300, the preparation of a gradation conversion table using image signals read with the scanner unit 300 corresponding to complementary color signals of a YMC toner among RGB image signals obtained by reading patches of different colors in the connecting color correction chart HC can improve the adjustment accuracy of the gradation conversion table and can improve the image quality in the connecting output.

In preparing a cyan reading scanner $\gamma$ conversion table in the execution of ACC, since the connecting color correction chart HC is prepared using a printing ink, a difference in spectral reflectance between the connecting color correction chart HC and the toner occurs. An example of the correction coefficient for red that eliminates the difference is shown in FIG. 46.

Thus, the difference in spectral reflectance characteristics between the printing ink in the connecting color correction chart HC and the toner in the printer unit 100 that records and outputs gradation patterns is corrected, and, thus, a scanner $\gamma$ conversion table as an image signal conversion table for ACC with higher adjustment accuracy can be prepared, and the image quality can be further improved.

An operation screen on which an automatic color correction (ACC) function for image density (gradation) is selected will be explained.

Figure 47:
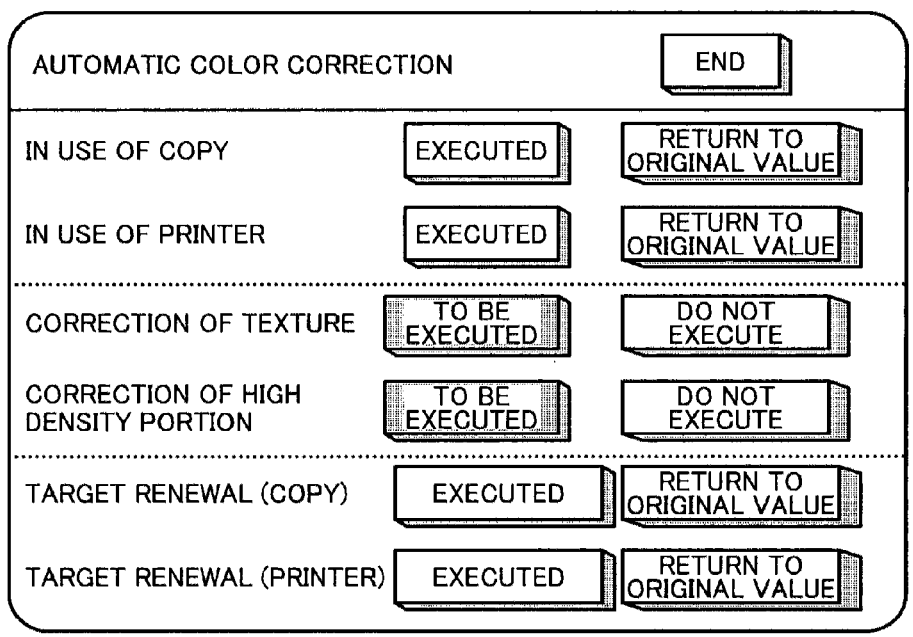
FIG. 47 is a diagram for explaining a liquid crystal screen that displays an automatic gradation adjustment screen.
Figure 48:
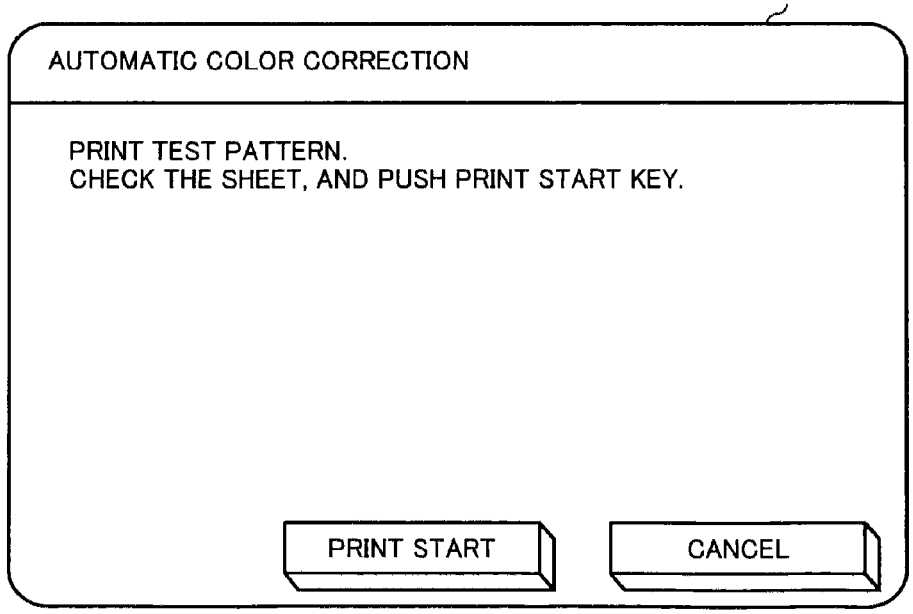
FIG. 48 is a diagram for explaining a liquid crystal screen that displays an automatic color (gradation) correction start screen.

On the liquid crystal screen 511 in the operating unit 500 shown in FIG. 4, upon calling of an automatic color correction (ACC) menu, an automatic gradation adjustment screen shown in FIG. 47 is displayed. Upon the selection of "EXECUTE" of automatic color correction for "IN USE OF COPY" or "EXECUTE" of automatic color correction for "IN USE OF PRINTER" on the automatic gradation adjustment screen, an automatic color correction start screen shown in FIG. 48 is displayed on the liquid crystal screen 511. In this case, when "IN USE OF COPY" has been selected on the automatic gradation adjustment screen in FIG. 47, a gradation correction table for use in "IN USE OF COPY" is provided based on reference data. On the other hand, when "IN USE OF PRINTER" has been selected, a gradation correction table for use in "IN USE OF PRINTER" is provided based on reference data.

A "RESTORE" key is displayed on the automatic gradation adjustment screen in FIG. 47 so that, when the results of image formation with the changed YMCK gradation correction table are not good, the YMCK gradation correction table before the processing can be selected.

Further, upon the selection of "SETTING OF AUTOMATIC COLOR CORRECTION", keys for selecting "CORRECTION OF TEXTURE", "CORRECTION OF HIGH DENSITY PORTION", "CORRECTION OF RGB RATIO", "EXECUTE", or "NONEXECUTE", which will be explained later, are displayed on the automatic gradation adjustment screen in FIG. 47. In the "SETTING OF AUTOMATIC COLOR CORRECTION" menu, "SETTING OF AUTOMATIC COLOR CORRECTION" and "SETTING OF UNEVEN LIGHT QUANTITIY DETECTION" can be selected. The selection of them is not always necessary, and they may be always in "EXECUTE" state.

As described above, the color copying apparatus 1 prepares a scanner γ conversion table from achromatic color patches for each reading component of RGB for use in copy. On the other hand, the color copying apparatus 1 corrects read values of each gradation pattern of YMCK acquired by reading adjustment patterns output in the execution of automatic color correction (ACC) from chromatic color patches and achromatic color patches. Accordingly, in the former processing, three conversion tables for RGB are used while, in the latter processing, four conversion tables for YMCK are used.

Figure 49:
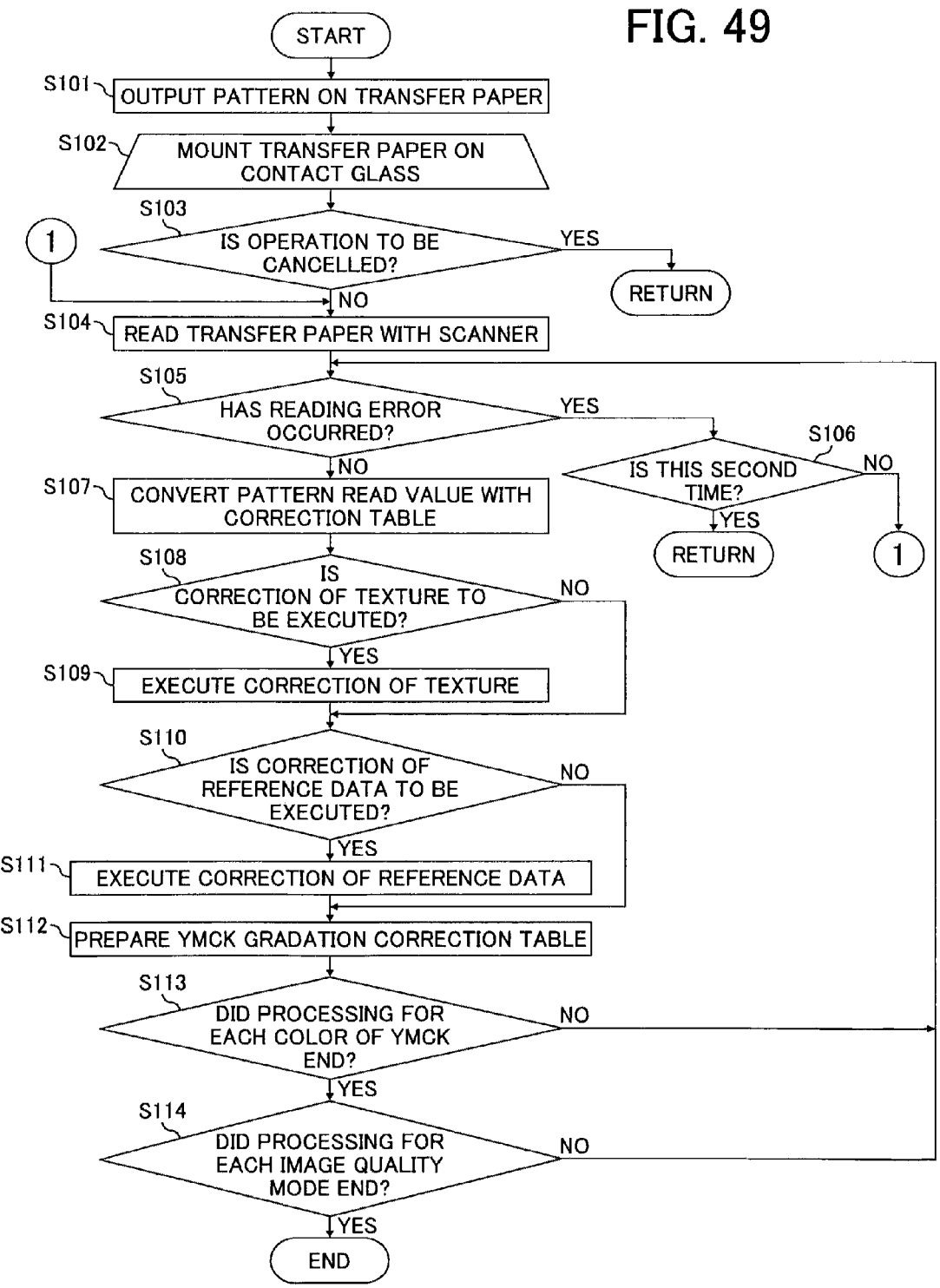
FIG. 49 is a flowchart for explaining ACC processing of the color copying apparatus shown in FIG. 2.

The action of the automatic color correction (ACC) for image density (gradation) will be explained with reference to a flowchart in FIG. 49.

Figure 50:
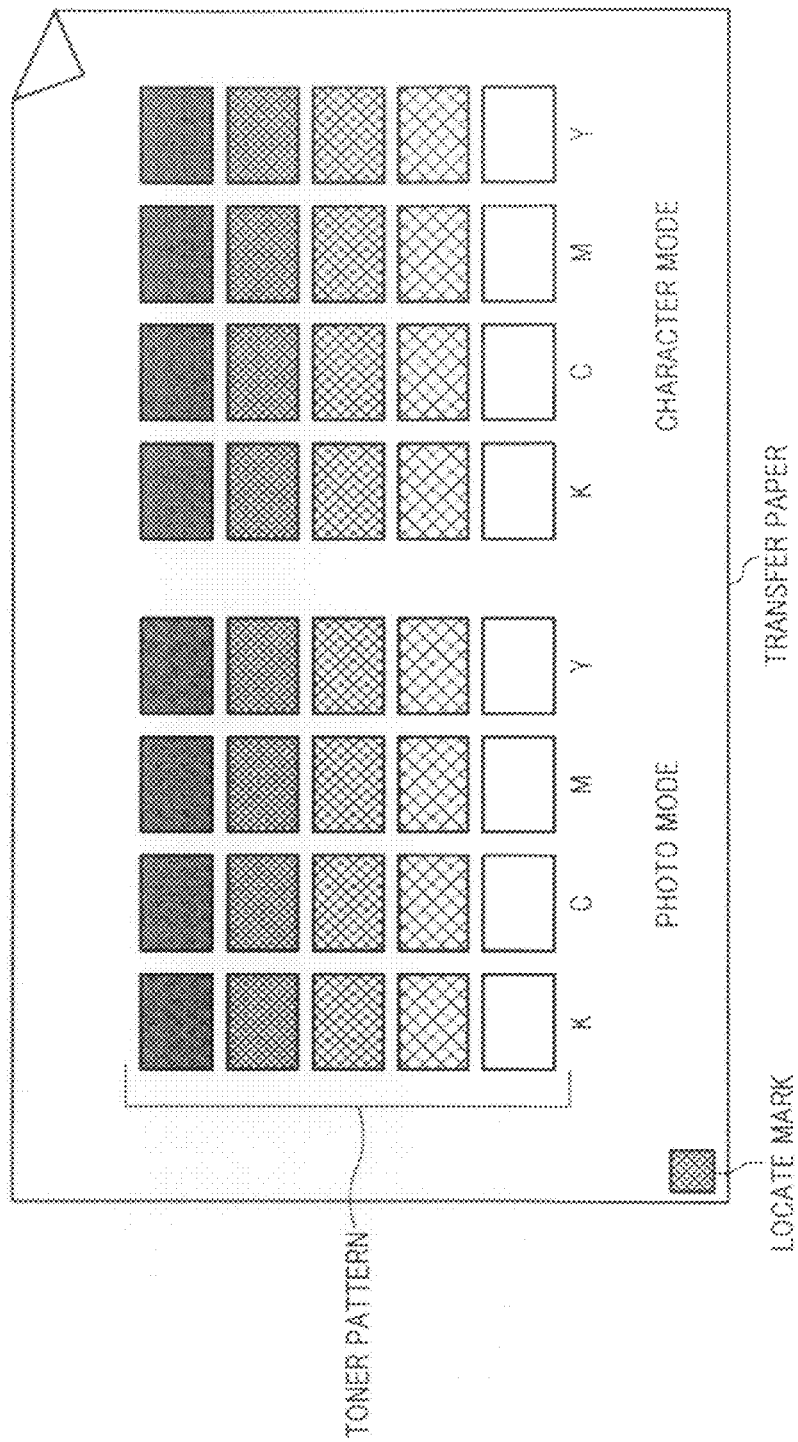
FIG. 50 is a diagram for explaining one example of a gradation pattern output on a transfer paper by ACC processing.

Upon the selection of "EXECUTE" of automatic color correction for "IN USE OF COPY" or "EXECUTE" of automatic color correction for "IN USE OF PRINTER" on the automatic color adjustment screen in FIG. 47, an automatic color correction start screen shown in FIG. 48 is displayed on the liquid crystal screen 511. Upon the depression of "PRINT START" key on the automatic color correction start screen, a plurality of density gradation patterns corresponding to YMCK colors and character and photograph image quality modes as shown in FIG. 50 are formed on a transfer paper (a transfer material) P (Step S101).

The density gradation patterns are previously stored and set in the ROM 716 in IPU 612. The pattern write values are given in hexadecimal, and 16 patterns of 00h, 11h, 22h, ..., EEh, and FFh are displayed. In FIG. 50, patches of five gradations except for the texture portion are displayed, and any desired value among eight bit signals of 00h-FFh may be selected. In the density gradation patterns, toner patterns of the character mode and the photograph mode are formed. In the character mode, dither processing such as pattern processing is not performed, and the pattern is formed at 256 gradations per dot. On the other hand, in the photograph mode, dither processing which will be described later is performed.

Figure 51:
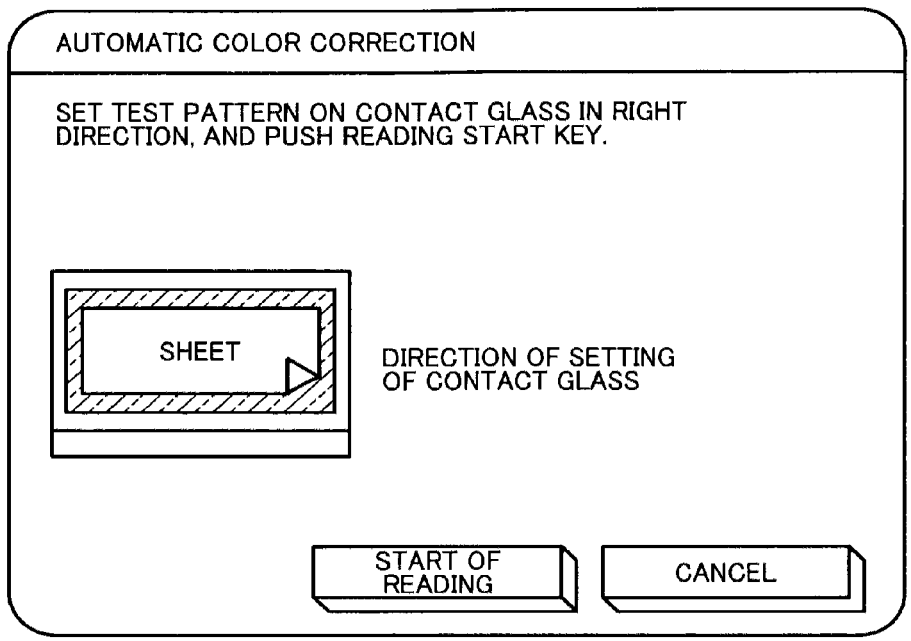
FIG. 51 is a diagram for explaining a liquid crystal screen that displays a screen for urging a transfer paper in FIG. 35, on which a gradation pattern has been output by ACC processing, to be set on a contact glass.

Upon the output of the pattern on the transfer paper (transfer material) P, as shown in FIG. 51, the color copying apparatus 1 displays, on the liquid crystal screen 511, a message that prompts mounting of a transfer paper (transfer material) P, on which a density gradation pattern has been recorded and output, on a contact glass 3 as an original platen. Upon mounting of the transfer paper with a density gradation pattern formed thereon on the contact glass 3 according to an instruction given on the screen (Step S102), the selection of "READING START" or "CANCEL" on the screen shown in FIG. 51 is checked (Step S103). Upon the selection of "CANCEL", the processing is ended.

On the other hand, in the color copying apparatus 1, upon the selection of "READING START" at Step S103, the scanner unit 300 performs main scanning and vertical scanning of the transfer paper with a density gradation pattern formed thereon to read RGB data on YMCK density patterns (Step S104). In this case, the scanner unit 300 reads data in the transfer paper on its pattern portion with the density gradation pattern formed thereon and data in the transfer paper on its texture portion.

The color copying apparatus 1 determines whether the data on the pattern portion in the transfer paper have been normally read (Step S105). When the reading is not normal, whether reading not in normal state is repeated twice is checked (Step S106). When this is first time, the color copying apparatus 1 displays the screen in FIG. 51 on the liquid crystal screen 511, and, upon an instruction for reading, the step is returned to Step S104, and the same processing as described above is performed (Steps S104 and S106). On the other hand, at Step S106, when the reading not in normal state is repeated twice, the processing is ended.

At Step S105, when the reading of the data in the transfer paper on its pattern portion is normal, the color copying apparatus 1 converts and corrects each read value for the ACC pattern for each color of YMCK using the ACC pattern read value correction table D[ii](ii=0, 1, 2, ..., 255) (Step S107), and makes a determination on the selection of "EXECUTE" or "NONEXECUTE" for the texture correction processing using the texture data, based on the results of selection on the automatic gradation adjustment screen in FIG. 47 (Step S108).

At Step S108, when "EXECUTE" for the texture correction processing using the texture data has been selected, the color copying apparatus 1 performs texture data correction processing for the read data (Step S109) and makes a determination on "EXECUTE" or "NONEXECUTE" for the correction of the reference data in its high-image density portion, based on the results of selection on the automatic gradation adjustment screen in FIG. 47 (Step S110).

At Step S110, when "EXECUTE" for the correction of the reference data on its high-image density portion has been selected, the color copying apparatus 1 performs correction processing for the high-image density portion in the reference data (Step S111), and performs the preparation/selection of the YMCK gradation correction tables (Step S112). On the other hand, at Step S110, when the correction of the reference data is not performed, the color copying apparatus 1 performs the reparation/selection of YMCK gradation correction tables without performing the correction of the reference data (Step S112).

Upon the preparation/selection of the YMCK gradation correction tables, the color copying apparatus 1 checks whether the processing has been executed for each color of YMCK (Step S113). When the processing for each color of YMCK has not been executed, the step is returned to Step S105 and the processing for each color of YMCK is executed (Steps S105 to S113).

When the processing for each color of YMCK has been performed, at Step S113, the color copying apparatus 1 checks whether the processing has been completed for each quality mode of photographs and characters (Step S114). When the processing has not been completed, the step is returned to Step S105 and the same processing is performed (Steps S105 to S114). At Step S114, upon the completion of the processing for each image quality mode of photographs and characters, the processing is ended.

Figure 52:
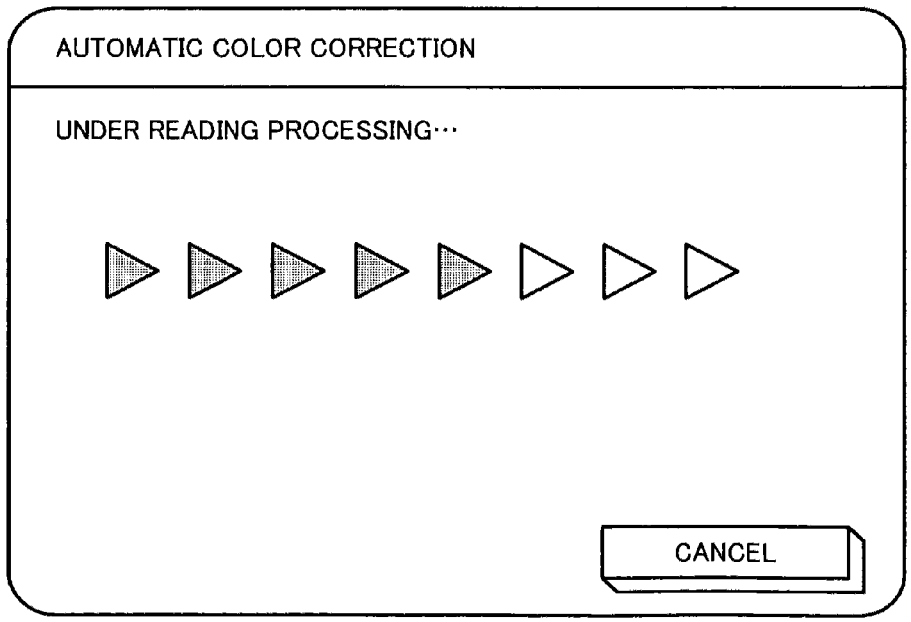
FIG. 52 is a diagram for explaining a liquid crystal screen that displays a screen under reading of a transfer paper with a gradation pattern recorded thereon by ACC processing.

Under the processing, as shown in FIG. 52, the color copying apparatus 1 displays a screen indicating, on the liquid crystal screen 511, that the automatic color correction is under execution. When the results of image formation using the YMCK gradation correction tables after the completion of the processing are not good, a "RESTORE" key is displayed on the automatic gradation adjustment screen in FIG. 47 so that the YMCK gradation correction tables before the processing can be selected.

Next, texture correction processing will be explained. the texture correction processing is performed for two purposes. One of the purposes is to correct the whiteness of the transfer paper used in ACC. The texture correction processing is performed for the reason that, even when an image is formed at the same point of time with an identical machine, values of reading with the scanner unit 300 vary depending upon the whiteness of the transfer paper used. When the correction is not performed, the following problem occurs. For example, when a recycled paper or the like having low whiteness is used in ACC, since the recycled paper generally has a high yellow component content, in the preparation of yellow gradation correction tables, correction is performed so that the yellow component content is reduced. In this state, when copy is then performed using art paper or the like having high whiteness, in some cases, an image having a yellow component content is formed and, consequently, desired color reproduction cannot be provided.

The other reason why the texture correction processing is performed is that, when the thickness of the transfer paper (paper thickness) used in ACC is small, a color of a pressing plate or the like that presses the transfer paper is permeated through the transfer paper and is disadvantageously read with the scanner unit 300. For example, when ADF 400 is mounted instead of the pressing plate, the original carrying belt 402 is used for the transfer of the original G. In the carrying belt 402, the whiteness is low when the rubber material used is of some type, and, in this case, the carrying belt 402 is somewhat grayish. Accordingly, regarding read image signals, image signals having a high gray level on the whole are apparently read. Therefore, YMCK gradation correction tables are prepared so that the gray level is reduced accordingly. In this state, however, when a transfer paper having a large thickness and possessing low transparency is used for ACC, an image of which the density is low on the whole is reproduced and, consequently, a desired image is not always provided.

To avoid the problem, correction of the read image signal in the pattern portion by the read image signal of the paper in its texture portion is performed.

Nonexecution of the correction, however, has an advantage. In nonexecution of the correction, when a transfer paper having a high yellow component content such as recycled paper is always used, better color reproduction for colors containing a yellow component is sometimes provided. Further, when only a transfer paper having a small thickness is always used, gradation correction tables, which match thin papers, can be advantageously prepared.

Accordingly, the color copying apparatus 1 can perform ON/OFF of the correction of the texture portion by a key operation of the operating unit 500, for example, according to the status of use of the color copying apparatus 1 and user's preferences.

Next, the action and processing of the automatic color correction will be explained. Regarding a pattern in which write values LD[i] (i=0, 1, . . . , 9) of the gradation pattern formed on the transfer paper (see FIG. 50) are formed, values of reading with the scanner unit 300 are expressed in a vector model by v[t] [i]=(r[t] [i], g[t] [i], b[t] [i]) (t=Y, M, C, or, K, i=0, 1, . . . , 9).

For example, lightness, chroma, and hue angle (L*, c*, h*), or lightness, redness, and blueness (L*, a*, b*) may be used instead of (r, g, b).

Read values of white as a standard previously stored in the ROM 716 or the RAM 717 are (r[W], g[W], b[W]).

Next, how to prepare gradation conversion tables (look-up table (LUT)) for use in the image processing printer γ converting circuit 713 in the execution of ACC will be explained.

In the read values v[t] [i]=(r[t] [i], g[t] [i], b[t] [i]) for the gradation pattern, since image signals of the complementary colors of the YMC toner are respectively b[t] [i], g[t] [i], and r[t] [i], only the image signals of the complementary colors are used. Here, for convenience of simplification of the explanation, a[t] [i](i=0, 1, 2, . . . , 9; t=C, M, Y, or, K) is used. The preparation of gradation conversion tables simplifies the processing.

For a black toner, satisfactory accuracy can be provided even when any image signal of RGB is used. Here, however, a green (G) component is used.

Reference data are given by a set of read values of the scanner unit 300, i.e., v0[t] [i]=(r0[t] [i], g0[t] [i], b0[t] [i]), and the corresponding laser write values, i.e., LD[i] (i=1, 2, . . . , m). Likewise, only complementary image signals of YMC are used, and, for simplifying the explanation, A[t][n[i]] (0≦n[i]≦255; i=1, 2, . . . , m; t=Y, M, C, or, K) is used. m is the number of reference data.

The YMCK gradation conversion tables are prepared by comparing a[LD] with reference data A[n] stored in the ROM 716.

Here n is a value input into the YMCK gradation conversion tables. The reference data A[n] are target values of read image signals obtained by reading, with the scanner unit 300, a YMC toner pattern output at laser write values LD[i] after the YMCK gradation conversion of the input value n. The reference data consist of two types of values, i.e., reference values A[n] for which correction is performed according to image density that can be output by the printer and reference values A[n] for which correction is not performed. The color copying apparatus 1 performs the determination, on whether the correction is performed, using data for determination previously stored in the ROM 716 or the RAM 717.

The color copying apparatus 1 determines laser output values LD[n], corresponding to the value n input into the YMCK gradation conversion table, by determining LD corresponding to A[n] from a[LD].

The gradation conversion table can be determined by determining the laser output values LD[n] with respect to input values i=0, 1, . . . , 255 (for eight-bit signal).

In this case, instead of performing the processing for all values with respect to values input into the YMCK gradation conversion table, n=00h, 01h, . . . , FFh (base 166 number), the processing is performed for skipped values such as ni=0, 11h, 22h, . . . , FFh, and, for other matters, interpolation is performed, for example, by a spline function, or the closest table passed through the determined set of (0, LD[0]), (11h, LD[11h]), (22h, LD[22h]), ..., (FFh, LD[FFh]) among YMCK γ correction tables previously stored in the ROM 716 is selected.

Figure 53:
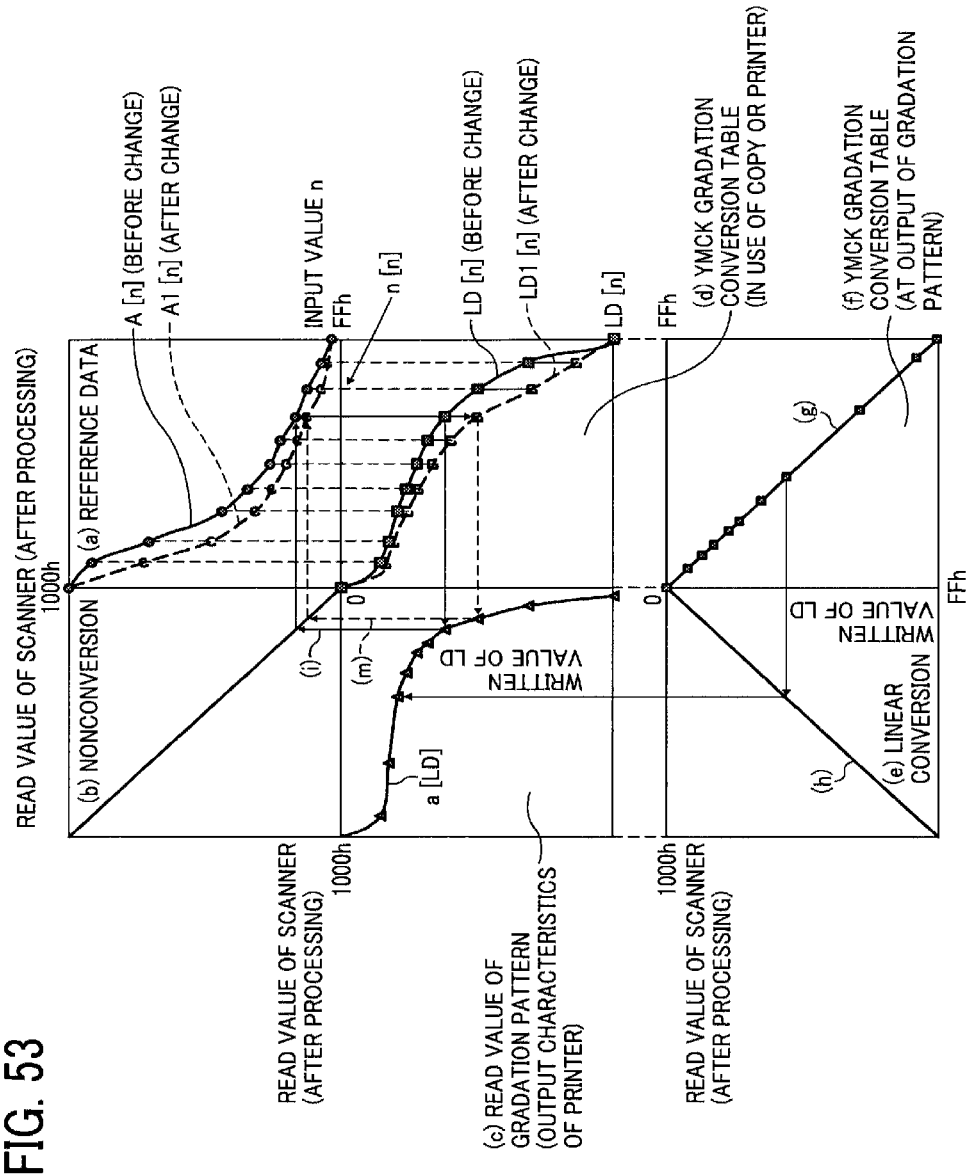
FIG. 53 is a graph for explaining a four-way chart that explains a computation method in ACC processing.

The processing will be explained with reference to FIG. 53. In FIG. 53, in the first quadrant (a), the abscissa represents values n input into the YMCK gradation conversion table, and the ordinate represents values (after processing) read with the scanner unit 300, i.e., the reference data A[i]. The values (after processing) read with the scanner unit 300 are values obtained by subjecting values, obtained by reading a gradation pattern with the scanner until 300, to RGB conversion (no conversion in the embodiment), averaging processing and adding processing for data read in a few places in the gradation pattern and are processed as a 12-bit data signals from the viewpoint of improving computation accuracy.

In the second quadrant (b) in FIG. 53, the abscissa as with the ordinate represents values (after processing) read with the scanner unit 300.

In the third quadrant (c) in FIG. 53, the ordinate represents write values of a laser beam (LD). The data a[LD] as the laser beam write values represent the characteristics of the printer unit 100. The write values of the laser beam (LD) in an actually formed pattern are 16 skipped values of 00h (texture), 11h, 22h, ..., EEh, and FFh. Here, however, interpolation of portions between detected points is performed to handle the values as a continuous graph.

The graph (d) of the fourth quadrant in FIG. 53 is a YMCK gradation conversion table LD[i] and is provided for determining the YMCK gradation conversion table.

The ordinate/abscissa in the graph (f) are the same as the ordinate/abscissa in the graph (d). When the formation of a gradation pattern for detection is contemplated, the YMCK gradation conversion table (g) shown in graph (f) is used.

The abscissa in the graph (e) is the same as the abscissa in the third quadrant (c) and represents expediential linear conversion that represents a relationship between the write values of the laser beam (LD) in the preparation of the gradation pattern and the values (after processing) of the gradation pattern read with the scanner unit 300.

In FIG. 53, reference data A[n] are determined for a certain input value n, and a laser beam (LD) output LD[n] for obtaining A[n] is determined along an arrow (1) in the drawing using the read values a[LD] of the gradation pattern.

Figure 54:
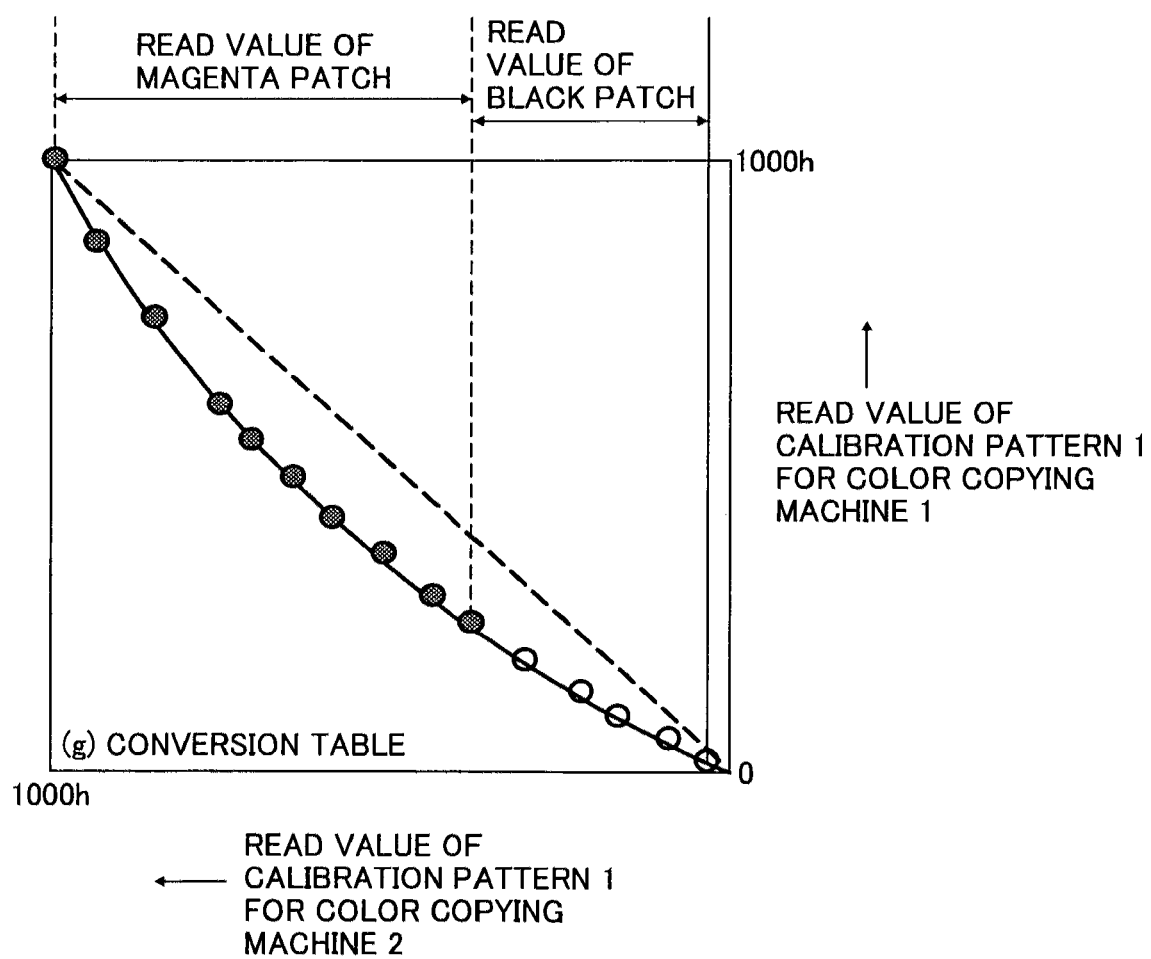
FIG. 54 is a graph for explaining an example of generation of a green conversion table.

FIG. 54 is a graph for explaining an example of a conversion table for green data. The conversion table for green data is prepared by using read values of a magenta calibration pattern 1, for (light) portions on 1000H side where the amount of light reflected from the original is large, and using read values of black for (dark) portions on 0H side where the amount of light reflected from the original is small.

Figure 55:
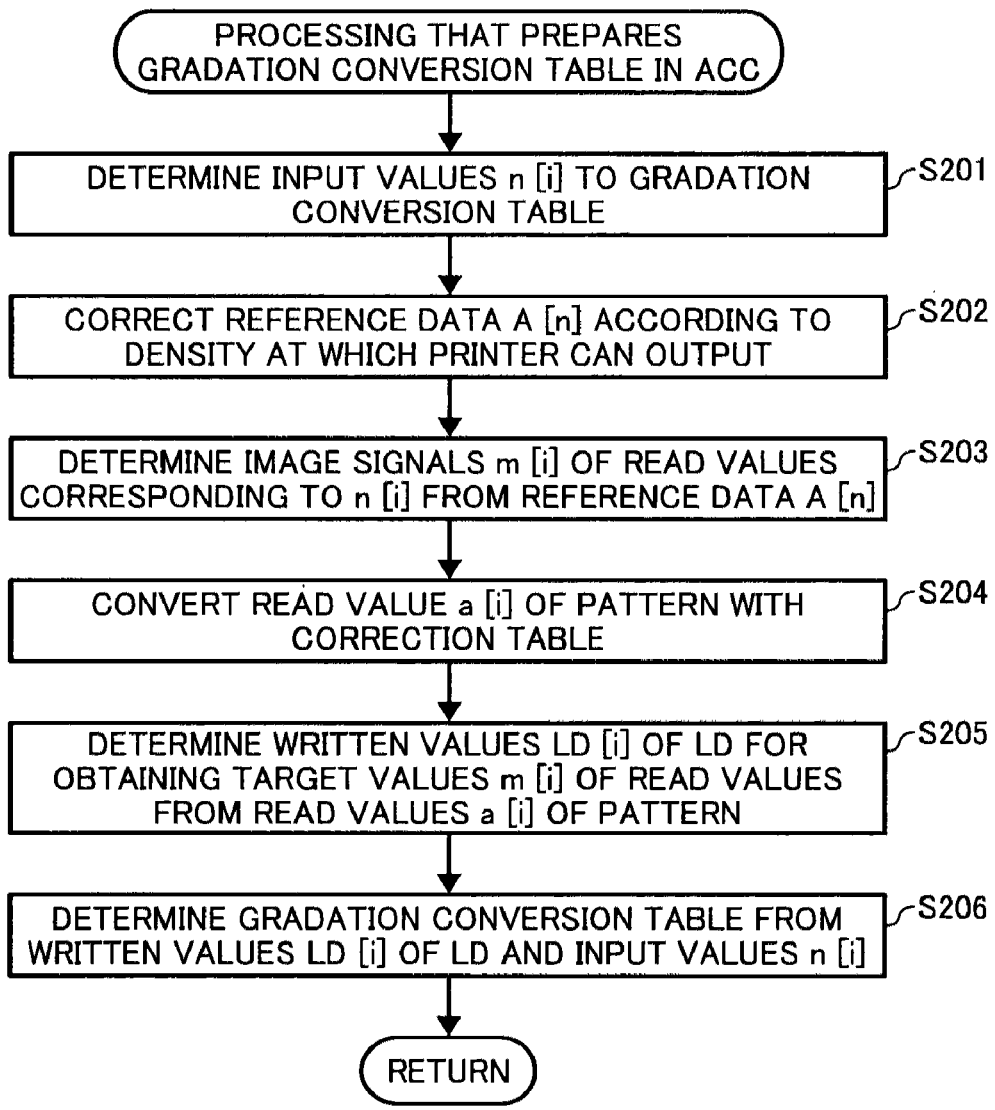
FIG. 55 is a flowchart for explaining gradation conversion table generating processing in ACC.

Next, the procedure of computation of ACC will be explained with reference to a flowchart in FIG. 55. In FIG. 55, in the preparation of the gradation conversion table in ACC, at the outset, the color copying apparatus 1 determines input values necessary for determining the YMCK γ correction table (gradation conversion table), for example, n[i]=11(h)× i(i=0, 1, ..., imax=15) (Step S201).

That is, a comparison between the graph when RGB γ conversion has been made and the graph when the RGB γ conversion has not been made shows that the graph for the printer characteristics in the third quadrant is identical while the RGB γ conversion table characteristics in the second quadrant are different. Based on this fact, the reference data in the first quadrant should be changed. However, the characteristics of the YMCK gradation conversion table LD[n] as the final results are identical.

Thus, the reference data are changed depending upon whether the RGB γ conversion table processing is performed. An example of the RGB γ conversion table used in the embodiment is shown.

The color copying apparatus 1 corrects the reference data A[n] depending upon the image density outputable by the printer unit 100 (Step S202).

That is, laser beam write values for providing the maximum possible image density that can be realized by the printer unit 100 are expressed in FFh (hexadecimal), and read values of the gradation pattern in this case, i.e., m[FFh], are mmax. The reference data for which the correction from the low image density side to the intermediate image density side is not performed are A[i] (i=0, 1, ..., i1), the reference data for which the correction on the high image density side is not performed are A[i] (i=i2+1, ..., imax−1) (i1≦i2, i2≦imax−1), and the reference data for which the correction is performed are A[i] (i=i1+1, ..., i2).

A specific computation method will be explained on the assumption that the image signal is one that is proportional to the reflectance of the original not subjected to the RGB-γ conversion. Among the reference data for which the correction is not performed, the reference data in which the image density in the high image density portion is lowest, i.e., A[i2+1], and the reference data in which the image density in the low image density portion is lowest, i.e., A[i1], are provided, and the difference Δref between the data is determined by the following formula:

$$\Delta\text{ref} = A[i1] - A[i2+1] \tag{46}$$

Here for a reflectance linear model or a lightness linear model not subjected to the RGB γ conversion as reverse processing, Δref is Δref>0.

On the other hand, likewise, the difference Δdet is determined by the following formula 47 from the read value mmax of the gradation pattern that provides the maximum image density attainable by the printer unit 100.

$$\Delta\text{det} = A[i1] - m\text{max} \tag{47}$$

Thereafter, the reference data subjected to correction in the high density portion, i.e., A[i] (i=i1+1, ..., i2), are determined by the following formula 48.

$$A[i] = A[i1] + (A[i] - A[i1]) \times (\Delta\text{det}/\Delta\text{ref}) \tag{48}$$

where i=i1+1, i1+2, ..., i2−1, i2.

Next, the color copying apparatus 1 determines image signals m[i] read with the scanner unit 300 corresponding to n[i] from the reference data A[n] (Step S203).

In determining the read image signals m[i], in fact, reference data corresponding to skipped n[j], i.e., A[n[j]] (0≦n[j]≦ 255, j=0, 1, ..., jmax, n[j]≦n[k] for j≦k), are determined as follows.

Specifically, j(0≦j≦jmax), which provides n[j]≦n[i]<n[j+1], is determined.

For eight-bit image signals, the determination of reference data as n[0]=0, n[jmax]=255, n[jmax+1]=n[jmax]+1, A[jmax+1]=A[jmax] simplifies the computation.

The reference data intervals, n[j], are preferably as small as possible because the accuracy of the finally determined γ correction table is high.

The color copying apparatus 1 then corrects ACC pattern read values a[LD] for the write values LD using correction tables represented as b or b' in FIG. 45, i.e., D[ii] (ii=0, 1, 2, ..., 255) as follows (Step S204).

$$a1[LD]=D[a[LD]]$$

The a1[LD] will be hereinafter referred to as a[LD].

m[i] is determined from j, thus determined, by the following formula 49.

$$m[i]=A[j]+(A[j+1]-A[i])\cdot(n[i]-n[j])/(n[j+1]-n[j])  \quad (49)$$

In the formula 48, interpolation is performed by a primary expression. Alternatively, the interpolation may be performed, for example, by a high-dimension function or a spline function. This is given by the following formula 50.

$$m[i]=f(n[i])  \quad (50)$$

where, in a k-dimensional function, $$f(x) = \sum_{i=0}^{k} b_i x^i$$

After the determination of m[i], the color copying apparatus 1 determines laser beam (LD) write values LD[i] for determining m[i] according to the same procedure as described above (Step S205). When image signal data not subjected to RGB γ conversion are treated, as described below, a[LD] decreases with an increase in laser beam (LD) values.

For $LD[k]<LD[k+1], a[LD[k]] \geq a[LD[k+1]]$

Here the values in the pattern formation are 10 values of LD[k]=00h, 11h, 22h, . . . , 66h, 88h, AAh, FFh, (k=0, 1, . . . , 9). The reason for this is as follows. In the image density in which the amount of toner adhered is small, the change in read value of the scanner unit 300 over the amount of toner adhered is so large that the intervals between pattern write values LD[k] are narrowed. On the other hand, in the image density in which the amount of toner adhered is large, the change in read value of the scanner unit 300 over the amount of toner adhered is so small that reading intervals are broadened.

The embodiment is advantageous, over the configuration in which the number of patterns is increased, for example, as in LD[k]=00h, 11h, 22h, . . . , EEh, FFh (16 in total), for example, in that the toner consumption can be reduced; in the high image density area, a change over the LD write values is small; since read values are likely to be reversed, for example, due to the influence of uneven potential, uneven amount of toner adhered, uneven fixation, and uneven potential on the photoreceptor drums 104K to 104C, narrowing LD write value intervals is not always effective for accuracy improvement. Accordingly, patterns are formed by the above LD write values.

For LD[k] that provides $a[LD[k]] \geq m[i] > a[LD[k+1]]$, LD[i] is set as follows:

$$LD[i]=LD[k]+(LD[k+1]-LD[k])\cdot(m[i]-a[LD[k]])/(a[LD[k+1]]-a[LD[k]])$$

For $0 \leq k \leq kmax(kmax>0)$, when a[LD[kmax]]>m[i] (when the image density of target values determined from reference data is high), LD[i] is predicted by extrapolation by a primary expression as follows.

$$LD[i]=LD[k]+(LD[kmax]-LD[kmax-1])\cdot(m[i]-a[LD[kmax-1]])/(a[LD[kmax]]-a[LD[kmax-1]])$$

Thus, a set of values n[i] input into the YMCK γ correction table and output values LD[i], (n[i], LD[i]) (i=0, 1, . . . , 15), can be determined.

The extrapolation may be performed by not only the primary expression but also, for example, a method in which logarithm is taken.

The gradation conversion table is determined by interpolation by a spline function or the like based on the determined (n[i], LD[i]) (i=0, 1, . . . , 15) or by selecting a γ correction table stored in the ROM 716 (Step S206).

According to the embodiment, in order to correct the difference in spectral characteristics between CCDs, a new linear masking coefficient is computed from the linear masking coefficient based on the read values for the reference chart in the scanner data calibration shown in FIG. 29. How to compute the new linear masking coefficient will be explained.

Values, obtained by reading points on a boundary plane not on an achromatic color axis, for example, with a scanner CCD having standard spectral characteristics, are assumed to be (Ri,Gi,Bi) (i=hues 1 to 4). When the same points are read with another scanner, they are read as (Ri', Gi', Bi') (i=hues 1 to 4), which are different from (Ri,Gi,Bi) (i=hues 1 to 4), due to a fluctuation in spectral characteristics of the scanner CCDs. Consequently, the recorded values in the developing units C, M, Y, and K are computed by as (Ci', Mi', Yi', Ki') (i=hues 1 to 4) by the numerical formula 1. That is, the formula 33 can be expressed as the following formula 55.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \quad (55)$$

$$\begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

Since YMCK outputs after the linear masking processing are to be identical, when the formula 32=formula 55, the following formula is established.

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} = \quad (56)$$

$$\begin{pmatrix} aYB(3-4) & aYG(3-4) & aYR(3-4) & aY(3-4) \\ aMB(3-4) & aMG(3-4) & aMR(3-4) & aM(3-4) \\ aCB(3-4) & aCG(3-4) & aCR(3-4) & aC(3-4) \\ aKB(3-4) & aKG(3-4) & aKR(3-4) & aK(3-4) \end{pmatrix}$$

-continued $$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}$$

$$\begin{pmatrix} aYB(3'\text{-}4') & aYG(3'\text{-}4') & aYR(3'\text{-}4') & aY(3'\text{-}4') \\ aMB(3'\text{-}4') & aMG(3'\text{-}4') & aMR(3'\text{-}4') & aM(3'\text{-}4') \\ aCB(3'\text{-}4') & aCG(3'\text{-}4') & aCR(3'\text{-}4') & aC(3'\text{-}4') \\ aKB(3'\text{-}4') & aKG(3'\text{-}4') & aKR(3'\text{-}4') & aK(3'\text{-}4') \end{pmatrix}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

In order to determine linear masking coefficients aPS(hue 3'-4') (P=Y, M, C, K; S=R, G, B) for the hue areas 3'-4' from the formula 56, both edges are multiplied by an inverse matrix of $$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}, \tag{57}$$

i.e., $$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}^{-1}$$

$$\begin{pmatrix} aYB(3'\text{-}4') & aYG(3'\text{-}4') & aYR(3'\text{-}4') & aY(3'\text{-}4') \\ aMB(3'\text{-}4') & aMG(3'\text{-}4') & aMR(3'\text{-}4') & aM(3'\text{-}4') \\ aCB(3'\text{-}4') & aCG(3'\text{-}4') & aCR(3'\text{-}4') & aC(3'\text{-}4') \\ aKB(3'\text{-}4') & aKG(3'\text{-}4') & aKR(3'\text{-}4') & aK(3'\text{-}4') \end{pmatrix} =$$

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}^{-1}$$

to determine linear masking coefficients aPS(hue 3'-4') (P=Y, M, C, K; S=R, G, B) for the hue areas 3'-4'. Likewise, for each of other hues, linear masking coefficients aPS(each hue) (P=Y, M, C, K; S=R, G, B) can be determined.

Desired color reproducibility can be provided by, in the computation of the printer vector at Step S301 in FIG. 17, varying the printer vectors in the formula 57, i.e., P(i) (P=Y, M, C, K; i=each hue) depending upon the type of the original as a copying object, depending upon the quality mode of images such as characters, photographs, or characters/photographs, or depending upon various adjustment functions such as density adjustment values, color balance adjustment, and color conversion (that converts the color of the original to any desired reproducible color). Examples of original types include print originals using ink as the coloring material, photographic paper photograph originals using YMC photosensitive layers as the coloring material, copied originals using toner as the coloring material, ink jet originals in which the ink jet printer output is an original, map originals using a special ink, and color correction coefficients, of which the object is highlighters, for discriminating highlighters.

Specifically, regarding the printer vector P(i) (P=Y, M, C, K; i=each hue) in formula 57, the P original type (i) (P=Y, M, C, K; i=each hue, original type=print, photographic paper photograph, copied original, map, ink jet, highlighter, etc.) is associated with each image quality mode selected in the operating unit, and aPS original type (hue) (P=Y, M, C, K; S=R, G, B, constant) corresponding to each image quality mode is computed and is set in the circuit (ASIC) for use in copying.

$$\begin{pmatrix} aYB \text{ original type}(3'\text{-}4') & aYG \text{ original type}(3'\text{-}4') \\ aMB \text{ original type}(3'\text{-}4') & aMG \text{ original type}(3'\text{-}4') \\ aCB \text{ original type}(3'\text{-}4') & aCG \text{ original type}(3'\text{-}4') \\ aKB \text{ original type}(3'\text{-}4') & KG \text{ original type}(3'\text{-}4') \end{pmatrix}$$

$$\begin{pmatrix} aYR \text{ original type}(3'\text{-}4') & aY \text{ original type}(3'\text{-}4') \\ aMR \text{ original type}(3'\text{-}4') & aM \text{ original type}(3'\text{-}4') \\ aCR \text{ original type}(3'\text{-}4') & aC \text{ original type}(3'\text{-}4') \\ aKR \text{ original type}(3'\text{-}4') & aK \text{ original type}(3'\text{-}4') \end{pmatrix} =$$

$$\begin{pmatrix} Y \text{ original type}(1) & Y \text{ original type}(2) \\ M \text{ original type}(1) & M \text{ original type}(2) \\ C \text{ original type}(1) & C \text{ original type}(2) \\ K \text{ original type}(1) & K \text{ original type}(2) \end{pmatrix}$$

$$\begin{pmatrix} Y \text{ original type}(3) & Y \text{ original type}(4) \\ M \text{ original type}(3) & M \text{ original type}(4) \\ C \text{ original type}(3) & C \text{ original type}(4) \\ K \text{ original type}(3) & K \text{ original type}(4) \end{pmatrix} \begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}^{-1}$$

In order to reduce a fluctuation in color reproduction due to a difference between reading machines, a scanner data calibration chart shown in FIG. 29 is read. Based on the results of reading, the standards that determine hue areas, which play as the hue boundary plane, parameter Fx', and the scanner vector are corrected. At Step S307 in FIG. 17, the scanner vector is corrected. At Step S308 and later steps, the scanner vector inverse matrix is computed, and, at Step S311 in FIG. 17, the masking coefficient is computed. This method will be explained with reference to a flowchart in FIG. 56. FIG. 56 is a flowchart for explaining correction by scanner data calibration according to the present invention.

A scanner data calibration chart is read (S1001). A scanner data calibration reference chart shown as an example in FIG. 29 is mounted on an original platen in the scanner unit 300. The scanner data calibration reference chart is read with the scanner unit 300.

Next, the hue angle is computed (S1002). Based on read values RGB data (Dr,Dg,Db) (=Ri,Gi,Bi (i=each patch number)) for each patch of the scanner data calibration chart, parameters for dividing the read RGB image data of the original for each hue, i.e., GR, GB, and Fx' are computed.

Next, the linear masking coefficient is computed (S1003). For each hue, the linear masking coefficient is computed from the formula 57 and the read values Ri,Gi,Bi (i=each patch number) for each patch.

Finally, the read values and the coefficients are stored (S1004).

Subsequently, characteristic functions according to the embodiment will be explained. According to the embodiment, the intermediate results for obtaining image processing parameters for image processing of image data are computed in stages for each predetermined action of the image processing device and are stored. Further, recomputation determination information, which determines whether the intermediate results (intermediate parameters) are recomputed, is stored. Based on the intermediate result recomputation determination information, whether the recomputation of the intermediate results of the image processing parameters is necessary, is determined, and the image processing parameters are generated.

More specifically, the intermediate results (scanner vector, printer vector, scanner vector inverse matrix, and linear masking coefficient shown in FIG. 57) necessary for providing image processing parameters are determined upon the following predetermined action.

1. Initialization of image processing parameters or power activation.
2. Reading of reference chart (calibration chart).
3. Correction of image data.

According to the embodiment, the image processing device comprises: an intermediate parameter computing unit that computes an intermediate parameter for the determination of an image processing parameter for use in a color correcting unit that corrects a signal color depending upon a plurality of hue areas formed using, as a boundary, faces provided parallel to a lightness axis within a color space; an intermediate parameter storing unit that stores the intermediate parameter; and a determining unit that determines whether, in executing the color correcting unit, the intermediate parameter is computed by the intermediate parameter computing unit, or the intermediate parameter stored in the intermediate parameter storing unit is used, depending upon an image forming condition. According to the embodiment, the frequency of recomputation of intermediate parameters can be reduced, and an increase in speed of parameter computation and an improvement in color reproducibility can be simultaneously realized.

When a plurality of scanner units 300 are present, a method may be adopted in which the "intermediate result computation processing upon the initialization of the image processing parameter or upon power activation", "intermediate result computation processing upon reading of the reference chart (calibration chart)", and "image data correction processing" are performed for each of the scanner units 300. Thus, storing the intermediate computation results for each image reading unit can reduce computation time even when a plurality of image reading units are provided.

According to an aspect of the present invention, it is possible to reduce the frequency of recomputation of the intermediate parameters and simultaneously realize an increased speed of parameter computation and improved color reproducibility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
an intermediate parameter computing unit configured to compute an intermediate parameter as an image processing parameter for use in a color correcting unit that corrects signal colors depending upon a plurality of hue areas formed using, as a boundary, planes provided parallel to a lightness axis within a color space;
an intermediate parameter storing unit configured to store therein the intermediate parameter calculated by the intermediate parameter computing unit; and
a determining unit that determines whether the intermediate parameter that is newly computed by the intermediate parameter computing unit or the intermediate parameter that is previously stored in the intermediate parameter storing unit is to be supplied to the color correcting unit depending upon an image forming condition, wherein the determining unit determines that the intermediate parameter that is previously stored in the intermediate parameter storing unit is to be supplied to the color correcting unit when the image forming condition indicates monocolor output.

2. The image processing device according to claim 1, wherein the determining unit determines that the intermediate parameter that is newly computed by the intermediate parameter computing unit is to be supplied to the color correcting unit when the image forming condition indicates fullcolor output.

3. The image processing device according to claim 1, wherein the determining unit determines that the intermediate parameter that is previously stored in the intermediate parameter storing unit is to be supplied to the color correcting unit when the image forming condition indicates a two-color output in which chroma is enhanced using a first single color and a second single color in which the color of an original is distant in a chroma direction from an achromatic color axis as a result of a change in the density of the first single color.

4. The image processing device according to claim 1, wherein the determining unit determines that the intermediate parameter that is newly computed by the intermediate parameter computing unit is to be supplied to the color correcting unit when the image forming condition indicates red-black mode output.

5. The image processing device according to claim 1, wherein the determining unit determines that the intermediate parameter that is previously stored in the intermediate parameter storing unit is to be supplied to the color correcting unit when the image forming condition indicates negative output in which color reversal processing is performed with respect to an original.

6. The image processing device according to claim 1, wherein the determining unit determines that the intermediate parameter that is newly computed by the intermediate parameter computing unit is to be supplied to the color correcting unit when the image forming condition indicates positive output in which no color reversal processing is performed with respect to an original.

7. The image processing device according to claim 1, wherein the determining unit determines that the intermediate parameter that is newly computed by the intermediate parameter computing unit is to be supplied to the color correcting unit when the image forming condition indicates an original-type that requires faithful reproduction of an original.

8. The image processing device according to claim 1, wherein when the determining unit determines that the intermediate parameter that is newly computed by the intermediate parameter computing unit is to be supplied to the color correcting unit, the determining unit determines whether a difference exists in a hue angle of each hue from a parameter based on which the intermediate parameter is calculated,
the determining unit, when the difference exists, causes the intermediate parameter computing unit to newly compute the intermediate parameter, and the determining unit, when the difference does not exist, determines that the intermediate parameters previously stored in the intermediate parameter storing unit are to be supplied to the color correcting unit.

9. An image processing method comprising:
computing an intermediate parameter as an image processing parameter for use in a color correcting unit that corrects signal colors depending upon a plurality of hue areas formed using, as a boundary, planes provided parallel to a lightness axis within a color space;
storing the intermediate parameter calculated at the computing in an intermediate parameter storage unit; and
determining whether the intermediate parameter that is newly computed at the computing or the intermediate parameter that is previously stored in the intermediate parameter storing unit is to be supplied to the color correcting unit depending upon an image forming condition, wherein the determining includes determining that the intermediate parameter that is previously stored in the intermediate parameter storing unit is to be supplied to the color correcting unit when the image forming condition indicates monocolor output.

10. The image processing method according to claim 9, wherein the determining includes determining that the intermediate parameter that is newly computed the intermediate parameter computing unit is to be supplied to the color correcting unit when the image forming condition indicates full-color output.

11. The image processing method according to claim 9, wherein the determining includes determining that the intermediate parameter that is previously stored in the intermediate parameter storing unit is to be supplied to the color correcting unit when the image forming condition indicates a two-color output in which chroma is enhanced using a first single color and a second single color in which the color of an original is distant in a chroma direction from an achromatic color axis as a result of a change in the density of the first single color.

12. The image processing method according to claim 9, wherein the determining includes determining that the intermediate parameter that is newly computed at the computing is to be supplied to the color correcting unit when the image forming condition indicates red-black mode output.

13. The image processing method according to claim 9, wherein the determining unit includes determining that the intermediate parameter that is previously stored in the intermediate parameter storing unit is to be supplied to the color correcting unit when the image forming condition indicates negative output in which color reversal processing is performed with respect to an original.

14. The image processing method according to claim 9, wherein the determining includes determining that the intermediate parameter that is newly computed at the computing is to be supplied to the color correcting unit when the image forming condition indicates positive output in which no color reversal processing is performed with respect to an original.

15. The image processing method according to claim 9, wherein the determining includes determining that the intermediate parameter that is newly computed at the intermediate parameter computing unit is to be supplied to the color correcting unit when the image forming condition indicates an original-type that requires faithful reproduction of an original.

* * * * *